(12) United States Patent
Ziade et al.

(10) Patent No.: US 8,396,726 B2
(45) Date of Patent: *Mar. 12, 2013

(54) APPARATUSES, METHODS, AND SYSTEMS FOR BUILDING A RISK EVALUATION PRODUCT

(75) Inventors: Richard Ziade, New York, NY (US); Terrence McLean, New York, NY (US)

(73) Assignee: Insight Catastrophe Solutions, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,951

(22) Filed: Nov. 22, 2011

(65) Prior Publication Data

US 2012/0143631 A1 Jun. 7, 2012

Related U.S. Application Data

(63) Continuation of application No. 11/831,834, filed on Jul. 31, 2007, now Pat. No. 8,090,600.

(60) Provisional application No. 60/834,465, filed on Jul. 31, 2006, provisional application No. 60/840,133, filed on Aug. 25, 2006, provisional application No. 60/856,509, filed on Nov. 3, 2006.

(51) Int. Cl.
*G06Q 40/00* (2012.01)

(52) U.S. Cl. .................................. 705/4; 705/2; 705/3
(58) Field of Classification Search ................... 705/2–4
See application file for complete search history.

(56) References Cited

U.S. PATENT DOCUMENTS

2002/0111835 A1* 8/2002 Hele et al. .................... 705/4

* cited by examiner

*Primary Examiner* — Michelle Le
(74) *Attorney, Agent, or Firm* — Chadbourne & Parke LLP

(57) ABSTRACT

The present disclosure describes an approach to constructing and implementing risk rating products that provides a number of advantages. Instead of hard-coding attributes of a risk rating scheme, which requires the assistance of a trained programming specialist for any modifications, adjustments, or new products, the present invention provides a set of modular tools that assist non-specialists in on-the-fly generation and implementation of risk rating products. The modularity of this approach facilitates the modification and/or updating of a system component without affecting the operation of other components. Described herein are embodiments of a risk rater data-structure, which comprises an abstracted representation of a risk rating scheme that may be loaded into and/or interpreted by other system components to generate a user interface for processing risk information and generating insurance quotes.

20 Claims, 55 Drawing Sheets

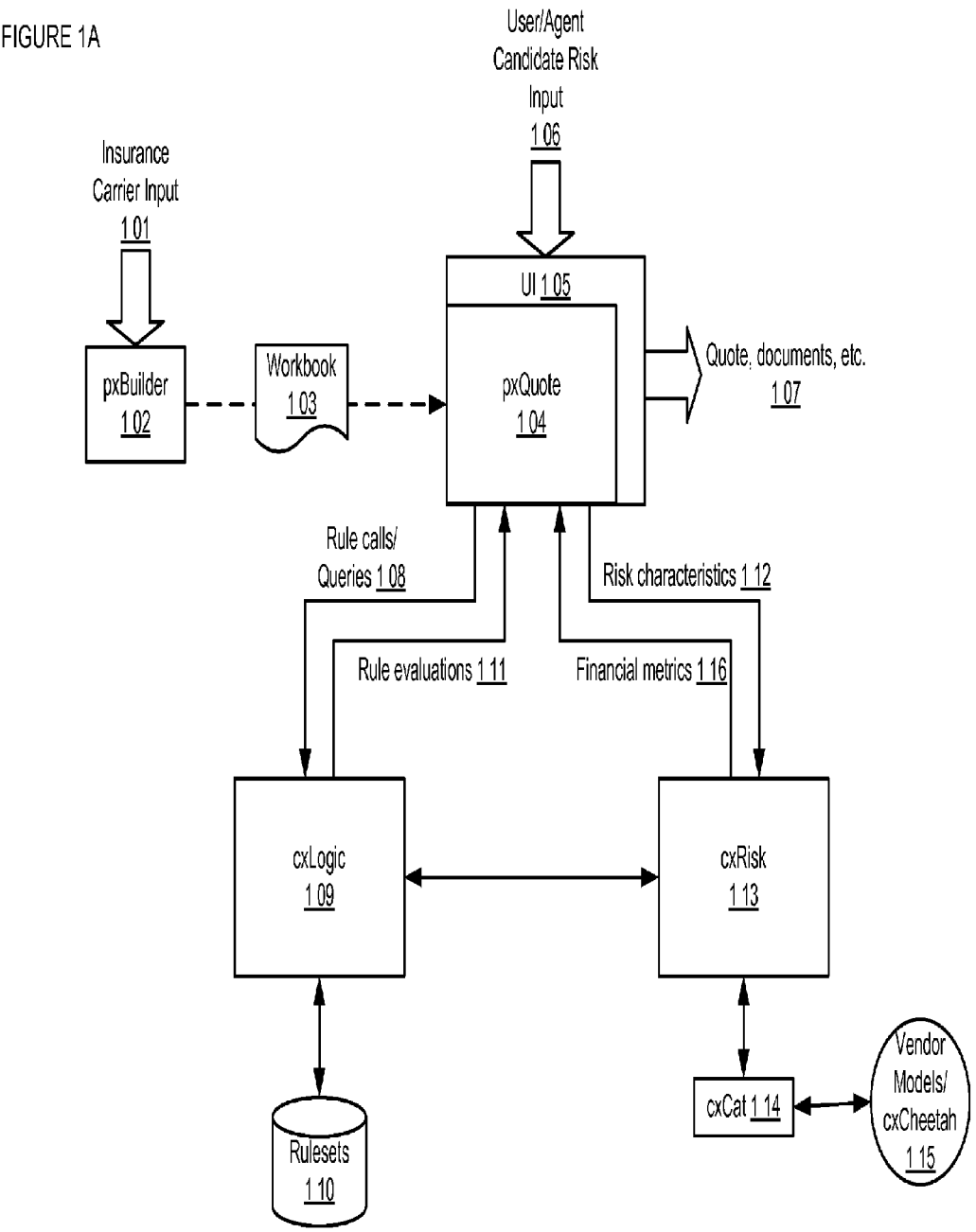

System Requirements Verification
Operating System  ✓
Browser  ✓
Browser Version  ✓
Flash Version  ⊗

Your flash player does not meet this application's minimum requirements. You must have Adobe Flash Player (version 9 or higher) installed in order to use this application.

Minimum System Requirements
Operating System: Windows
BrowserL Firefox
BrowserL Version: 1.5
Flash Player: 9

FIG.22

3. Effective Date

4. Location
   [Select one]

5. Producer Code
   [Select one]

[Start]

| ◁ | July | 2007 | ▷ |
|---|---|---|---|
| S M T W T F S |
| 1 2 3 4 5 6 7 |
| 8 9 10 11 12 13 14 |
| 15 16 17 18 19 20 21 |
| 22 23 24 [25] 26 27 28 |
| 29 30 31 |

FIG.24

1. Policy Carrier
   ⊙ Insurance Carrier

FIG.25

Views: ⊙ All  ○ New Rollovers  ○ Quotes  ○ Submitted   🔍 Type to filter current View   ↻   📄 New

⊗

Start a Quote
Policy Carrier
1. ⊙ Insurance Carrier
2. Product
   [Select one ▾]
3. Effective Date
   [▦]
4. Location
   [Select one ▾]
5. Producer Code
   [Select one ▾]

[ Start ]

Records: All (1611) New Rollovers (180) Quotes (1057) Submitted (374)   James Anderson   2.6.8

Product: H03MP

Property Information                *6 Remaining Required items

Applicant's First Name*
Applicant's Middle Name
Applicant's Last Name*
Street Number*
Street Name*
Address Line 2
City*
State*⊙FL
ZIP*
ZIP+4

Validate Address

Basic Coverage and Deductible Options              *4 Remaining Required items
Property Construction and Protection               *1 Remaining Required items
Windstorm Load Construction Information            ◊ Section Complete
Protective Devices, Surcharges and Optional Coverages  ◊ Section Complete
Applicant Mailing and Contact Information          ◊ Section Complete

| Item | Value |
|---|---|

Documents

31% 11 Fields Remaining

Application >

Save & Close

Update Effective Date
07/30/2007

FIG.27

All quote results are subject to verification and underwriting

| Item | Value |
|---|---|
| Base Premium | $930 |
| WLM Credit Factor | 0 |
| Windstorm Load Mitiga | 0 |
| New Home Discount | −130 |
| Pers Prop Repl Cost | 140 |
| Pers Liab Limit | 18 |
| Premium Before Fees | $958 |
| MGA Fee | 25 |
| EMPA Fee | 2 |
| FHCF Assessment | 10 |
| Citizens Emergency As | 13 |

Documents

40% 0 Fields Remaining

Application >

Save & Close

PIBUILDER

Please Log In

Username : _____ 31 01

Password : _____ 31 02

☑ Remember and log me in automatically

[LogIn]

STAGING-CRU INSTANCE

FIG.31A

PIBUILDER

STAGING-CRU INSTANCE  31 03

Welcome arcadmin  •[Logout>]

Environment : [Local ▼]  31 05 pxQuote Products [Add/Clone a Product Button]  31 04

📦 Created by: arcadmin on 4/1/07 at 11:55 AM|Last Updated by: arcadmin on 4/17/07 at 11:55 AM
DERP_CP_TEST (cloned product) Carrier ID: DERP View Base Criteria|Delete 📦 Created by: yh@cru300.com on 4/10/07 at 2:30 PM|Last Updated by: yh@cru300.com on 4/10/07 at 2:30 PM
DERP_CP_01 (CP 01 YH) Carrier ID: DERP View Base Criteria|Delete

PIBUILDER

Please Log In

403 Forbidden

Username : [arcadmin] 31 06
Password : [        ] 31 07

☐ Remember and log me in automatically

[Login]

STAGING-CRU INSTANCE

FIG.31D

PIBUILDER

STAGING-CRU INSTANCE
Welcome arcadmin. [Logout>]
31 08 Environment : [Local] 31 09 pxQuote Products [Add/Clone a Product Button] 31 11

▫ Created by: arcadmin on 4/1/07 at 11:55 AM|Last Updated by: arcadmin on 4/17/07 at 11:55 AM
DERP_CP_TEST (cloned product) Carrier ID: DERP|View Base Criteria|Delete
                                                         31 10

▫ Created by: yh@cru300.com on 4/10/07 at 2:30 PM|Last Updated by: yh@cru300.com on 4/10/07 at 2:30 PM
DERP_CP_01 (CP 01 YH) Carrier ID: DERP|View Base Criteria|Delete

PIBUILDER

STAGING-CRU INSTANCE
Welcome arcadmin • [Logout>]

Add a Product/Clone a Product from 'Local' to a 'Local Product'
Clone from: [None (New Empty Product) ▼] 31 12
Local Name: [_____] * 31 16
New Product ID: [_____] * 31 13
New Product Label: [_____] * 31 14
Carrier ID: [_____] * 31 15

[Create Product] [Cancel]
31 17        31 18

PIBUILDER

STAGING-CRU INSTANCE
Welcome arcadmin • [Logout>]

|Close|Save|Publish
Application  31 21
[Input Form] [Expressions] [Rule sets]

[DERP]_CP_TEST (Derp)Unversioned    Download XML |Validate |Vocabulary(0 terms)
Header 31 19  Workbook 31 20
[Base Criteria] [Input Form] [Expressions] [Tables] [Rule sets] [Rating Profiles]
31 39          31 51         31 53          31 77
Basic Product Data
Carrier ID: [DERP]
Product Label: [Single-Location Commercia]

[Apply Changes]

FIG.31F

Publish Product
Publish Product to :  ○Dev  ○Test  ○Staging  ○Production    31_34

[Publish Product]  [Cancel]  [What am I about to change?]
31_35         31_36        31_37

FIG.31K

--- http://staging.pxbuilder.cru                                              ⊠
⚠ Use must select the destination of your updated product in order to see what you are
   about to change.                                                      31_38
                    [OK]

Base Criteria    [Add Base Criterion]  31_40

31_46 ↴
      1. ▣ Carrier
      2. ▣ Product
      3. ▣ EffectiveDateRange

[Apply Changes] [Cancel]
FIG.31M

---

Add Base Criterion

Name :   31_42  [_____] *
Label :  31_43  [_____] *
Type :          [String        ▽]
Value :  31_44  [_____] *
Help :          [_____]
Hint :          [_____]
Alert :         [_____]

[Add] [Cancel]
FIG.31N                          31_41  31_45

The page at http://staging/pxbuilder.cru says:

? Are you sure you want to delete this base criterion?

[OK]  [Cancel]
31 47  31 48

FIG.31O

Base Criteria: Carrier

Value:  | DERP Group | *
Label:  | Policy Group | *
Help:   | This will help you select the proper rating algorithm.
Hint:   | Choose the carrier for this policy.
Alert:  | Choose a value!

[Apply Changes] [Cancel]
31 49  31 50

FIG.31P

EDIT APPLICATION INPUT FORM

```
<?xml version="1.0"?>
<InputForm>
  <xf:model xmlns:xf="http://www.w3.org/2002/xforms"/>
  <Body><xf:group xmlns:xf="http://www.w3.org/2002/xforms">
    <xf:label>
      Applicant Contact Information
    </xf:label>
    <xf:input affectsEligibility="false" appRequired="true" ref="//InsuredContactName" required="fals
      <xf:label>
        Contact Name
      </xf:label>
    </xf:input>
    <xf:input affectsEligibility="false" appRequired="true" maxlength="30" minlength="1" ref="//Insur
      <xf:label>
        Address 1
      </xf:label>
    </xf:input>
    <xf:input affectsEligibility="false" appRequired="true" maxlength="30" minlength="1" ref="//InsuredMailingAddressLine
      <xf:label>
        Address 2
      </xf:label>
    </xf:input>
    <xf:input affectsEligibility="false" appRequired="true" maxlength="30" minlength="1" ref="//Insur
      <xf:label>
        City
      </xf:label>
    </xf:input>
    <xf:select1 affectsEligibility="false" appRequired="true" ref="//InsurMailingAddressState" reque
      <xf:label>
        State
      </xf:label>
      <xf:item>
        <xf:label/>
```

31 52 [Apply Changes]   31 53 [Cancel]

FIG.31Q

165 Workbook Expressions [Add New Expression] 31 54
31 58 — 1. 🗑 ⬇ ⬆ ⊞ PropertyCounty
31 59 — 2. 🗑 ⬇ ⬆ ⊞ AgentCode
31 60 — 3. 🗑 ⬇ ⬆ ⊞ AgentName
31 61 — 4. 🗑 ⬇ ⬆ ⊞ AgentAddressLine1
5. 🗑 ⬇ ⬆ ⊞ AgentAddressLine2
6. 🗑 ⬇ ⬆ ⊞ AgentCity
7. 🗑 ⬇ ⬆ ⊞ AgentState
8. 🗑 ⬇ ⬆ ⊞ AgentZipCode
9. 🗑 ⬇ ⬆ ⊞ AgentZipCodePlusFour

FIG.31R

Add New Expression
Name:            [                    ] * 31 55
Label:           [                    ]
Group Label:     [                    ]
Output:          ○True ●False
Expression:
                 [                              ]

Output Expression:
                 [                              ]

Insert At:       [166]
                        [Validate & Save] [Cancel]
                             31 56         31 57

FIG.31S

Add Table

| | Browse... | 31 68 |

FIG.31V  Upload Table XML

Replace Table AOPRelativityTable

Browse.... 31_75

Upload Table XML  31_76

FIG.31X

31_81 5 Workbook Rulesets
cxLogic Ruleset Source : ⊙Staging ○Production 31_78
Add Ruleset : [Select Ruleset to Add ▾]
31_82 → 1. ▣ DERP.CP_01 Maximum Total Insured Value,9B346B61-1372-3E27-9A3B0A4C3720BF8D
2. ▣ DERP.CP_01 Underwriting Questions, 9B2C4649-1372-3E27-9A2DD6615B4ABF1C
3. ▣ DERP.CP_01 Hurricane Deductible, 9B2D1BC1-1372-3E27-9A7A8F809E109DEF
4. ▣ DERP.CP_01 Limits of Liability, 9B89FF54-1372-3E27-9A1638DEBF53D4F0
31_80 5. ▣ DERP.CP_01 Maximum Contents and Loss of Use, 9BA708FF-1372|-3E27-9AB1EEE4FD08FD15

FIG.31Y

5 Workbook Rulesets cxLogic Ruleset Source : ⊙Staging ○Production
Add Ruleset :                           31 79

| | | Select Ruleset to Add ▽ | |
|---|---|---|---|
| 1. | 🗎 DERP.CP_ | Select Ruleset to Add | |
| | | submission | BE27-9A3B0A4C3720BF8D |
| 2. | 🗎 DERP.CP_ | DERP CP_01 Maximum Contents and Loss of Use | |
| | | DERP CP_01 Limits of Liability | A2DD6615B4ABF1C |
| 3. | 🗎 DERP.CP_ | DERP CP_01 Geocoding | A8F809E109DEF |
| | | DERP CP_01 Hurricane Deductible | |
| 4. | 🗎 DERP.CP_ | DERP CP_01 Underwriting Questions | EBF53D4F0 |
| | | DERP CP_01 Loss History 3 | |
| 5. | 🗎 DERP.CP_ | DERP CP_01 Loss History 2 | F-1372-3E27-9AB1EEE4FD08FD15 |
| | | DERP CP_01 Submission | |
| | | DERP CP_01 Effective Date | |
| | | DERP CP_01 Vacant Property | |
| | | DERP CP_01 Loss History 1 | |

FIG.31Z

| My Quotes | New Quote | ☒ | | |
|---|---|---|---|---|

Product: High Value Dwelling

| Product Selection | Quote | Application | Submission | Documents & Messages |
|---|---|---|---|---|

Basic Information and Property Location — *6 Remaining Required Items

Declared Insured Value / Policy Limits — ✓Section Complete

| | | |
|---|---|---|
| Dwelling Value * | 600000 | 33 01 |
| Personal Property Value * | 100000 | 33 05 |
| Loss of Use Value * | 120000 | 33 10 |
| Total Declared Insured Value | 820000 | 33 15 |
| Policy Limit Option * | Equal to Total Declared Insured Value ▸ | 33 20 |
| Wind/Hail Sublimit * | 820000 | 33 25 |
| Non-Wind/Hail Limit/Sublimit * | 820000 | 33 30 |

Coverage and Deductible Options — *1 Remaining Required Item

Property Construction and Occupancy — *6 Remaining Required Items

Property Protection — *2 Remaining Required Items

Additional Underwriting Information — *13 Remaining Required Items

Quote Information
23%
Please update your selections in order to retrieve a valid quote.
⊙ Rate Help
Personal Property and Loss of Use Coverages are limited to 40% of Declared Insured Value.

Eligibility Information
○ Unknown
[Check Eligibility]

✓Save & Close  ✗Discard & Close

FIG.33A

| Header | Workbook | | | | | Application | | |
|---|---|---|---|---|---|---|---|---|
| Base Criteria | 33 40 | Input Form | Expressions | Tables | Rulesets | Rating Profiles | Input Form | Expressions | Rulesets |

Edit Workbook Input Form

```
        <xf:label>
                Wind/Hail Sublimit
        </xf:label>
        <xf:help>
                Policy Limits must be at least $250,000 and may not exceed Total Declared Insured
        </xf:help>
</xf:input>
<xf:input calculation="([HurricaneSiteLimit] + ([CoverageA] + [CoverageC] + [CoverageD]) - [Hurrica
        <xf:label>
                Non-Wind/Hail Limit/Sublimit
        </xf:label>
        <xf:help>
                If Policy Limit Option of "Equal to Total Declared Value" (the "Dual Limit Option"
        </xf:help>
</xf:input>
<xf:input affectsEligibility="false" maxlength="20" minlength="2" ref="//Sinkhole" required="true"
        <xf:label>
                Distance to Nearest Sinkhole
        </xf:label>
</xf:input>
     33  35
</xf:group>
<xf:group xmlns:xf="http://www.w3.org/2002/xforms">
        <xf:label>
                Coverage and Deductible Options
        </xf:label>
<xf:select1 apperance="full" ratingImpact="R" ref="//PolicyPerilsOption" required="true">
        <xf:label>
                Peril Options
        </xf:label>
        <xf:item> <xf:label>
                       Special
                </xf:label>
```

| ⛶ My Quotes | 📄 CRUSTAGING01-12 ⊠ | | | | | | |
|---|---|---|---|---|---|---|---|
| Quote #: CRUSTAGING01-12 | | | | | Product: High Value Dwelling | | |
| Product Selection | Quote | Application | Submission | Documents & Messages | | | |

| | | Quote Information |
|---|---|---|
| Quote Details | Documents | 70% |
| | ☐ Quote Sheet | Total Premium: $37,564 |
| | ☐ Application | ⊚ Rate |

| Item | Value | Messages 33 80 |
|---|---|---|
| Geocoding Results: | Street | 1. This policy is ineligible because the distance to the nearest sinkhole is less than 20. |
| Geocoding match level | 38.31 | |
| Distance To Coast (miles) | 12.87 | |
| Elevation (feet) | 26.681538 | |
| Latitude (degrees) | -80.668490 | 33 75 |
| Longitude (degrees) | | |
| Premium, Taxes and Fees: | | |
| Base Premium | $35,226 | |
| Surplus Lines Tax | 1,770 | |
| Other Taxes/Surcharges | 358 | |
| Service Fee | 35 | |
| Inspection and Other Fees | 175 | |
| Total Charges | $37,564 | |

Help

No help available for the currently selected field.

Eligibility Information

◯ Ineligible 33 70
We're sorry. Your application is ineligible for the following reasons.

[ Check Eligibility ]

✓ Save & Close    ✗ Discard & Close

FIG.33E

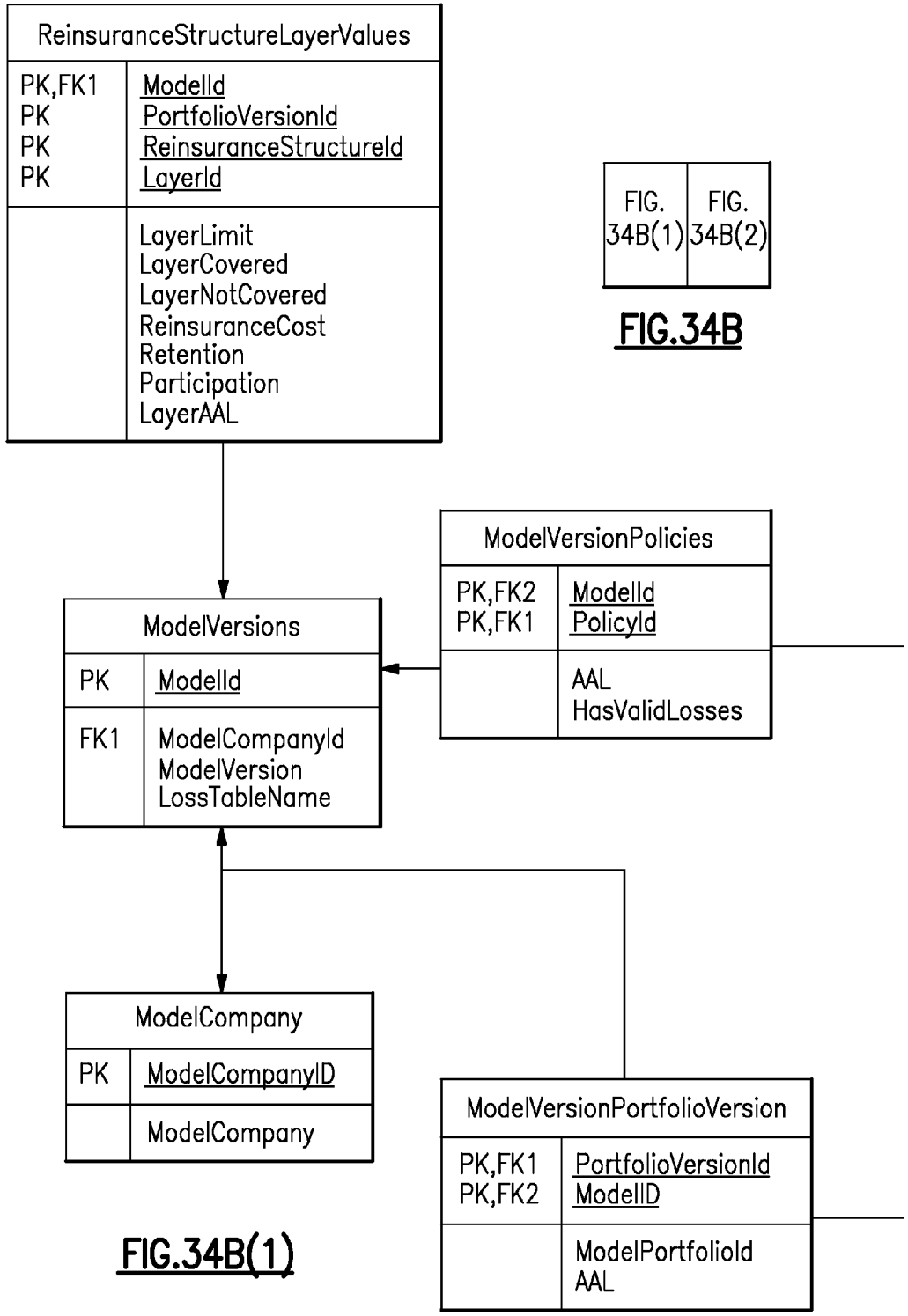
FIG. 34B(1)

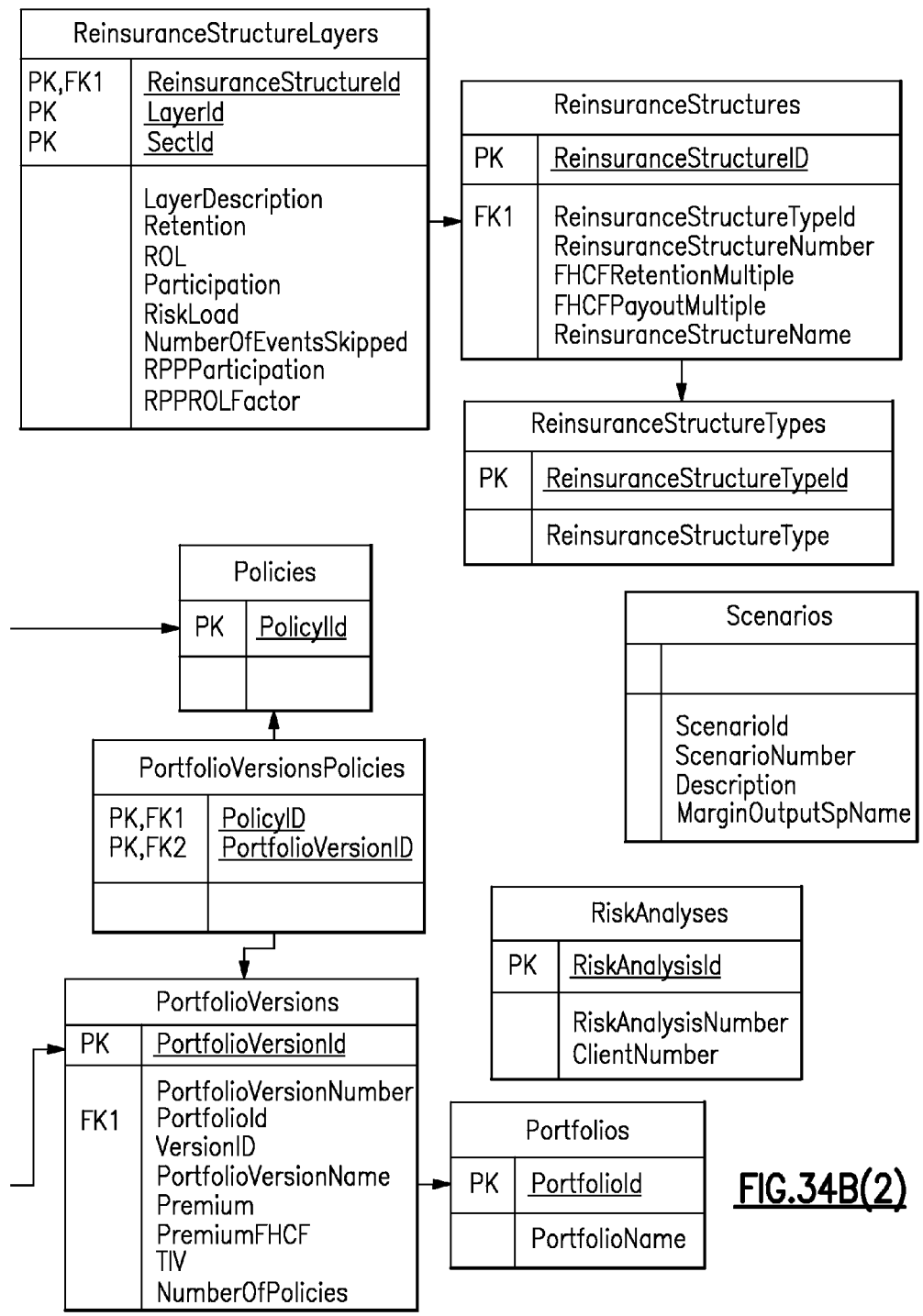
FIG.34B(2)

APPARATUSES, METHODS, AND SYSTEMS FOR BUILDING A RISK EVALUATION PRODUCT

RELATED APPLICATIONS

This disclosure is a continuation of and hereby claims priority under 35 U.S.C. §120 to U.S. patent application Ser. No. 11/831,834, entitled "Apparatuses, Methods, And Systems For Building A Risk Evaluation Product," filed on Jul. 31, 2007 now U.S. Pat. No. 8,090,600, which in turn claims priority to U.S. Provisional Patent Application No. 60/834,465 entitled, "Methods and Systems for Authoring and Evaluating Logical Rules," filed on Jul. 31, 2006, U.S. Provisional Patent Application No. 60/840,133 entitled, "Methods and Systems for Collecting and Processing Information for Insurance Price Quotes & Applications," filed on Aug. 25, 2006, and U.S. Provisional Patent Application No. 60/856,509 entitled, "Methods and Systems for Evaluating Profitability Associated with the Addition of an Insurance Policy to a Portfolio," filed on Nov. 3, 2006, which are incorporated in their entirety herein by reference.

This application is related to commonly assigned and co-pending U.S. application Ser. No. 11/831,765 (Inventors: Terrence McLean and Richard Ziade), entitled, "Apparatuses, Methods, and Systems for a Reconfigurable Insurance Quoting Engine," and filed on Jul. 31, 2007, which is incorporated herein by reference in its entirety.

This application is related to commonly assigned and U.S. application Ser. No. 11/831,848 (Inventors: Terrence McLean and Richard Ziade; now issued as U.S. Pat. No. 7,844,528), entitled, "Apparatuses, Methods, and Systems for Providing a Risk Evaluation Product Builder User Interface," and filed on Jul. 31, 2007, and U.S. application Ser. No. 12/891,360, entitled "Apparatuses, Methods, and Systems for Providing a Risk Evaluation Product Builder User Interface," and filed on Sep. 27, 2010, both of which are incorporated herein by reference in its entirety.

This application is related to commonly assigned and U.S. application Ser. No. 11/831,856 (Inventors: Terrence McLean and Richard Ziade; now issued as U.S. Pat. No. 7,844,529), entitled, "Apparatuses, Methods, and Systems for Providing a Reconfigurable Insurance Quote Generator User Interface," and filed on Jul. 31, 2007, and U.S. application Ser. No. 12/893,278, entitled "Apparatuses, Methods, and Systems for Providing a Reconfigurable Insurance Quote Generator User Interface," and filed on Sep. 29, 2010, both of which are incorporated herein by reference in its entirety.

This application is related to commonly assigned and U.S. application Ser. No. 11/831,869 (Inventors: Terrence McLean and Richard Ziade; now issued as U.S. Pat. No. 7,844,530), entitled, "Apparatuses, Methods, and Systems for Providing a Risk Scoring Engine User Interface," and filed on Jul. 31, 2007, and U.S. application Ser. No. 12/902,204, entitled "Apparatuses, Methods, and Systems for Providing a Risk Scoring Engine User Interface," and filed on Oct. 12, 2010, both of which are incorporated herein by reference in its entirety. This application is further related to commonly assigned and co-pending PCT application serial no. PCT/US07/74879, entitled "Apparatuses, Methods, And Systems For Dynamic Configuration And Generation Of Insurance," filed on Jul. 31, 2007.

FIELD

The present invention relates generally to systems and methods for generating insurance products and more particularly to apparatuses, methods, and systems for building a risk evaluation product.

BACKGROUND

Reinsurance is a way for an insurance company to protect itself from losses due to a catastrophic event. Reinsurance allows an insurer to protect policy holders against risks greater than the insurer would itself, alone, could provide. Often times such extended protection is achieved by sharing the risk with a lead reinsurer and one or more following reinsures. Although the risk is spread and borne among the multiple reinsures, the lead reinsurer sets the premiums and other contract conditions.

SUMMARY

Determining reinsurance cost is important in order to decide whether or not an additional policy is beneficial. In order for insurance companies to profitably manage both individual insurance policies and portfolios of insurance policies, it is beneficial for companies to have a framework to find the financial impact, as well as other related financial, risk, and mathematical metrics, of adding policies to a portfolio. Policies are desirably determined based on location and likelihood of damage from threats, for example, flood, fire, bad weather, and others. The determination of the desirable policies and the decision process as to each individual policy is complex and often difficult to calculate quickly and comprehensively.

The approach to constructing and implementing risk rating products disclosed herein provides a number of advantages. Instead of hard-coding attributes of the risk rating scheme, which requires the assistance of a trained programming specialist for any modifications, adjustments, or new products, the present invention provides a set of modular tools that assist non-specialists in on-the-fly generation and implementation of risk rating products. The modularity of this approach facilitates the modification and/or updating of a system component without affecting the operation of other components. Described herein are embodiments of a risk rater data-structure, which comprises an abstracted representation of a risk rating scheme that may be loaded into and/or interpreted by other system components to generate a user interface for processing risk information and generating insurance quotes.

In one embodiment, a risk rater data-structure, embodied in an electronic storage medium, is disclosed, comprising: a set of risk rater base criteria, comprising at least a unique risk rater identifier; a plurality of risk characteristic input fields; at least one expression comprising a mathematical operation to be performed on at least one risk characteristic received via a subset of the plurality of risk characteristic input fields; a set of rule calls, specifying elements of a ruleset database; and a set of lookup table calls, specifying elements of a lookup tables database.

BRIEF DESCRIPTION OF THE DRAWINGS

The accompanying appendices and/or drawings illustrate various non-limiting, example, inventive aspects in accordance with the present disclosure:

FIGS. 1A-B show a system overview and data-flow in one embodiment of system operation;

FIG. 22 shows an implementation of a user interface showing system requirements in one embodiment of system operation;

FIG. 23 shows an implementation of a user interface for managing existing quotes and applications in one embodiment of system operation;

FIG. 24 shows an implementation of a user interface admitting entry of an effective date of a policy in one embodiment of system operation;

FIG. 25 shows an implementation of a user interface for selecting a producer code in one embodiment of system operation;

FIG. 26 shows an implementation of a user interface for completing a quote form in one embodiment of system operation;

FIG. 27 shows an implementation of a user interface showing an error message in one embodiment of system operation;

FIG. 28 shows an implementation of a user interface showing a completed quote in one embodiment of system operation;

FIG. 29 shows an implementation of a user interface for generating the application graphical user interface in one embodiment of system operation;

FIG. 30 shows an implementation of a user interface for application submission in one embodiment of system operation;

FIGS. 33A-E show one implementation of adding a new field to a workbook that is evaluated by a new cxLogic ruleset in one embodiment of system operation;

FIGS. 34A-B is of a block diagram illustrating embodiments of the present invention of a Provider controller;

Figure 1B:
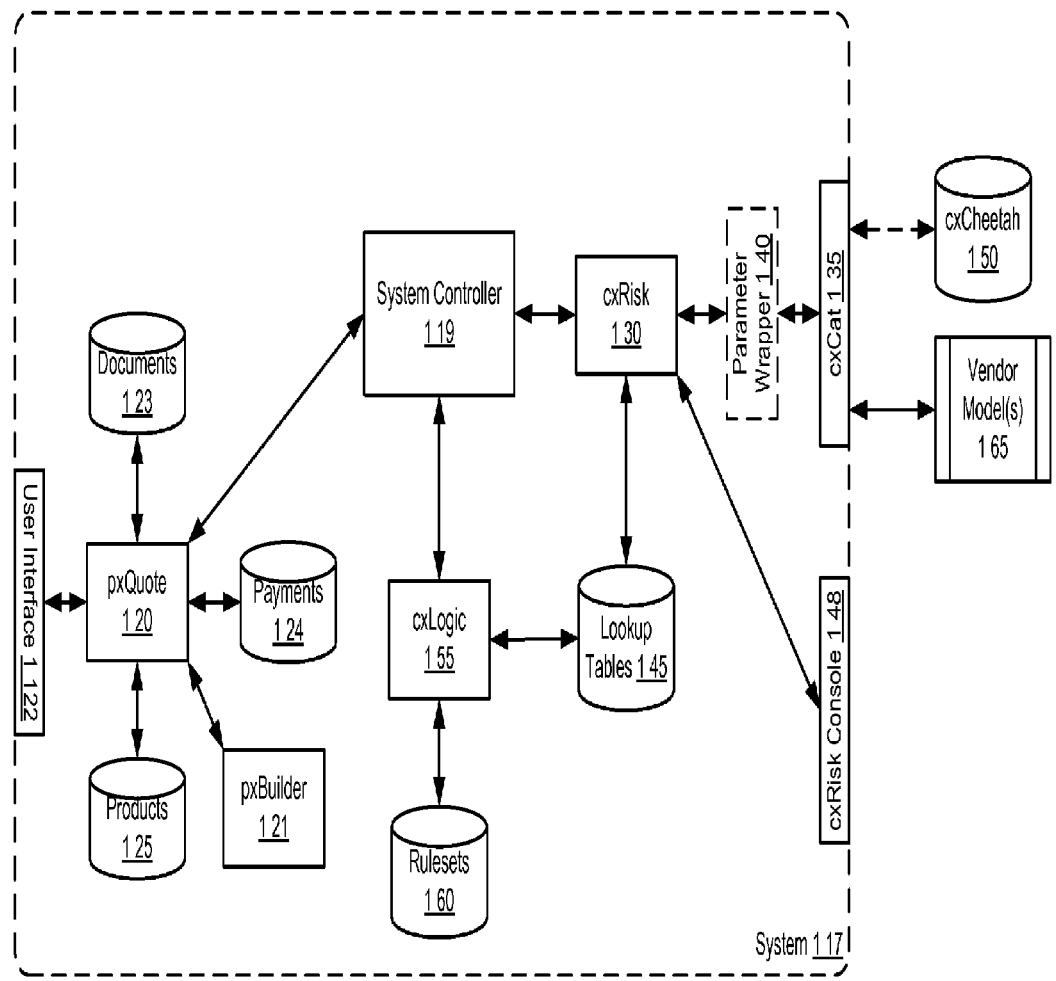

APPENDIX 1 provides details of one embodiment of system operation;

APPENDIX 2 provides details of one embodiment of system operation;

APPENDIX 3 provides details of one embodiment of system operation; and

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In order to address various issues such as those discussed above, the invention is directed to apparatuses, methods, and systems for building a risk evaluation product. For purposes of this specification, the term "insurance" products refers to insurance products as well as reinsurance products. Reinsurance is a way for an insurance company to protect itself from losses due to a catastrophic event, and reinsurance costs can be an important consideration in deciding whether or not to bind a given candidate risk or and/or issue an insurance policy. It is to be understood that depending on the particular needs and/or characteristics of an insurance carrier, vendor model, candidate risk, or system user, various embodiments of these systems and methods may be implemented that enable a great deal of flexibility and customization. The instant disclosure discusses an embodiment of the system within the context of assessing and binding risks. However, it is to be understood that the system described herein may be readily configured/customized for a wide range of applications or implementations. For example, aspects of the system may be configured for use in various other rule management, portfolio analysis, and price quoting applications.

The following figures and associated discussion illustrate, by way of example only, particular embodiments and implementations of system operation.

System Overview

FIG. 1A shows an overview of system operation, including various entities, components, modules and/or the like comprising and/or coupled to the system, in one embodiment. An insurance carrier may provide inputs 101 to a pxBuilder module 102 in order to generate a workbook 103 that describes a risk rating system (alternatively a "rater") that may be employed in the rating and/or otherwise evaluation of a risk (which may interchangeably be referred to herein as a "policy" or "insurance policy" for the insurance policies that may cover and/or bind the risk). The workbook (which may interchangeably be referred to herein as a "product") is, in one embodiment an XML document that specifies aspects of an insurance rating and/or implementation scheme, including such features as required and/or suggested user inputs, expressions (e.g., mathematical calculations), calls to lookup tables, calls to various logical and/or business rules, payment plans and/or schedules, policy documents, and/or the like. pxBuilder 102 may provide a user interface through which a carrier may enter information pertaining to an insurance product and/or risk rating scheme in order to generate the workbook 103.

A completed workbook 103, embodying a risk rating scheme, may be passed to a pxQuote module 104, which is equipped to interpret the XML data contained in the workbook and implement the corresponding risk rating scheme. Based in part on workbook data, pxQuote may generate a user interface (UI) 105 that is capable of receiving user inputs 106 (e.g., from an agent of the insurance carrier) describing characteristics of a candidate risk, and generating a corresponding quote for binding that risk 107. The pxQuote module 104 is also capable of supplying policy documents, managing payment schedules, and/or otherwise implementing or administering the risk rating scheme.

The workbook 103 supplied to pxQuote 104 may specify, among other things, a set of rule calls 108 that call to rules in a cxLogic module 109. The cxLogic module contains and/or provides access to a number of rules, contained in a rulesets database 110, and is equipped to evaluate queries 108, such as may be based on user inputs 106, based on those rules. For example, a given workbook pertaining to an insurance product may query a user for details of the composition of construction materials for a building and call to a rule checking for the presence of asbestos within those materials. The input information and the call are sent to cxLogic, which evaluates the rule and returns an evaluation 111 (e.g., True, False, Error, Disabled, and/or the like) to pxQuote 104. The result of the rule evaluation may then be interpreted by pxQuote, in light of the workbook 103, to proceed with further risk rating and/or processing. For example, if the rule pertaining to asbestos described above is evaluated to True, the workbook may specify that an insurance and/or reinsurance policy should not be granted for the candidate risk regardless of other risk characteristics, and the pxQuote module will subsequently implement the restriction and provide the user with an indication thereof.

For nominally eligible risks, the pxQuote module 104 may orchestrate the rating, scoring, and/or other evaluation of risk characteristics in conjunction with the cxRisk module 113. cxRisk may be configured to receive risk characteristics and relay them, via an interface module cxCat 114, to one or more external vendor models 115 capable of generating event loss tables (ELTs, or alternatively referred to as event loss files or ELFs) that represent estimated loss distributions and characterize the likelihoods and/or probabilities associated with particular events and/or perils which may be relevant to the candidate risk. For example, a candidate risk may relate to providing flood insurance for a building in the Mississippi Valley, and an ELT for such a risk may include loss distribution of each simulated event and an estimated likelihood of flooding, extreme rainfall, levee failure, and/or the like. In another implementation, the ELT may further estimate the loss to the insurance carrier for different events and/or perils based on the degree of coverage provided. Vendor models may receive candidate risk characteristics from cxRisk and output ELTs. Alternatively, cxRisk may use candidate risk characteristics to query entries in a large database of existing ELTs and/or event likelihood data, referred to herein as cxCheetah 115, in order to expedite the rating process. Based on consultation with either the vendor models or cxCheetah 115, the cxRisk module 113 may determine a set of financial metrics 116 that characterize the candidate risk. These metrics may be passed back to pxQuote 104 for use in generating a quote. pxQuote 104 may further query cxLogic 109 again based on the financial metrics to determine whether binding a given candidate risk is desirable based on the financial metrics determined by cxRisk 113. In an alternative implementation, cxRisk may be configured to communicate directly with cxLogic. This may be advantageous, for example, in allowing cxLogic to employ cxRisk directly in the evaluation of a rule related to a risk rating and/or financial metric.

The approach to constructing and implementing risk rating products disclosed herein provides a number of advantages over existing insurance rating systems. In the past, rating products were hard coded with attributes of the risk rating scheme, and any modifications, adjustments, or new products required the assistance of a trained programming specialist. The present invention eliminates that requirement by providing a set of modular tools that assist non-specialists in the on-the-fly generation and implementation of risk rating products. Furthermore, the modularity of the approach facilitates the modification and/or updating of a system component without affecting the operation of other components.

Further aspects of system operation, including detailed information surrounding each of the system components, are discussed below.

System Data Flow

FIG. 1B shows data flow between various entities comprising and/or in communicative contact with the system 117 in one embodiment of system operation. A system controller 119 may serve as a central element in the system 117, facilitating much of the functionality described herein as well as providing a conduit that carries and/or directs communications between other system components. The system controller 119 may be communicatively coupled with a pxQuote module 120 to exchange a variety of data such as risk characteristic data and/or assessments, financial metrics, rulesets and/or evaluations, lookup table values, risk binding quotes, workbooks, and/or the like. The pxQuote module is configurable to perform a number of tasks, including generate and manage operation of a user interface 122, generate risk raters, receive and process risk characteristic inputs, communicate with cxLogic and cxRisk, track and process customer payments, supply documents pertaining to a risk or policy, and/or the like. The pxQuote module may further be coupled to a pxBuilder module 121, which provides visual tools for users to generate workbook XML documents (or "products") representing risk rating schemes. The workbooks/products may be saved, edited, reused, modified, and/or the like and are interpreted by the pxQuote module to implement the underlying rating scheme (e.g., receive inputs, call rules, call lookup table values, maintain payment schedules, deliver policy documents, and/or the like).

A workbook or product is a fully descriptive, abstract representation of an insurance product which includes all of the components necessary to rate and bind an insurance policy. These may include but are not limited to:

Information about the Product, such as name/label/the person that created the document and other top-level information.

Base criteria for that Product. In one embodiment, the base criteria are the user designated attributes which are used to determine which Product the software application should use for rating. The base criteria are the unique identifying attributes of the Product, such as (but not limited to) Product Name, Date and Insurance Carrier. The software engine and Insurance Product schema can handle and work at run-time with any number of user supplied base criteria.

Description of inputs for that Insurance Product. In one embodiment, the inputs section is a semantic description of all of the inputs in force for that product (using the xForms mark-up language), including the Quote and Application forms. This includes validation for min and max values, length, data type, enumerated values, and other semantic descriptions of the input data. In addition, the model is housed in the input section of the Product, which details the exact structure of the XML document that the server requires for communicating with it. Each interfacing client then interprets the input descriptions into their interface language for display to the user, as well as the model for the exact structure of the document to use to send to the server as a request for a rate via a Policy Request.

Table data. In one embodiment, an XML representation of all table look-up data needed to process the insurance rate is housed in the Insurance Product. Examples of this data are base insurance rates which are then modified according to the data sent in the Request.

Ruleset references. In one embodiment, each Insurance Product houses the references to Rulesets, along with the action that pxQuote's rating server should take upon a triggering evaluation. This controls how the pxQuote platform will block policies containing offending data, or be used to flag a policy for review, or inform the agent with specific text.

Rating filters. In one embodiment, an Insurance Product contains rating filters that will drive additional logic either before (Pre-rating filter) or after (Post-rating filter) rating the insurance policy. Examples of this include processing rulesets, calling external services such as cxRisk to obtain additional data needed for rating the policy, and electronic payment processing before binding the policy.

Description of the Submission form. In one embodiment, the Quote and Application forms are described semantically in the Product XML, which allows clients to process this into their native interface elements for display to a user (process described above.) In an alternative embodiment, there is an additional level of abstraction added, via an xForms semantic description, to the Submission form. This allows business users to describe the elements, layout, payment plans accepted and submission process within an Insurance Product. There are additional nodes capturing the following: a semantic description of input elements to be displayed on the Submission form (such as name on credit card, check name, billing address); description of payment plans that should be offered for that product; variables that need to be mapped for display to the agent (such as payment amounts per plan selected); any confirming text that the agent must acknowledge before binding the policy; background or metadata required to process a payment, such as merchant account for that Carrier/Product or payment gateway data (Verisign data); links to additional static information housed on the business website, such as privacy and refund policies and descriptions of the payment plans; note—the payment data-structure to be sent to the server on a binding request is already accounted for in the current input model, as it is a part of the PolicyRequest.

Abstraction of the document generation thresholds. In one embodiment, the server exposes which documents are available for the current version of the policy via the creation of a node in the Insurance Policy, created from some logic housed outside of the Insurance Product. In an alternative embodiment, that logic is moved out of code and into the Product. This allows business users to interact with the Product directly to alter the logic to show or hide a document for a policy state, or introduce an entire new document to the policies rated against a Product, without a software enhancement. Generally, the available documents are dictated by the state of the policy, and are often keyed off the following: the presence and value of flags on the policy (such as submitted for offline payment or issued flags); the state of the policy (e.g., bound, quote, application, etc.), percentage complete, and/or the like.

The pxQuote module 120 may further be coupled to a documents database 123, containing documents that are tied to an insurance product based on carrier. Each insurance carrier utilizing the system may have a record of which documents to show at a certain percentage of the quoting process, and in which order. In one embodiment, the XML specifying these documents for a particular carrier (e.g., Insurance, Inc.) may take a form similar to the following example:

```
<InsuranceCarrier archived="false" id="II" label="Insurance, Inc." version="6">
    <DocumentTemplates>
        <CarrierSpecific>
            <Include DocumentTemplate id="II_QUOTESHEET" includeatpercentage="0" order="1"/>
            <Include DocumentTemplate id="II_APPLICATION" includeatpercentage="0" order="2"/>
            <Include DocumentTemplate id="II_AUTHORIZATION" includeatpercentage="0" order="3"/>
            <Include DocumentTemplate id="II_PREMIUMINVOICE" includeatpercentage="0" order="4"/>
            <Include DocumentTemplate id="II_PROOF" includeatpercentage="100" order="5"/>
        </CarrierSpecific>
    </DocumentsTemplates>
</InsuranceCarrier>
```

In the above data-structure, the id attribute references the id of the associated document template, the includeatpercentage attribute determines the point in the quoting process at which a document should be visible and/or supplied, and the order attribute determines in which order the documents should be displayed.

The pxQuote module 120 may further be coupled to a payments database 124, containing records of payments made with respect to a given risk and/or policy. In one embodiment, the XML specifying a credit card payment may take a form similar to the following example:

```
<payments totalamountpaid="2500" totalbalancedue="0" totalpremium="2500">
    <payment amount="2500" datetime="2007-07-18T12:13:50" method="creditcard" success="true">
        <creditcardinfo cardholdername="TEST CC USER" cardnumbermask="1111" cardtype="Vista" expirationmonth="01" expirationyear="2010">
            <processorresponse>
                <data transactionResult="ISLVN-AAABBBCCCDDD-20070718111322"/>
            </processorresponse>
        </creditcardinfo>
    </payment>
</payments>
```

In one embodiment, the XML specifying a check payment may take a form similar to the following example:

```
<payments totalamountpaid="2500" totalbalancedue="0"
totalpremium="2500">
  <payment amount="2500" datetime="2007-06-15T15:11:37" method=
check" success="true">
    <checkinfo checknumber="1111"
nameoncheck="TESTCHECK"/>
  </payment>
</payments>
```

The pxQuote module 120 may further be coupled to a products database 125, containing products, which are XML data documents which fully describe a risk rater, including the interface description, table lookups, processes, pricing logic, logic and/or business rules, expressions, and/or the like. A given carrier may interact with the user interface to generate one or more risk raters embodied and/or stored as products in the product database 125. In an alternative embodiment, carriers may generate risk raters via pxQuote and store products and/or raters in their own local databases. Table lookups specified within a given product may refer to entries in a Table Lookups database 145, containing data and or tables of data relevant to the rating of risks. Logic and/or business rules specified within a given product may refer to entries in a Rulesets database 160, containing rules (e.g., Boolean logic conditions) that may be evaluated based on user inputs, table values, system module outputs, and/or the like. Expressions specified within a given product may specify rating calculations which establish parameters that may be utilized to calculate and/or generate a quote. Aspects of pxQuote functionality for generating products is detailed in the discussion of the pxBuilder module below.

The system controller 119 may also be communicatively coupled with a cxRisk module 130 to exchange a variety of data such as risk characteristic data and/or assessments, financial metrics, risk portfolios, candidate risks, risk assessment criteria and/or procedures, and/or the like. The cxRisk module is configurable to perform a number of tasks, including communicating with vendor models (in one embodiment, this communication is performed through an intermediary interface module, cxCat), receiving and/or processing candidate risk characteristics and/or risk portfolio data, receiving and/or processing ELTs, determining financial metrics associated with a candidate risk, and/or the like. Further aspects of cxRisk are described in detail below.

In one embodiment, pxQuote 120 may access and/or utilize cxRisk 130 as a risk assessment engine for determining a set of financial metrics associated with a candidate risk. Examples of such financial metrics may include return on capital, return on equity, break-even premium, profit margin, and/or the like. pxQuote 120 may supply risk characteristic data (e.g., location of a property, construction characteristics, and/or the like for property casualty insurance) received via the user interface 122 to cxRisk 130, which may subsequently process that data, including possibly in conjunction with one or more third-party vendor models, to determine a set of financial metrics associated with the risk. An XML schema describing one embodiment of a data-structure that may be passed between pxQuote and cxRisk is provided in Appendix 1.

In an alternative embodiment, cxRisk functionality may be directly accessed and/or manipulated via a dedicated cxRisk console 148, configurable to accept inputs describing a given candidate risk and to display risk assessments, associated financial metrics, and/or the like. An example of a user interface for cxRisk in one embodiment of system operation is provided in Appendix 2.

The cxRisk module 130 may further be coupled to one or more vendor models 165, configured to receive risk characteristic data and provide estimates of likelihoods for various outcomes and/or contingencies that may affect one or more risks and/or insurance policies. For example, a vendor model may receive information related to the location and structural makeup of a building and determine the likelihood of structural collapse, flooding, earthquake damage, and/or the like. Vendor model output may, in one implementation, comprise one or more ELTs. Examples of possible vendor models operable in conjunction with the system include models provided by Risk Management Solutions (RMS), Applied Insurance Research (AIR), and/or the like. An exemplary XML document describing one embodiment of a data-structure that may be generated within cxRisk as a consequence of interaction with a vendor model is exhibited in Appendix 3.

The cxRisk module 130 may couple to the one or more vendor modules 165 through an intermediary interface, cxCat 135, which may serve to extract and/or package relevant information from cxRisk data-structures, communicate with the vendor models to send inputs and receive ELT data, prepare vendor model outputs for interpretation by the cxRisk module, and/or the like. In one implementation, cxCat 135 may operate in conjunction with a parameter wrapper 140, which may serve to translate system codes pertaining to risk characteristic data and/or the like into codes and/or other data formats recognizable by vendor models. In an alternative embodiment, cxCat may perform such data format conversions itself.

In another implementation, the cxRisk module may couple to a cxCheetah database 150 in addition to or in lieu of the one or more vendor models 165. cxCheetah may contain ELTs, events and associated likelihoods, probable loss estimates, and/or the like. The elements of the cxCheetah database 150 may be generated, for example, by submitting inputs related to a plurality of events, catastrophes, contingencies, and/or the like to the one or more vendor models and receiving and storing the ELTs associated therewith. In an alternative implementation, the cxCheetah database may be updated every time a new query is submitted to the vendor models and an ELT received in response. The cxCheetah database 150 may be coupled to the cxRisk module 130 through the cxCat 135 interface. In an alternative embodiment, the cxCheetah database 150 may be contained within the system 117.

The cxRisk module 130 may further be coupled to a Lookup Tables database 145 containing one or more tables of values relevant to risk rating, the determination of financial metrics associated with candidate risks, the evaluation of logical and/or business rules, and/or the like. Any of a wide variety of different types of data and/or tables of data that may be relevant to rating risks may be contained in the Lookup Tables database 145.

The system controller 119 may also be communicatively coupled with a cxLogic module 155 to exchange a variety of data such as logical and/or business rules and/or rulesets, rule evaluations, and/or the like. The cxLogic module 155 is configurable to receive and process rules and/or rulesets, such as may be input via the user interface 122 coupled to the pxQuote module 120, and to evaluate those rules based on additional inputs and/or stored data. Further aspects of cxLogic are discussed below.

The cxLogic module 155 may be coupled to the Lookup Tables database 145 to query data that may be relevant to the evaluation of a cxLogic rule. For example, a given rule may specify that risks within a particular zip code are not insurable. If the cxLogic module 155 receives risk characteristic data including a risk location, it may seek out a zip code table in the Lookup Tables database 145 to convert the location to a zip code in order to evaluate that rule.

The cxLogic module 155 may further be coupled to a rulesets database 160, containing input validation and logic and/or business rules and/or rule evaluations that may be processed by cxLogic.

In one embodiment, pxQuote 120 and/or cxRisk 130 may employ and/or access cxLogic 155 as a rules evaluation engine. cxLogic may contain with one or more rules, rulesets, data inputs, risk characteristics, and/or the like in order to have rules associated with a risk, business decision, and/or the like be evaluated thereby. In turn, cxLogic may supply a rule evaluation outcome (e.g., TRUE or FALSE) to the querying module, which may use that outcome in its own subsequent operation.

Within various embodiments and/or implementations, any or all of the aforementioned system components, modules, and databases may be reconfigured as components of the system controller 119 itself. Further aspects and embodiments of system, system controller, and system component operation are described below.

System Logic Flow

Figure 2:
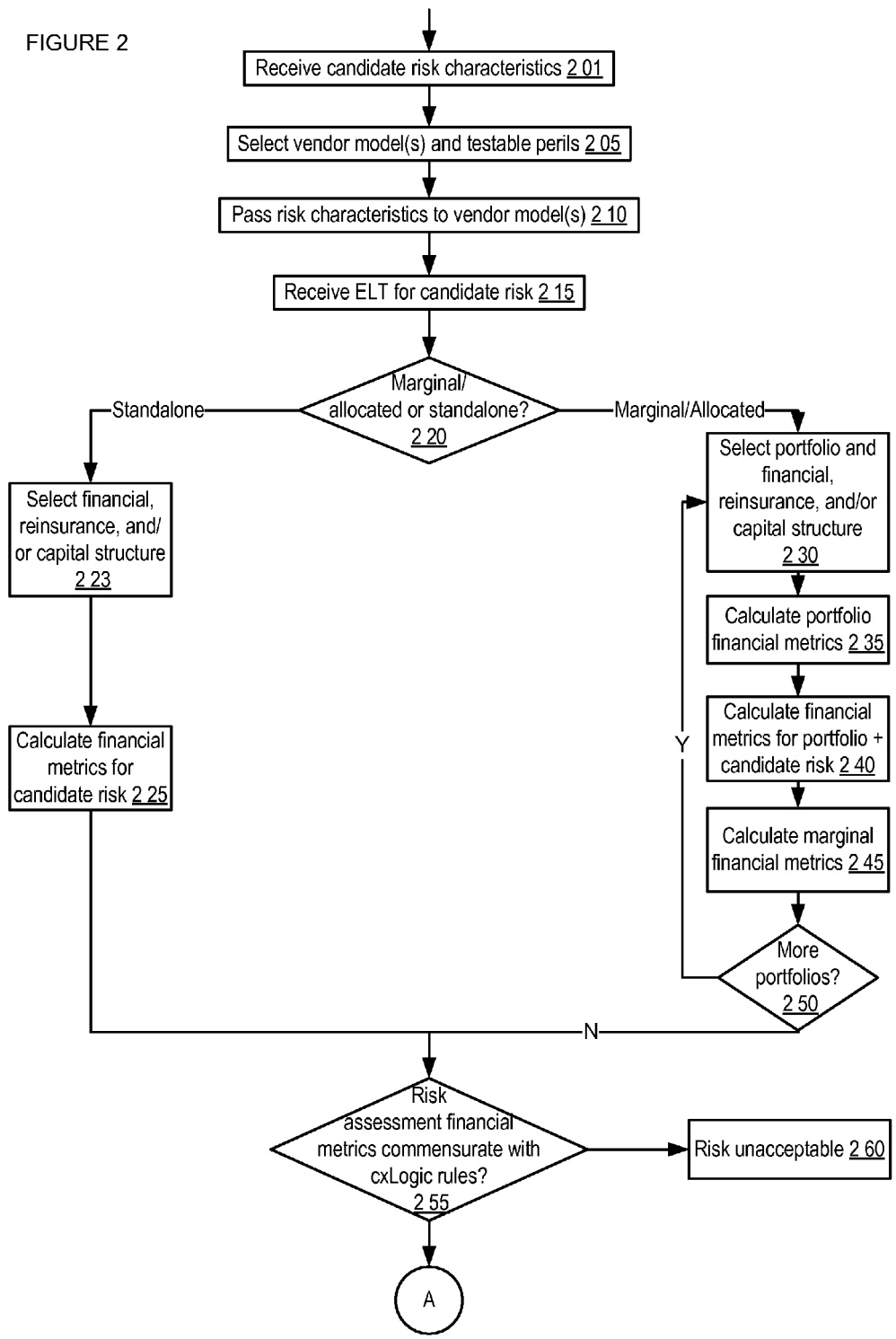
FIG. 2 is a flow chart illustrating steps of a method according to one embodiment of system operation.

FIG. 2 shows an implementation of logic flow in one embodiment of system operation. The system receives at 201 a set of inputs related to the characteristics of a candidate risk, such as via the user interface 122 established via the pxQuote module 120 in conjunction with one or more product datastructures in the products database 125. For example, in the context of an application of the system to property casualty insurance, input data characterizing a candidate risk may comprise property location, structural data, presence of an emergency sprinkler system, and/or the like. At 205, the system receives a selection of one or more vendor models (e.g., RMS or AIR models) as well as a specification of testable perils relevant to the candidate risk and/or vendor models. In the property casualty insurance application described above, a relevant testable peril may be a flood, an earthquake, and/or any other catastrophic or property damaging event that may be considered in rating the candidate risk. The risk characteristics are passed to the vendor models 210 by the cxRisk module 130 via cxCat 135 for evaluation and determination of associated ELTs with respect to the specified testable perils. In an alternative embodiment, the risk characteristic data and/or selected testable perils may be used to query the cxCheetah database 150 in order to extract ELT data.

The resulting ELTs for the candidate risk are returned at 215, and a determination is made at 220 as to whether the assessment of financial metrics associated with the risk is to be made as a marginal/allocated or standalone assessment. A marginal/allocated risk rating or assessment is understood herein to comprise a rating of a candidate risk in the context of an existing risk portfolio, while a standalone risk rating comprises a rating of a candidate risk in isolation. If a standalone risk assessment is selected and/or specified, the cxRisk module 130 selects and/or receives a selection of a financial structure, reinsurance structure, capital structure, and/or the like 223 and determines values for a set of financial metrics for the candidate risk at 225. If, on the other hand, a marginal/allocated scoring is selected and/or specified, then a portfolio and a financial structure, reinsurance structure, capital structure, and/or the like are selected at 230. Financial metrics associated with the portfolio in isolation (i.e., without the addition of the candidate risk) are determined at 235, and financial metrics for the portfolio with the addition of the candidate risk are determined at 240. These two sets of financial metrics are compared at 245 to calculate a set of marginal and/or allocated financial metrics associated with the addition of the candidate risk to the given portfolio. The system determines if there are additional portfolios for which marginal and/or allocated financial metrics should be determined at 250.

At 255, the cxLogic module 155 and/or rulesets database 160 may be queried based on determined risk assessment financial metrics to determine whether those metrics are commensurate with the relevant rules. For example, a particular rule may return a TRUE value only if the return on capital for a given candidate risk exceeds a pre-specified minimum threshold. The financial metrics associated with the candidate risk yield a rule evaluation profile that may be passed back from cxLogic to cxRisk or pxQuote for interpretation, and a candidate risk with an incommensurate rule evaluation profile may be interpreted by one or both of these modules as an unacceptable risk 260 (i.e., a risk that an insurance carrier should not bind).

Determination and/or calculation of financial metrics within either a standalone, marginal, or allocated context may proceed according to a variety of known methods. An example of how such calculations may be performed is provided below.

Figure 3:
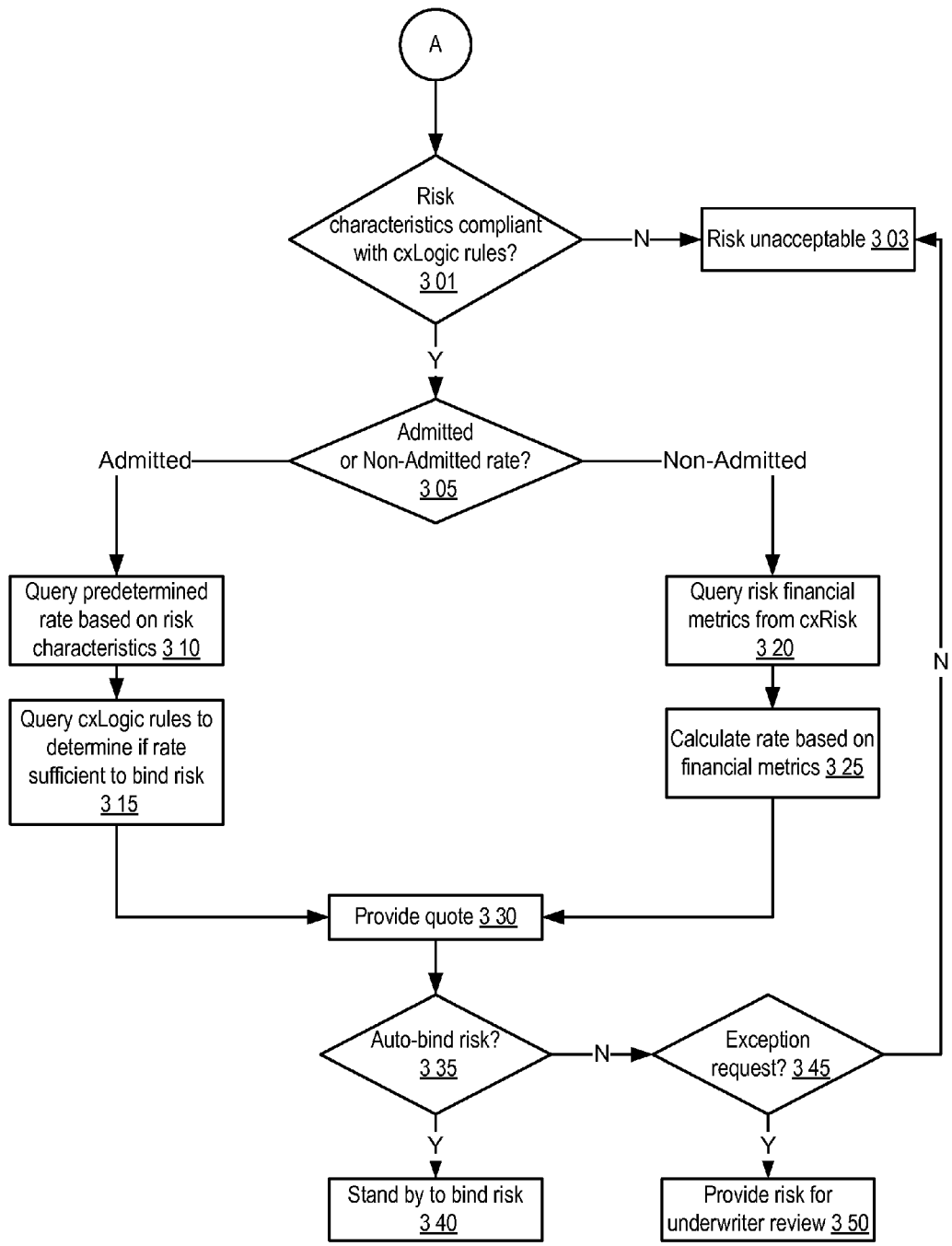
FIG. 3 is a flow chart illustrating steps of a method according to one embodiment of system operation.

FIG. 3 shows an implementation of further logic flow for one embodiment of system operation. The logic flow in FIG. 3 may receive as input the data collected, created, and/or processed in FIG. 2. At 301, the system (e.g., by means of the cxLogic module 155) determines whether specified characteristics of the candidate risk are compliant with rules enforced by cxLogic 155 and/or contained in the rulesets database 160. For example, a particular rule in the context of a property casualty insurance application of the system may specify that no risks associated with properties in San Francisco having more than 25 stories are to be bound. In evaluating this rule at 301, the system would check the risk characteristic data (e.g., the number of stories and the location for the property) to determine whether or not the risk is compliant. If a candidate risk is deemed noncompliant with an essential rule, then the risk is deemed unacceptable 303. For compliant candidate risks, the system proceeds to 305, wherein a determination is made as to whether an admitted (i.e., pre-determined) or non-admitted (i.e., free) rate is applicable to the candidate risk.

In the former case, the system queries a pre-determined rate based on candidate risk characteristics 310. For example, rates for a particular class of candidate risks may be dictated by statute, and determination of the appropriate rate for a given risk may comprise comparing the characteristics of that risk with a rate table such as may be stored in the Lookup Tables database 145. Once the appropriate pre-determined rate is discerned, the system may query a set of cxLogic business rules to determine whether or not to bind the candidate risk given that rate 315.

In the latter case, the system queries the risk financial metrics determined by cxRisk 320. Based on these financial metrics, the system may compute an appropriate rate or premium for the candidate risk. In one implementation, the computation of an appropriate rate for the candidate risk may also consider other risk characteristics and/or the evaluation of cxLogic rules. The computation of an appropriate rate for the candidate risk may be performed in a variety of different ways within different implementations of the system. In one implementation, risk pricing may proceed according to the following formula:

$$P = \frac{r \times \min(PML, L) + \frac{r}{2} \times (L - \min(PML, L)) + AAL(L) + O}{1 - ER}$$

Where P is a risk and/or policy premium, r is a rate-on-line based on geographical territory, L is a policy limit requested in excess of the deductible, PML is a probable maximal loss at a given return period in excess of the deductible, AAL(L) is an average annual loss below the policy limit (L) in excess of the deductible, ER is an expense ratio, and O represents any other expenses.

The rate determined at either 310 or 325 is provided as part of a quote for the candidate risk at 330. In one implementation, the quote is only provided if the risk is bound. A determination is made at 335 as to whether or not the risk can be automatically bound based on the financial metrics, risk characteristics, cxLogic rules, and/or the like. If so, then the system stands by to bind the risk at 340. In one implementation, the system may provide a message to a system user that the risk is bindable. In another implementation, the system may automatically bind the risk and issue the appropriate proof of insurance and/or other documents (e.g., from the documents table 123) to a customer. If, on the other hand, the system cannot automatically bind the risk, then a determination is made at 345 as to whether an exception request has been made and/or received. If so, then the candidate risk may be set aside and/or provided for underwriter review 350. Otherwise, the risk is deemed unacceptable 303.

Risk Analyzer Subsystem [cxRisk]

As used herein, references to "cxRisk" mean the described, inventive processes for evaluating financial metrics associated with risks and/or insurance policies. Among the financial metrics that may be considered and/or determined by cxRisk are return on capital, profit margin, return on equity, break-even premium, probable maximal loss, average annual loss, reinsurance premium, adequate premium, capital required, profitability, rate adequacy, and/or the like.

cxRisk allows for the calculation of financial metrics for one or more risks based risk characteristic data gathered from user inputs and probabilistic distributions of loss-generating events and/or outcomes. Based on these financial metrics, cxRisk can score candidate risks in a number of different ways within various embodiments of system operation. Among the ways that candidate risks may be scored by cxRisk are marginal, allocated, and standalone scoring. In marginal scoring, a candidate risk is rated by evaluating the impact of adding that risk to a specific portfolio. The rating may, for example, be determined in light of the change in predicted loss, marginal values in financial metrics such as profit, and/or the like. Allocated scoring is similar to marginal scoring, in that the candidate risk is considered within the context of an existing portfolio, however allocated scoring does not give the candidate risk the entire benefit of diversification that marginal scoring provides. Instead, allocated scoring allocates a portion of the losses, reinsurance costs, capital, and/or the like associated with the candidate risk. These amounts are generally distributed by the candidate risk's contribution to the losses of the portfolio. Finally, standalone scoring considers the financial metrics associated with the candidate risk in isolation (i.e., not in the context of an existing portfolio). Further details surrounding risk rating and/or scoring are provided below.

cxRisk provides an engine through which external systems can perform risk rating and/or calculate financial metrics for candidate risks. In one embodiment, cxRisk may perform these functions in real-time.

In accordance with embodiments of cxRisk, there are provided herein methods and systems for evaluating and/or determining financial metrics associated with candidate risks and/or insurance policies. As discussed above, cxRisk may operate in conjunction and/or cooperation with one or more other system components, modules, and/or databases. These include the cxLogic and pxQuote modules, aspects of which are discussed in greater detail below. The pxQuote module may interface with an insurance carrier, customer, the customer's designate, such as an agent. The cxLogic module may evaluate logical and/or business rules associated with the candidate risk, the collection and evaluation of data pertinent thereto, and/or the associated insurance carrier. The cxRisk component may use the information associated with the customer and/or carrier, the logical and/or rules, and certain database information and catastrophe applications and/or vendor models, as described below, whereby to calculate financial metrics associated with risks and/or insurance policies. The cxRisk component may also be configured to perform risk assessments, ratings, and/or calculations based on requests made directly from pxQuote. pxQuote can pass inputs directly to cxRisk for mathematical evaluations. These evaluations are then used in the quoting process of pxQuote. This process is detailed further below.

Figure 4:
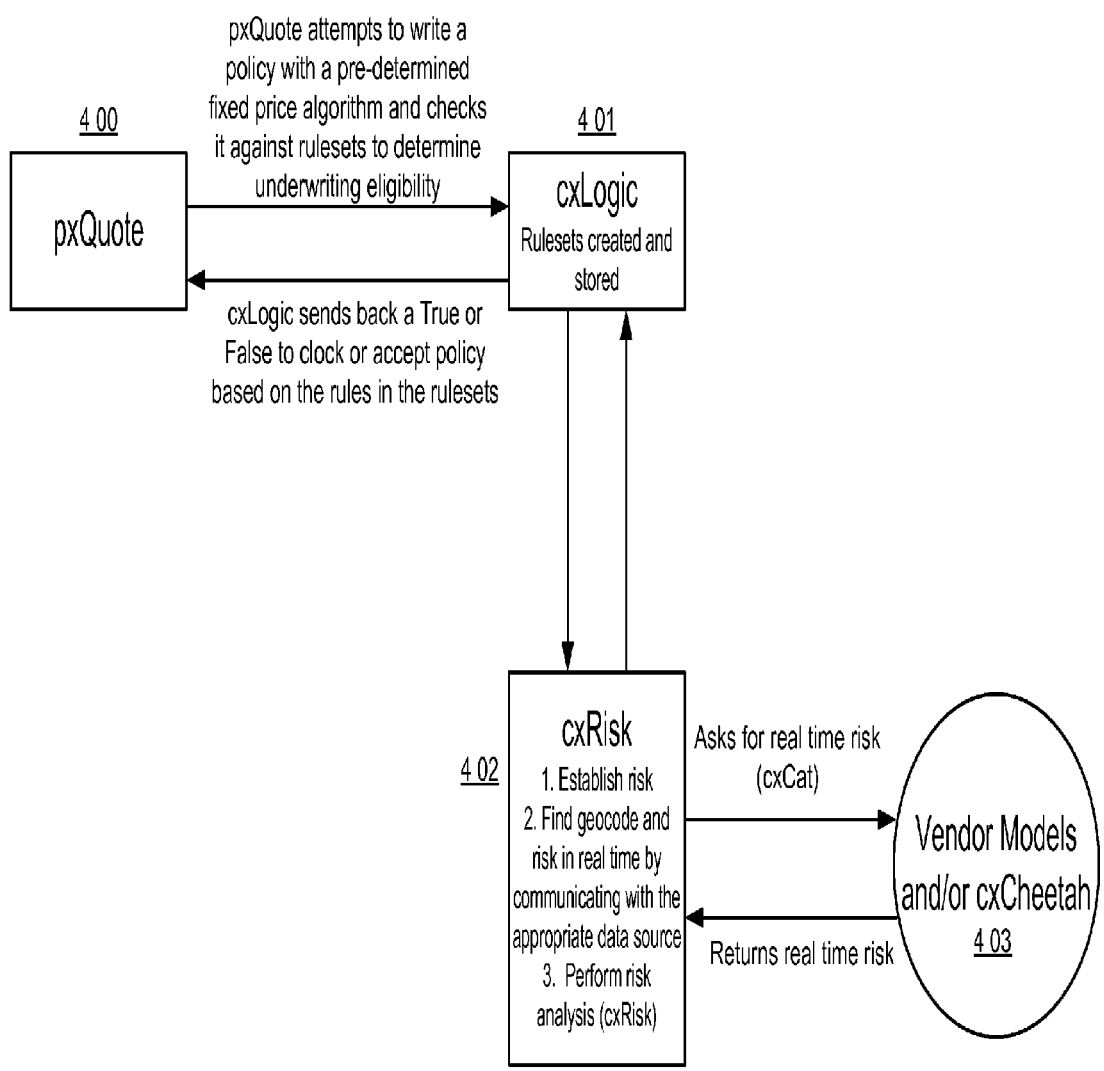
FIG. 4 denotes an implementation of data flow of cxRisk as it communicates with vendor models in one embodiment of system operation.

FIG. 4 denotes an implementation of system flow for cxRisk 402, in one embodiment of system operation, as it communicates with vendor models and/or cxCheetah 403 to determine financial metrics associated with a candidate risk, which can then be evaluated by cxLogic 401 and interpreted by pxQuote 400. cxCat comprises a component that can be called by cxRisk to communicate with the vendor models to run the catastrophe models for the candidate risk. After the models finish calculating the losses, cxRisk is able to retrieve the ELT for the candidate risk and may, in one implementation, store the results in its own database.

For purposes of illustration, the present invention may be described herein with respect to the processing of a property casualty insurance policy. It will be understood that the invention is more broadly applicable to a wide variety of risks, risk assessments, insurance and reinsurance policies, and/or the like.

With reference now to FIG. 4, cxRisk 402, uses user inputs to determine loss data using the vendor models. That loss data is taken to the cxRisk database for scoring against an insurance portfolio. To score a policy against a portfolio means to compare the combined portfolio (new policy+initial portfolio) with the initial portfolio. The impact on probable maximum loss (PML), average annual loss (AAL), and/or the like, is considered to calculate the change of reinsurance cost, net loss, profit, and/or the like. One embodiment of the cxRisk.getAnalysis process is further detailed in FIG. 5.

Figure 5:
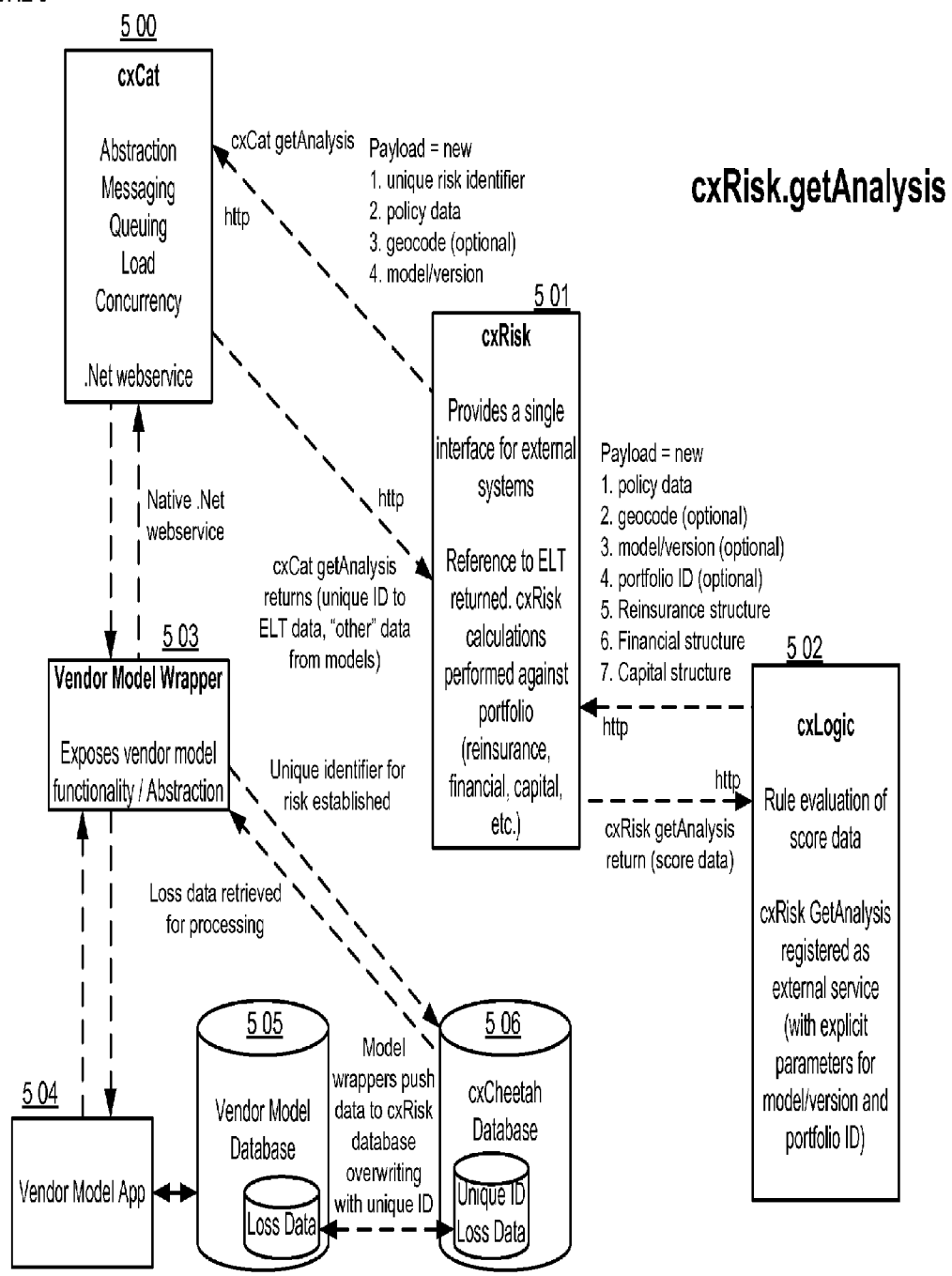
FIG. 5 shows an implementation of cxRisk GetAnalysis in one embodiment of system operation.

The cxRisk.getAnalysis process, one embodiment of which is shown in FIG. 5, may be undertaken by cxRisk to get the appropriate loss data via cxCat from cxCheetah and/or the affiliated vendor models. cxRisk 501 sends data to cxCat, 500, which in turn passes the data through the vendor model wrapper, 503, to the vendor model application, 504. This is in contrast to the embodiment shown in FIG. 1B, wherein the data from cxRisk is first passed through the wrapper before being passed to cxCat and the vendor model(s). The vendor models are capable of taking in user inputs and calculating and/or storing appropriate loss data in a vendor model database, 505. The loss data is then transferred to cxRisk, which may process the data for further use. In an alternative embodiment, cxRisk 501 may store it as loss data in the cxCheetah database, 506.

Financial metrics and/or candidate risk ratings determined by cxRisk can be used by both cxLogic and pxQuote. Within cxLogic, a rule can be created that requires a call to cxRisk to retrieve the appropriate information necessary to evaluate the rule. cxRisk will call out to cxCat to retrieve the information required for rule evaluation from the appropriate vendor model(s), which will then be passed back to cxLogic. cxLogic can then evaluate the rule (e.g., as a Boolean truth condition). pxQuote can then take its actions, either to block a policy or let it continue, based on cxLogic's evaluation. pxQuote can also communicate directly with cxRisk for necessary calculation and/or expression evaluations. This process is further described below.

Figure 6:
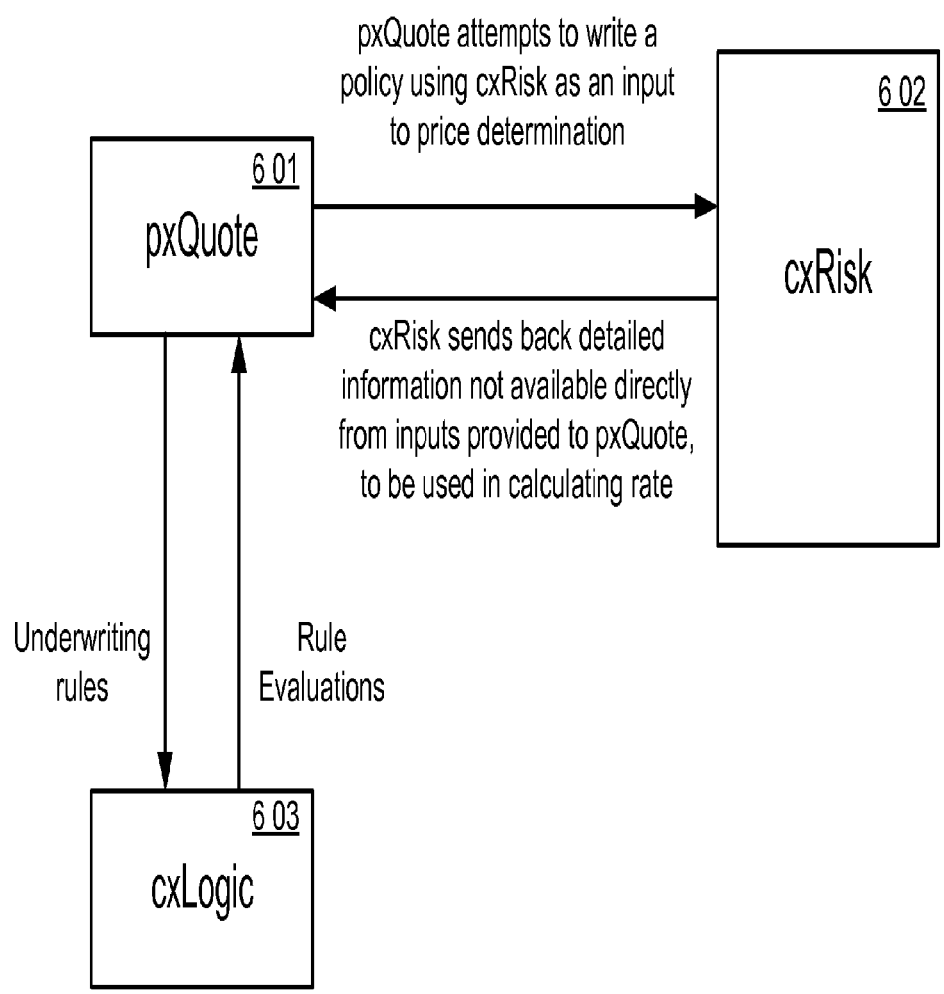
FIG. 6 shows an implementation of data flow for the rate determination process in one embodiment of system operation.

The rate determination process, an embodiment of which is detailed in FIG. 6, shows pxQuote, 601, sending information directly to cxRisk 602 for expression evaluations. pxQuote can gather user inputs, but in order to perform certain calculations, it may depend on cxRisk in certain embodiments. The necessary inputs are passed from pxQuote to cxRisk, which then performs the appropriate calculations of candidate risk financial metrics based on the user inputs. These calculations are then passed back to pxQuote, which can use them to determine an appropriate rate. cxRisk may thus be configured to operate as a mathematical engine to drive the rating process by accessing probabilistic loss data and determining resulting financial metrics, which in turn may be used within pxQuote to generate a quote. pxQuote 601 may further communicate with cxLogic 603 to supply rulesets and receive rule evaluations related to characteristics and/or financial metrics associated with a candidate risk or policy.

The detailed calculations performed by the cxRisk function illustrated at 402, 501 and 602 in FIGS. 4, 5 and 6, respectively, are shown and described below.

While the invention has been shown and described with respect to the determination of financial metrics associated with issuing a property casualty insurance policy, it is not thus limited. It will be apparent to the reader that the invention is equally applicable to evaluating the financial metrics associated with the issuance of insurance policies for different types of products and services in different types of environments.

There have thus been provided new and improved methods and systems for quickly, easily and accurately generating insurance quotes based upon a determination of financial metrics of an insurance product, rate adequacy, and other mathematical metrics. In response to a request for a policy, the probability of loss associated with that new insurance policy is determined in real-time through the use of vendor models. The subsequently determined profit estimates may then be used to make a decision as to whether or not to issue the policy as well as how to price the policy.

Rule Evaluating Subsystem [cxLogic]

Logical functions and operations, for example in the form of Boolean logic operations, are used pervasively throughout many different business processes. In different embodiments, rules may be established and used for the analysis and resolution of a one-time issue, or they may be established and used for a period of time to facilitate an on-going situation.

For example, and without limitation, in the processing of insurance information it is often necessary to test new data against established rules, whereby to facilitate the making of a decision. Such rules may be established and used, for example, in the determination as to whether or not particular insurance policies are to be issued to applicants.

In many instances, it is necessary for rules-based analysis to retrieve and utilize supporting data and information, for example from third party information sources. Depending on the particular application of a rules-based analysis, it may be necessary to periodically change either or both of the ruleset and the considered data.

Using known rules authoring and analysis tools, their exist today significant challenges associated with both establishing and changing logical rules used in different business environments. In many instances, such rules are prepared in complicated, specialized computer programming languages. They require the support of an expert to both establish and change. Further, the retrieval and usage of data by the ruleset is often complicated and challenging. Such linking, or retrieval of data into the rules-based analysis, typically requires significant manual intervention, often by a specialized expert.

cxLogic addresses the challenges associated with known rules offering and analysis tool sets. It further has the advantage of providing improved, user-friendly tools with which business persons can author, analyze, change, and import data into rules, and is capable of evaluating rules that are easily integrated by leveraging existing protocols and data communication standards and interfacing with other systems in a loosely-coupled fashion and without a priori knowledge of other systems' data requirements.

As used herein, the term "cxLogic" describes methods and systems for facilitating, in various embodiments, the drafting and analysis of rules, the integration of data and rules and the broadcasting of user interfaces for evaluating incoming information against logical rules, as described below.

cxLogic allows for having constant rules that are otherwise too often difficult for business users to create, edit, and implement in real-time. cxLogic allows a business user to author rules that can be evaluated in real-time, allowing for analytical power without a great deal of technological proficiency. Via a graphical user interface, cxLogic allows for creation of rule fields (field names that are used for rule evaluation), rulesets (collections of rules), and rules, as well as integration with external systems. As a rules evaluation engine, cxLogic rules may only require minimal knowledge to provide rule results. Each rule evaluation may be performed in isolation and in a stateless mode. In addition, cxLogic may evaluate a ruleset with just a set of data, without the additional component of a strict set of pre-defined fields. Should the fields sent to cxLogic be inadequate for rule evaluation, the server simply returns "Error" rather than the expected "True" or "False." By having no limitations to rule authoring, cxLogic solves the problem of needing technically savvy individuals to constantly edit software to reflect changes. cxLogic also has the power to call external applications or internet knowledge bases in order to gather information to make evaluations.

cxLogic is a rules evaluation engine that provides great control over the rule creation and evaluation process. It's function is not restricted to particular rules or rule types, and may evaluate anything which can be evaluated using logical rules. cxLogic allows users to create, edit, and test rules within rulesets via a graphical user interface, without having vast technical knowledge. cxLogic allows for external service integration, which enables cxLogic to communicate with other information providers, via standard HTTP protocol, to access external information in order to evaluate user created rules. In one embodiment, it has and requires no prior knowledge of rule fields nor any knowledge of external systems or how they work, and its determinations are based on user rules and inputs.

As an overview, a user of the cxLogic rules evaluation engine, implemented in the described embodiment as a software product, manipulates a user interface to the computing system supporting the software. Rulesets may be created by choosing the create ruleset link, and specifying a name for the ruleset. A unique ruleset identification number is generated by cxLogic, and the ruleset is then stored in an XML database. Within rulesets, users can author and edit rules without affecting the integration with external systems.

cxLogic is an HTTP-based rules evaluation server that does not require any prior knowledge of the fields submitted in order to evaluate user rules. It is powerful enough to evaluate virtually anything. If rules require certain fields that are not submitted, cxLogic will evaluate a rule to "Error" instead of "Yes" or "No." The process of evaluation is now taken outside the realm of software development and given to the user. The user has the power to affect behavior through real-time rule authoring and evaluation.

Further as discussed below, cxLogic has the power to go elsewhere to retrieve data for rule evaluation. By calling external services, cxLogic can access information held in outside databases in order to accurately evaluate a rule. For example, by means of HTTP protocols, cxLogic can communicate with outside systems without physically being in the same location as the requesting system. Fields that are sent through cxLogic are evaluated without specifying a particular type of data for each field. The system understands differences in evaluations based on field context. It may, for example, discern the difference in behavior between a date field and a numeric field.

As described above, a user establishes a ruleset and rules. As part of establishing the rules, the user identifies any sources from which the data to be evaluated by the rules is collected. These may comprise, for example, third party web sites. The process by which a user identifies useful data within usable data fields on a Web site, and communicates that data field into a rule, comprises the consume process. The consume process allows users to strip form field names from any website and use them as rule fields within cxLogic, shown in 1210. The system is capable of retrieving the names of fields from external services and use those field names internally. These consumed fields can then be used to build rules and execute subsequent evaluations. Users can also edit the fields that have been consumed within cxLogic, in order to incorporate them with the rule building process. The consume process allows cxLogic to communicate information with any external service. However, users are not limited to form fields specific to external websites. Users may create their own form fields, as well as create groups of form fields, known as field sets, which allow users to group fields based on the integrating system.

Figure 7:
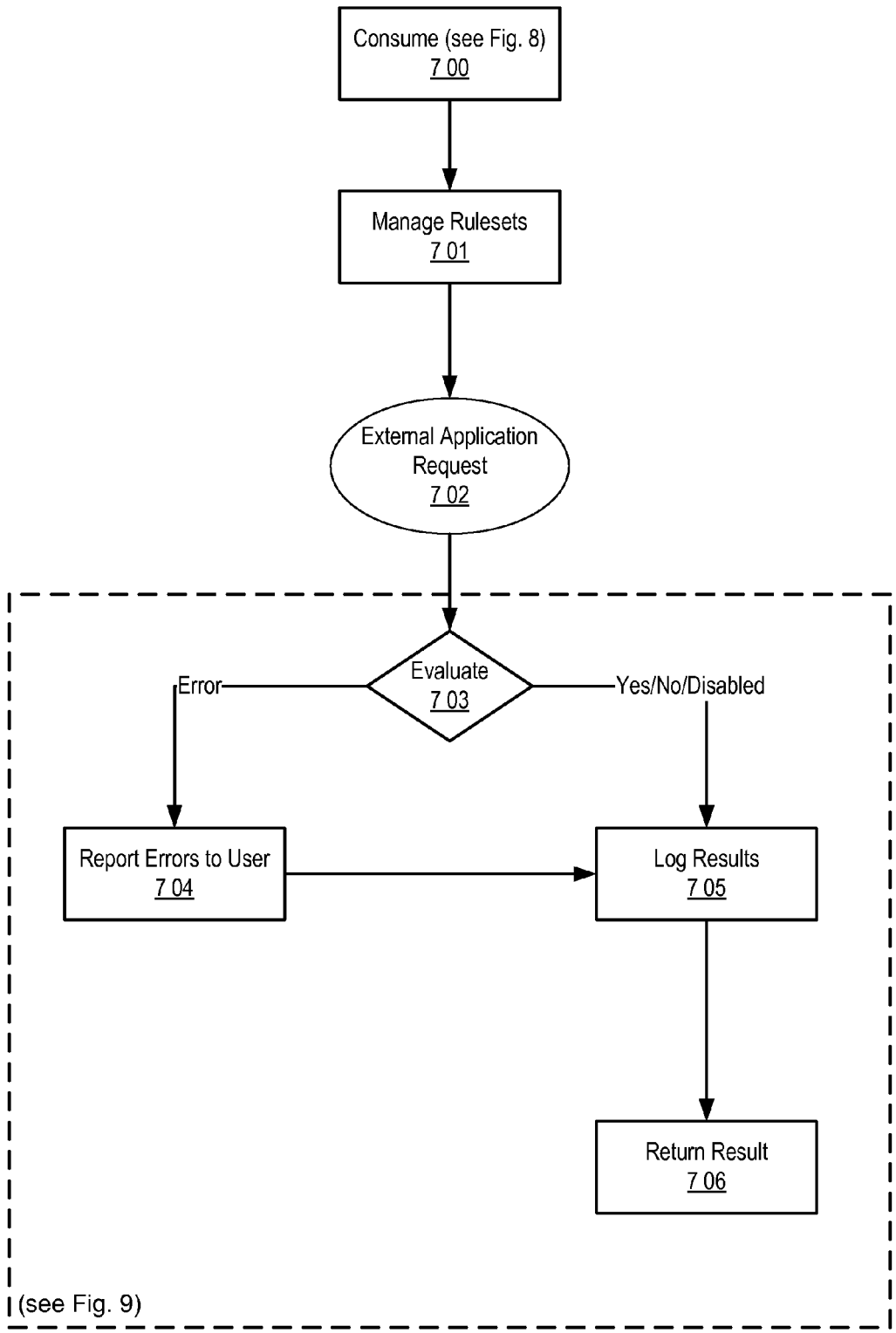
FIG. 7 shows an implementation of cxLogic process flow in one embodiment of system operation.
Figure 8:
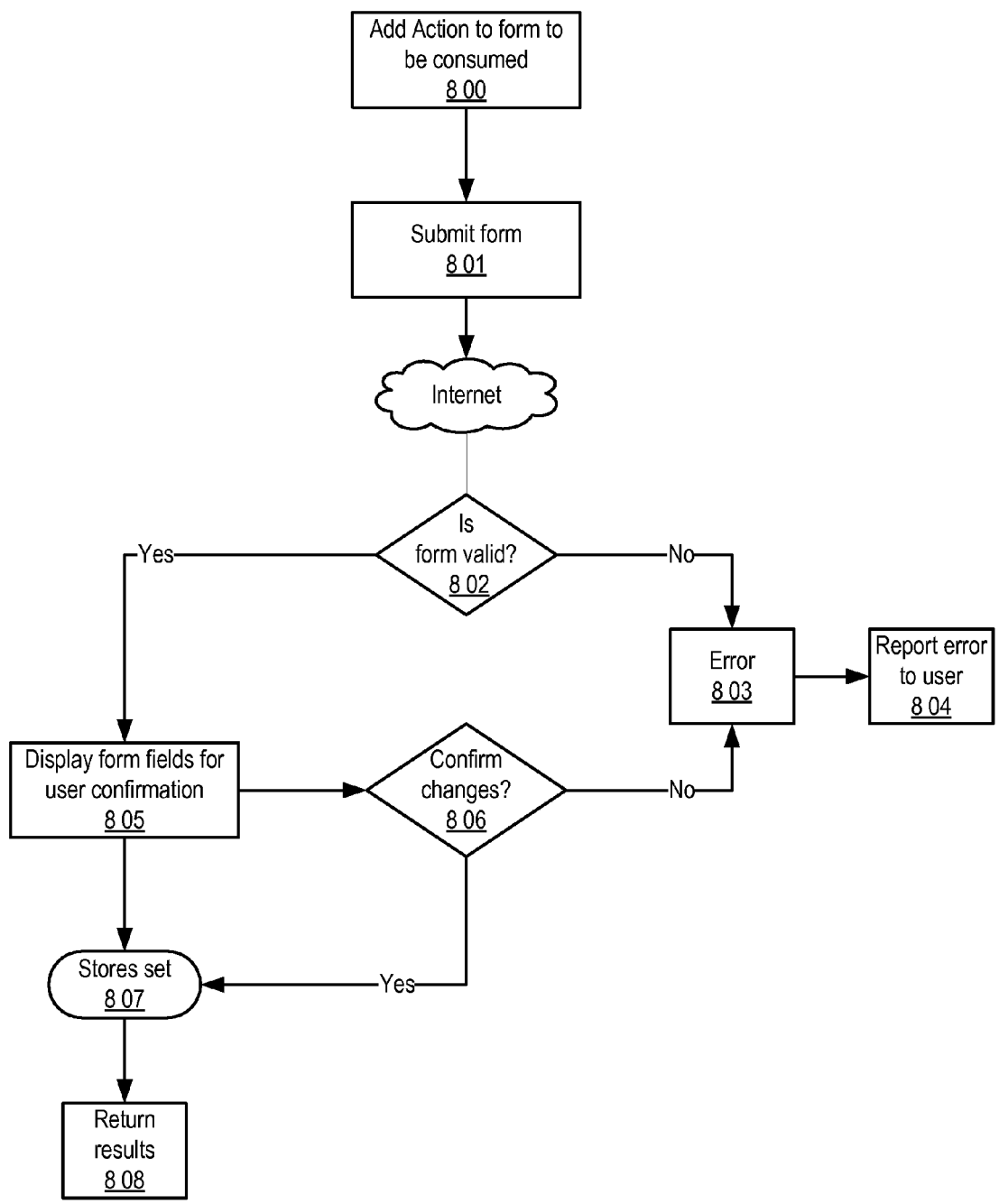
FIG. 8 shows an implementation of logic flow for the consume process of the cxLogic module in one embodiment of system operation.
Figure 13:
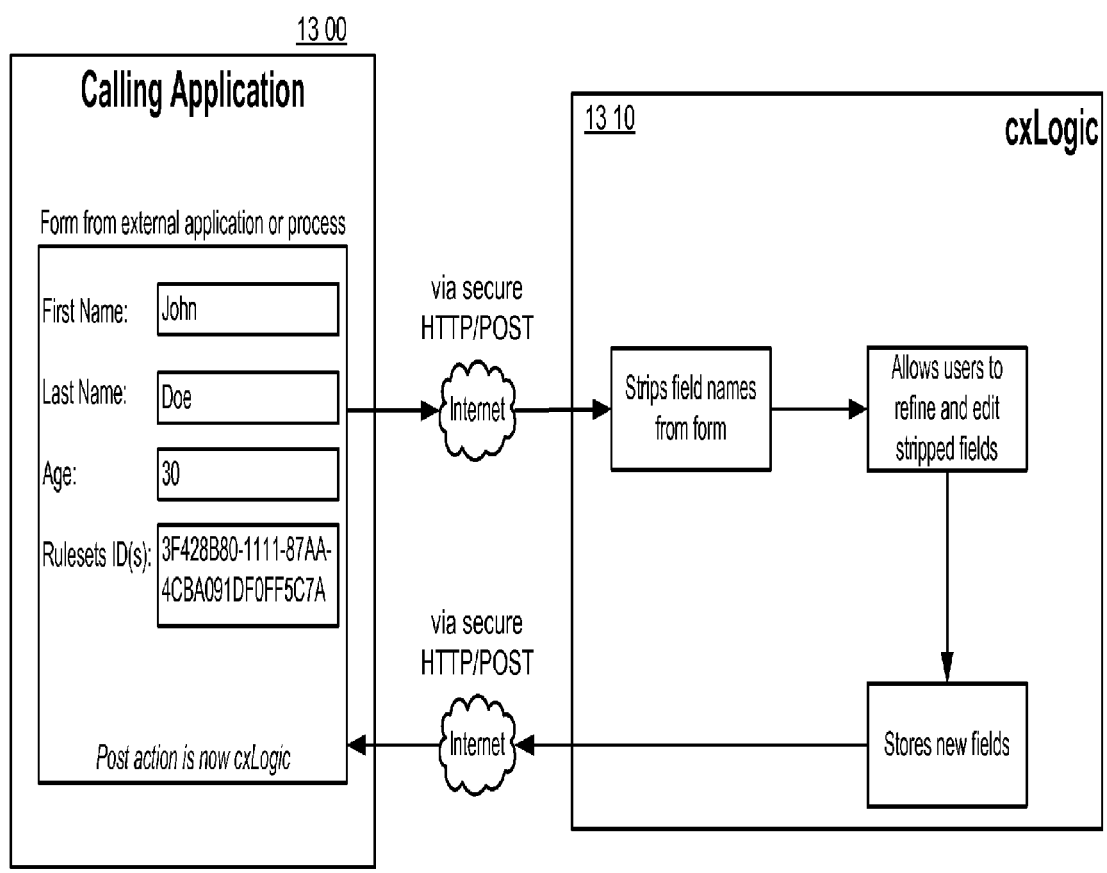
FIG. 13 shows interactions between a calling application and cxLogic in another embodiment of system operation.

FIG. 7 shows an implementation of cxLogic process flow in one embodiment of system operation. The cxLogic process flow begins with the consume process 700, one implementation of which is diagramed in FIG. 8. The user enters input into a form and adds action to the form to be consumed 800. The user then submits the form 801, which is sent over the internet, such as via HTTP/POST, into cxLogic. cxLogic then determines if the form is valid, 802. If it is not valid, there is a resulting error, 803, which is then reported to the user, 804. If the form is valid, form fields are displayed for user confirmation, 805. If the changes are confirmed by cxLogic, 806, the set is stored, 807, and the results are returned, 808. If the changes are not confirmed, 806, there is a resulting error, 803, which is then reported to the user, 804. FIG. 13 shows a block diagram illustrating the consume process components, the consume process including a calling application 1300. A calling application can either be an external web service that would like to use cxLogic's rule evaluations, or another software application that requires cxLogic's rule evaluation engine to complete its own processes.

Figure 9:
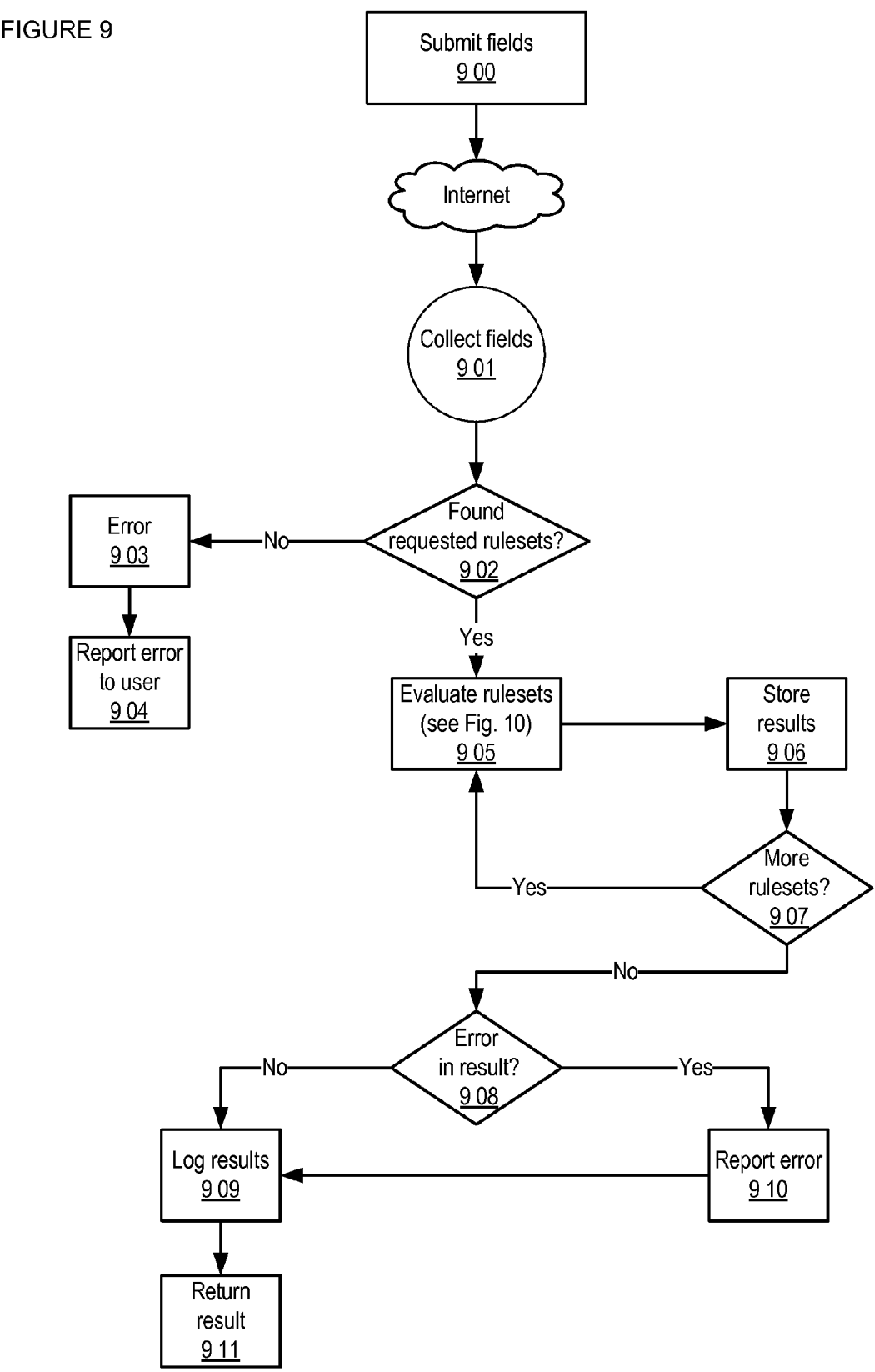
FIG. 9 shows an implementation of logic flow for rule evaluation in one embodiment of system operation.

After cxLogic runs the consumption process, the remote data sources have been processed and data fields, which may be used in rules, are identified and available for the user to integrate into a rule. The process continues with the overall processes, shown in FIG. 7. Users can then manage rulesets, 701. This allows them to add, edit, or delete rules, rule fields, and rulesets. cxLogic determines if there is an external application request, 702, and then passes the rulesets through the evaluation process 703, illustrated in FIG. 7, and further detailed in FIG. 9.

The evaluation process begins when fields are submitted, 900, over the internet via secure HTTP/POST, and collected by cxLogic, 901. As described above, fields that are submitted can come from an external web service, or be fields created within cxLogic. Fields submitted are collected by cxLogic, and then cxLogic determines if the requested rulesets have been found, 902. Rulesets are retrieved by cxLogic from an XML database, shown in FIG. 11. If no matching rulesets are present, there is a resulting error, 903, which is then reported to the user, 904. If the ruleset is found, it is evaluated, 905. This evaluation process is shown in further detail in FIG. 10.

Figure 11:
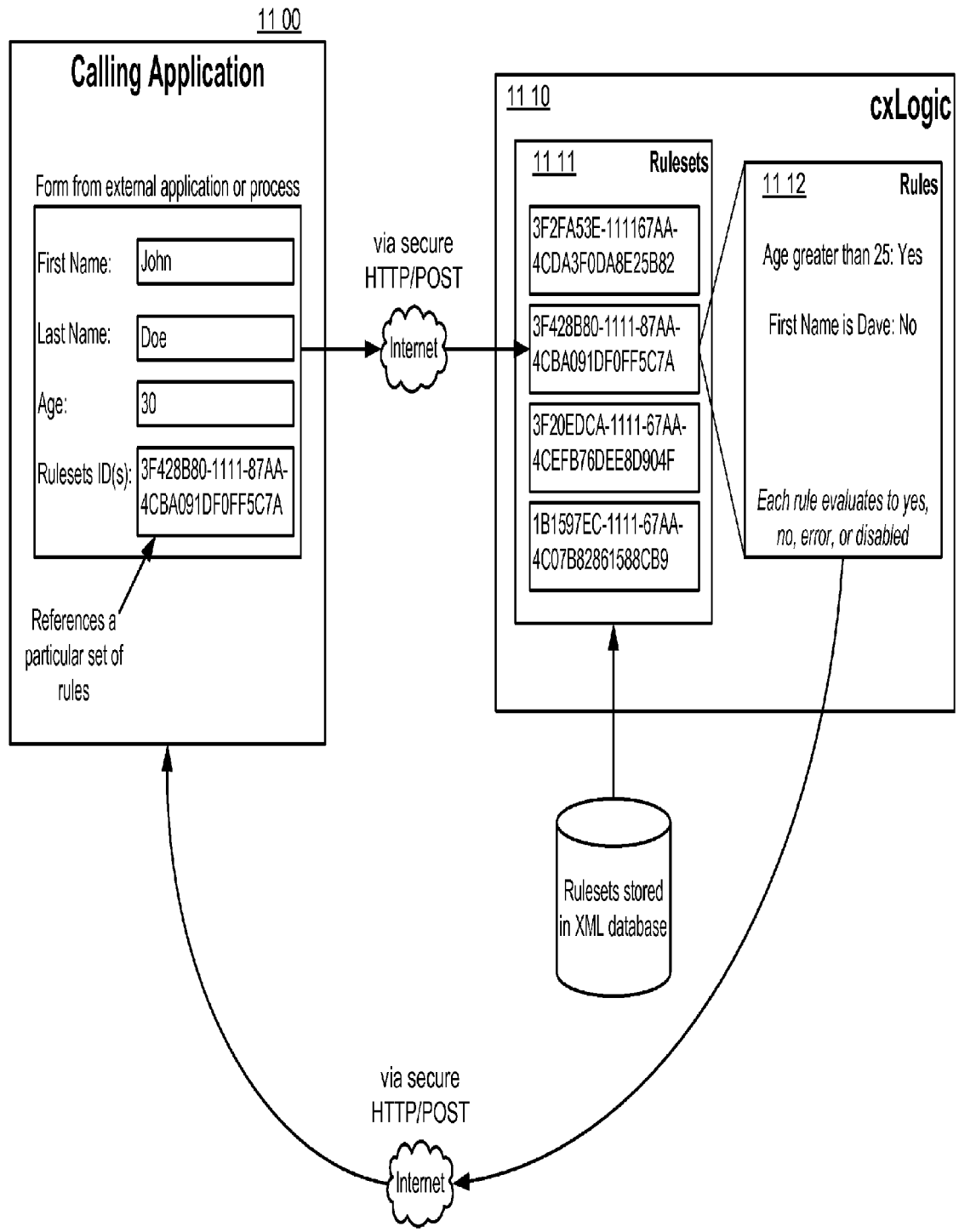
FIG. 11 shows interactions between a calling application and cxLogic in one embodiment of system operation.

Briefly with respect to FIG. 11, someone wishing to utilize the benefits of cxLogic 1110 calls up a ruleset 1111 from a calling application 1100, for example an Internet browser session. If the called ruleset exists, it is retrieved from a database and operated whereby to evaluate stored rules, 1112.

Figure 10:
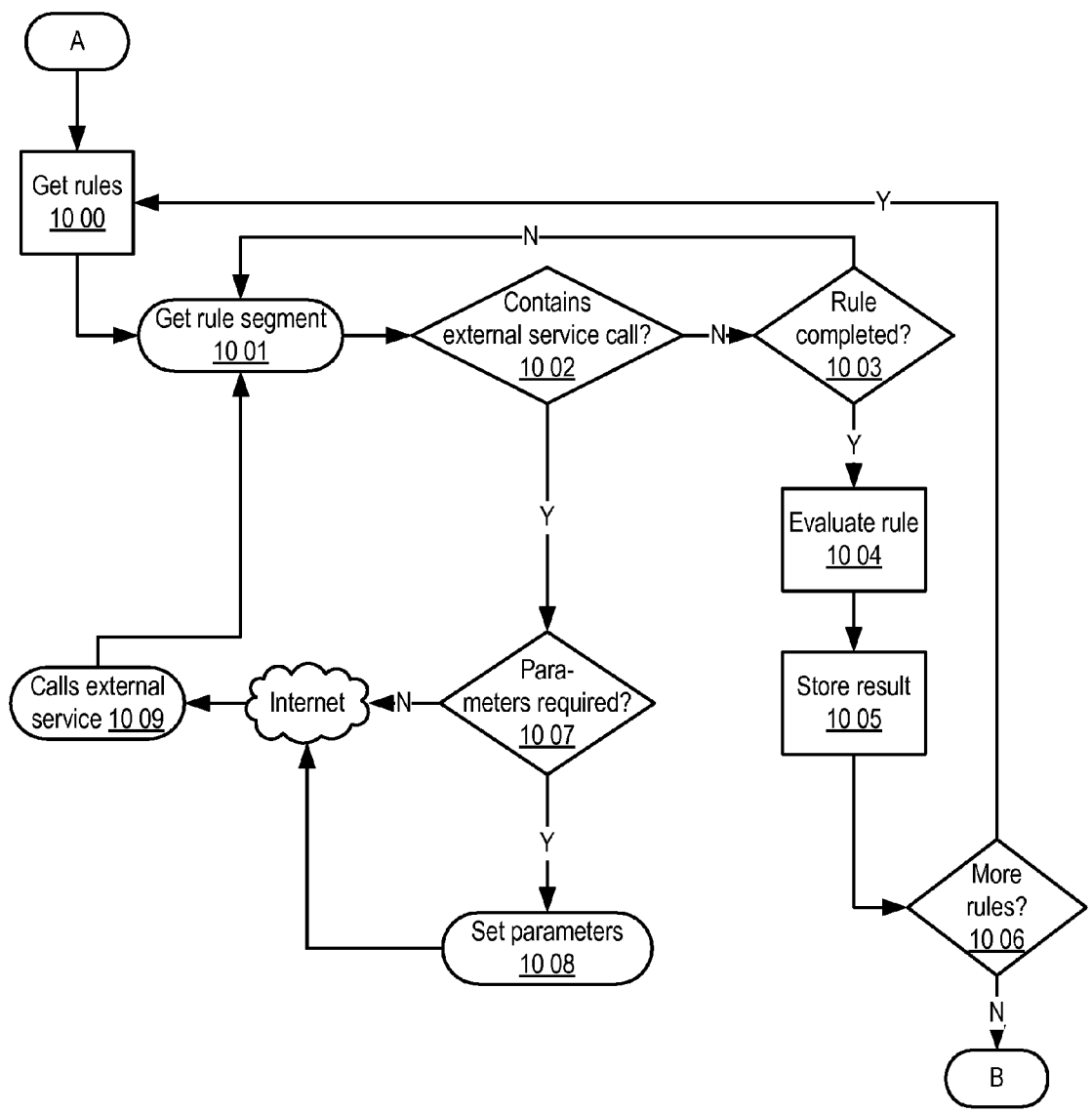
FIG. 10 shows an implementation of further logic flow for rule evaluation in one embodiment of system operation.

The detailed evaluation process, FIG. 10, begins with cxLogic retrieving the rules from the ruleset, 1000. cxLogic then analyzes the rule, 1001, and determines if the function call requires an external service in order to gather information to make an evaluation, 1002. If it does not require an external service call, cxLogic determines if the rule evaluation has been completed, 1003. If the rule is not completed, cxLogic redirects the rule back to 1001, which continues to evaluate the rule.

Figure 12:
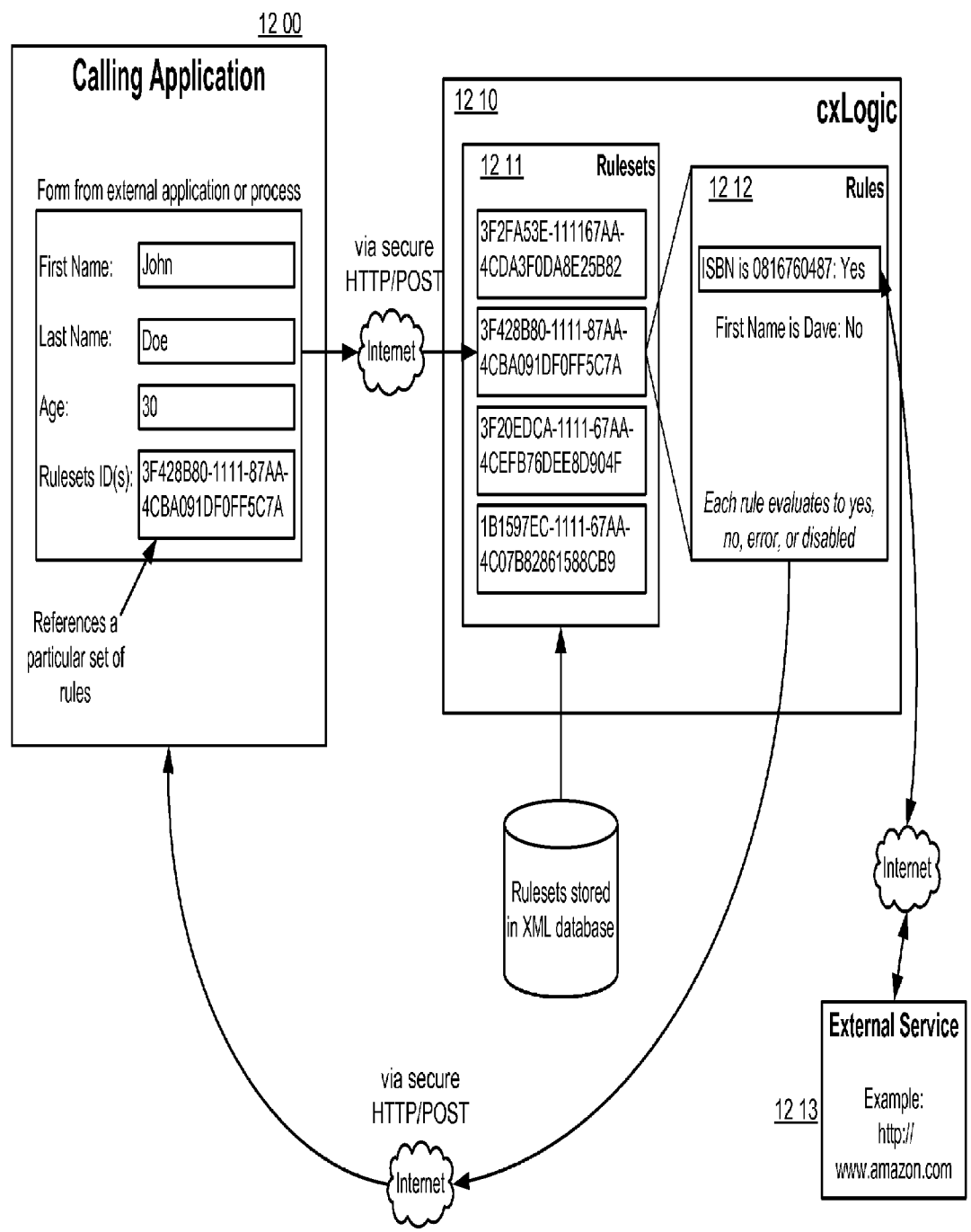
FIG. 12 shows interactions between a calling application and cxLogic in another embodiment of system operation.

If the rule evaluation has been completed, cxLogic evaluates the rule, 1004, stores the result into an XML database, 1005, and determines if there are more rules to evaluate, 1006. If there are more rules to evaluate, cxLogic redirects to 1000, which retrieves more rules from the ruleset. If an external service call is required to evaluate the rule, cxLogic then determines if more parameters are required, 1007. If additional parameters are required, it allows the user to input those parameters, 1008, then passes the data securely over the internet to the external call service, 1009. The external service then passes requested data back to the rule evaluation 1001. If no additional parameters are required, the current data is passed to the external service, 1009, securely over the internet. The external service then passes requested data back to the rule evaluation 1001. FIG. 12 shows this more detailed evaluation process in block diagram form, showing the same calling application and cxLogic components as in FIG. 11 with the addition of the external service 1213 and other described process steps.

With reference back to FIG. 9, once the evaluation process is complete for that ruleset, cxLogic evaluates each rule to yes, no, error, or disabled, FIG. 9 label B. The results are then stored, 906, and cxLogic determines if there are additional rulesets are present, 907. If more rulesets need to be evaluated, cxLogic redirects back to the evaluation process, 905. If there are no more rulesets to evaluate, cxLogic determines if there is an error in the result, 908. If there is an error in the result, the error is reported, 910, the error is logged, 909, and the result is returned. If no error is present, the results are logged, 909, and the results are returned, 911.

The reader will appreciate that there are several compelling features and advantages that distinguish cxLogic from other rule evaluation systems. cxLogic is an HTTP-based rules evaluation server that does not require any prior knowledge of the fields submitted in order to evaluate user rules. It is powerful enough to evaluate virtually anything. If rules require certain fields that are not submitted, cxLogic will evaluate a rule to "Error" instead of "Yes" or "No." The process of evaluation is now taken outside the realm of software development and given to the user. The user has the power to affect behavior through real-time rule authoring and evaluation.

Once a rule is evaluated, the evaluation data (XML) is logged into an XML database. The logging feature logs all external call evaluations, as well as any test evaluations done within cxLogic. Logs are ordered chronologically, and can be filtered and searched.

There have thus been provided new and improved methods and systems for authoring and evaluating logical rules, the invention providing simple graphical user interfaces usable by non-technical personnel. The invention thus simplifies the process by which users can establish rules, collect and process data, manage the rules and manage the rulesets. The invention further provides for the analysis of web sites, whereby to identify and characterize data fields for use within rules. The end result, again, is a simplified graphical user interface system through which users can utilize remote data with in rules. This invention is applicable to many fields of business, and particularly as to the development of rules in support of business processes.

Quote Generating Subsystem [pxQuote]

The collection of insurance policy application information and the development of policy price quotes based upon that information is often performed using automated, computerized programs with significant human interaction and oversight. The programs used to facilitate these activities are generally specialized, "hard coded" software programs, which may be amended and altered only with specialized programming by computer software experts. While the computerized programs facilitate the activities of the human operators, for example underwriters, they are expensive and complicated to write and also to alter.

One problem addressed by pxQuote is the need to alter software every time there is a change in insurance policy data analysis and/or pricing. Current systems allow for insurance policy quote request data rating against a workbook, with the resultant generation of policy terms and prices. Changes, however, to the underlying workbooks, against which new policy data is processed to generate policy terms and price quotes, require technologists to edit software in order to see the affects of the changes. Typical business users can not easily or inexpensively modify the complex code behind the insurance software.

pxQuote also eliminates the need to redesign the user interface of an insurance quoting application every time there is a need for changes in form fields, or a redesign of the user interface for a change in the actual application fields. Such changes are undertaken, for example, when changes to the underlying policy and/or policy application require the collection of different information. Limitations of existing systems include the need for technical developers to edit the code for the user interface in order to reflect form field changes and the requirement of input values for all required fields before results can be processed.

pxQuote provides methods and systems for facilitating the collection and processing of information to generate quotes and applications for insurance policies.

As used herein, references to "pxQuote" refer to the methods and systems of the present invention, as described, for facilitating the collection and processing of information to generate insurance quotes, and more particularly to such methods and systems which facilitate the flexible change of both the user interfaces and the data collected for processing.

In one embodiment of the invention, pxQuote enables business users to alter a simple XML file and quote directly against their insurance product workbook. pxQuote defines an insurance product, including a workbook, as an XML document, which allows real-time changes to insurance workbooks that can be instantly used to create a new quote. By abstracting this process to an XML document, business users can quickly and easily make changes in insurance policy processing that can instantly be used within pxQuote. pxQuote's system allows for modification of the XML based product, and dynamically interprets the workbook to generate calculations, user interfaces, documents, payments, and businesses rules needed to facilitate the process to create a binding insurance contract for a given set of risks. This product is not hard coded into the system.

In another embodiment of the invention, pxQuote interacts with an underlying XML document which contains the form field information. pxQuote reads this XML document and dynamically creates the user interface based on the information held in the XML document. This ability to simply edit the XML document eliminates the need for complicated and expensive hard coding form field information within the user interface. pxQuote, allows the business user to edit user interface-defining data within an XML document, and the changes are instantly reflected on the user interface.

In this second embodiment, pxQuote thus has the ability to base the interface on an underlying XML document. All interface specifications, such as field names and type, are held in the XML and are visually represented in the interface. This seamless interaction allows a business user to hide the data that affects quotes from an agent. In one implementation, pxQuote is a web application rather than a webpage. This allows for dynamic user interaction to determine results in real time. It does not require the user to input all fields, but will determine a result based on fields that it has been given. It also notifies users, in real time, of fields that are required, missing, or that contain errors. Users can also save input information within the system and access it at another time.

In accordance aspects of pxQuote, there are provided herein methods and systems for enabling a user to simply and easily edit an XML document in order to change 1) both the underlying requirements, calculations, tables and business rules associated with processing applicant data to generate insurance policy terms and quotes, and 2) in order to enable a user to altered the appearance of a use interface for collecting insurance application/quote information.

As used herein, references to "product" and "products" refer to XML data documents which fully describe an insurance policy rater, including specification of user inputs, expressions (e.g., rating calculations which establish parameters and/or values used to render a quote), tables (e.g., data sets from which values may be looked up), rules and/or rulesets (e.g., business rules), payment tracking mechanisms and/or records, policy documents, and/or the like. A product is processed by the pxQuote module and turned into a functioning rater application. A product contains all of the information required to create a rating instance, both the interface and pricing logic. This abstract representation of the rating application is available for editing by business users of the pxQuote application. As described herein, the product may include numerous functions and/or sub-functions, such as a) collecting policy request information, b) quoting requested policies, and c) generating online policy application(s). The quoting function may be performed by an XML workbook function within the XML product document.

As used herein, "schema" is used to mean the structural definition of an XML document. Schema are typically expressed in terms of constraints on the structure and content of XML documents, above and beyond the basic syntax constraints imposed by XML itself. An XML schema, including those schema described herein, provide an abstracted, high-level view of the completed XML document. XML Schemas express shared vocabularies and allow machines to carry out rules made by people. They provide a means for defining the structure, content and semantics of XML documents in more detail.

Overview of Operation

In accordance with aspects of pxQuote, the user of the system may build an insurance policy product, in accordance with the guidelines set out in the discussion of the pxBuilder module below. This build is accomplished by editing the appropriate XML document. As described above, the product includes numerous functions and sub-functions, including a) XML structure (i.e., validated by schema) for generating an appropriate graphical user interface where by a user of the invention can collect and enter applicant insurance policy request data for obtaining an insurance policy quote, b) XML structure for a workbook for processing the quote request data to generate the policy quote, and c) XML structure for an insurance policy application whereby a party satisfied with a quote and desiring to apply for the quoted policy can initiate the generation of the insurance policy application. Details as to how the application/quote request data is collected, appropriately processed, and the policy quote terms and conditions and pricing information returned to the user, are described below. Further described below are the details as to how a policy application form is generated. Xforms, a World Wide Web Consortium standard, provides a description of fields and/or inputs, which is then interpreted by the system to generate the user interface; xforms also includes a model, which describes how to parse data passing from client software to the server The dynamic user interface of pxQuote renders field inputs, labels and other interface elements based on the underlying XML product. This allows for a great deal of flexibility because products and the user interface are rendered in real-time. Changes to the XML description of the user interface can instantly be seen on the user interface, thus eliminating the need for time intensive development for minor changes. Similarly, changes to the product are reflected in the insurance policy processing, the insurance policy quote and the subsequent insurance policy application virtually instantaneously.

pxQuote instantly informs users of the current progress of their session in accordance with the workbook. It visually shows users what information they must provide in order to complete the process of quoting or submitting an insurance quote request. As the user interacts with the system and provides information, the system responds accordingly. In one embodiment, the system constantly informs users of their progress. In operation, by providing instant feedback, pxQuote allows users to see how changes in field values affect outcome (e.g., quote values).

Workbook Document Editing and pxQuote Policy Generation

The creation of each product work book is accomplished through the use of pxBuilder module to edit the appropriate XML document, in order to establish the appropriate data collection, calculations and rules for generating policy quote terms, conditions and prices.

User Interface Document Editing and pxQuote User Interface Generation

The creation of the graphical user interface through which applicant information is collected for each product is accomplished by editing the relevant portion of the workbook XML document. This process creates a graphical user interface through which the applicant data is collected and transmitted for processing, the creation of which is described herein above, for appropriate processing. The same is true for the creation of the graphical user interface for creating a policy application. In operation, the policy application is generated using the already received applicant quote data, but can also include the collection and inclusion of additional pertinent data such as payment methodology and related insurance coverage information.

Figure 14:
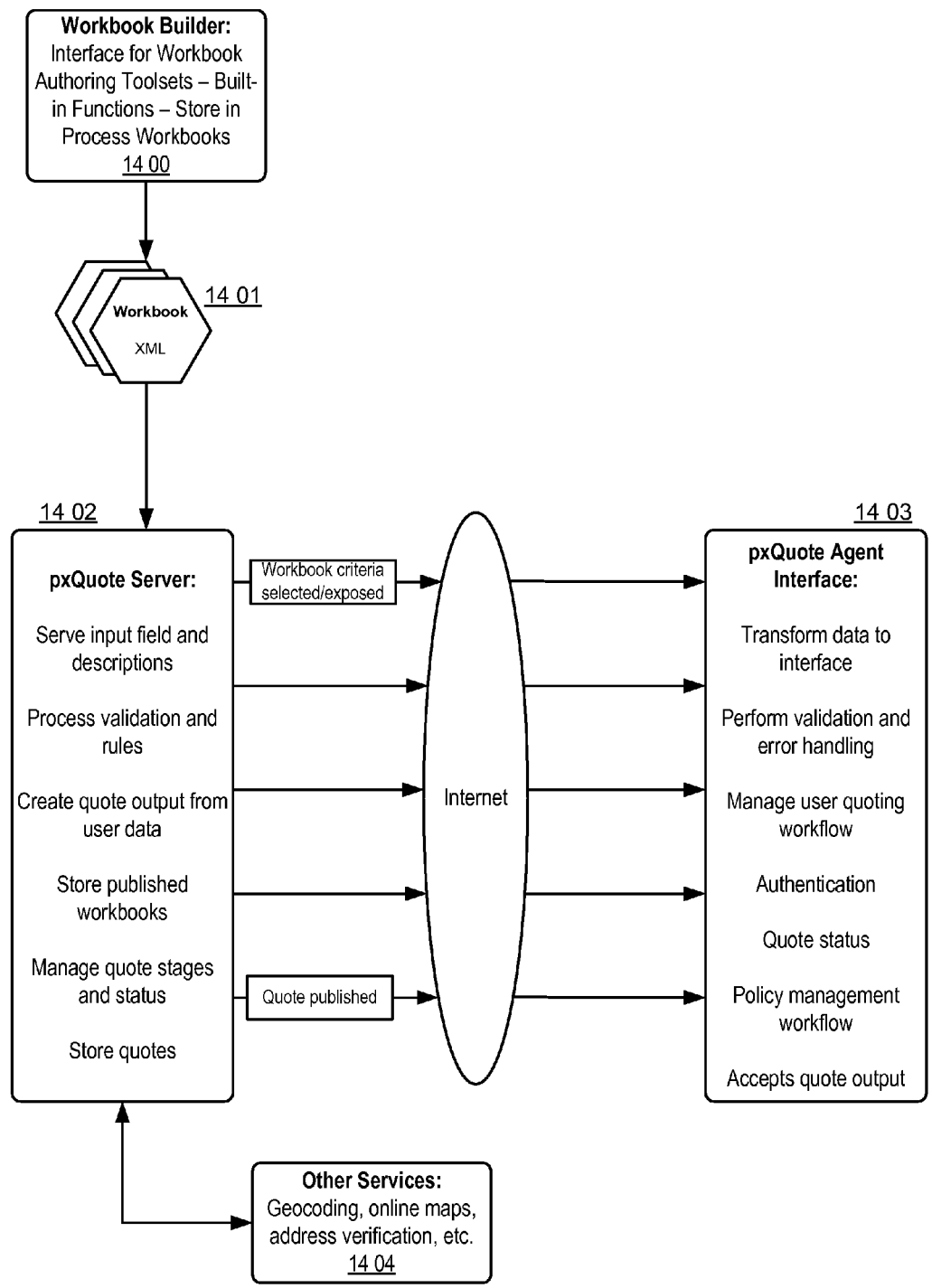
FIG. 14 shows an implementation of data flow for pxQuote in one embodiment of system operation.

System Overview pxQuote's user interface 1403 in FIG. 14, accesses the pxQuote module (1402), via the internet, to retrieve information needed to create visually what is stated in the selected product 1401. That is, the information is collected from the graphical user interface described above. If information also needs to be obtained from an outside source, pxQuote will access the source 1404 and coordinate the appropriate information between the server 1402 and interface, 1403.

Figure 15:
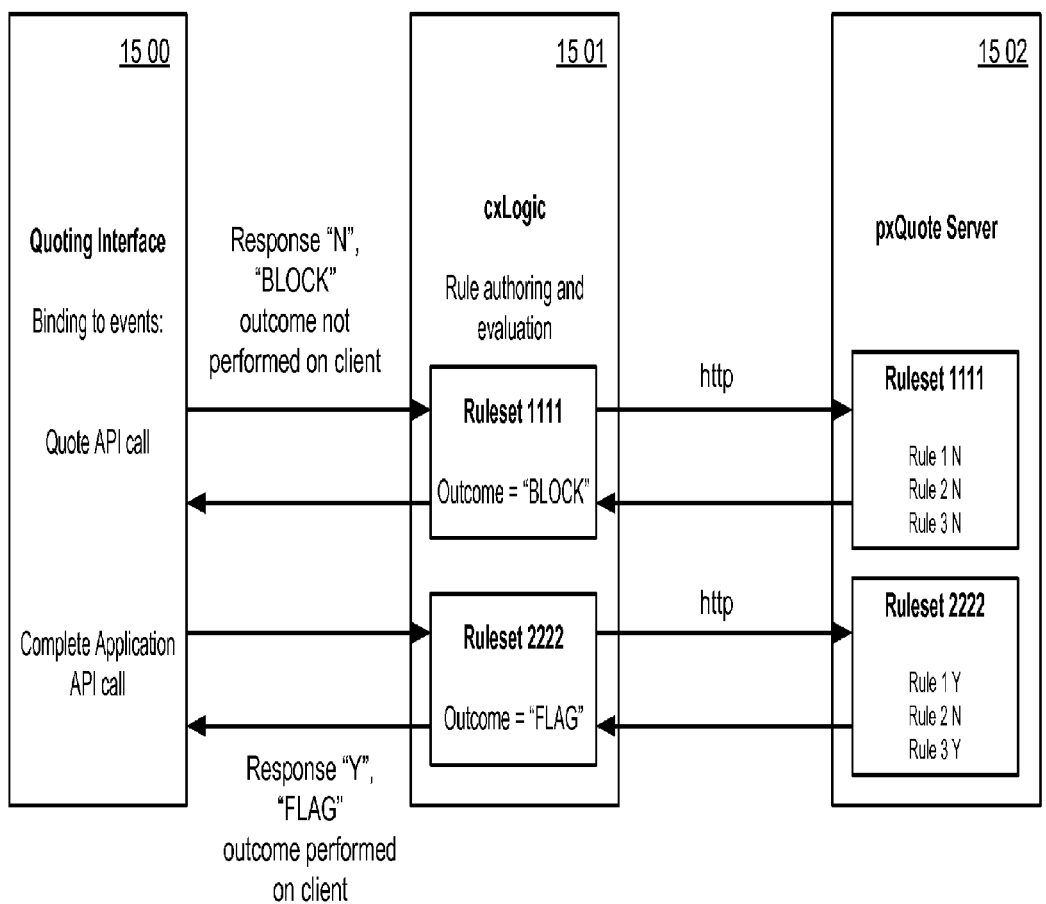
FIG. 15 shows integration of pxQuote with cxLogic in one embodiment of system operation.

As the user enters data within the interface, an XML packet is being created which holds the data. When all required fields have been entered, the packet is posted to a URL, for example: http://pxquote/test/service/quotes/. Each quote is given a unique ID, for example, PXQTEST01-19.

pxQuote's request and response workflow can be seen in FIG. 14, in the interaction between the pxQuote module 1402 and the pxQuote Agent Interface 1403. The definitions of the calculations are held in the product definitions 1401 and executed in the server 1402 based on user inputs given in the interface 1403. The data is stored within the pxQuote module, and can be accessed by its unique identification number.

pxQuote is intelligent enough to know to go outside its system in order retrieve information for its own use. FIG. 15 shows pxQuote's integration with cxLogic, a rules-based processing system. Based on the information given by the user in the interface 1500 the server processes the information 1501 and calls an external system 1502. The external service passes the information back to the server, which interprets the information, and the necessary visualizations are shown on the pxQuote user interface.

Schema Descriptions

Figure 16:
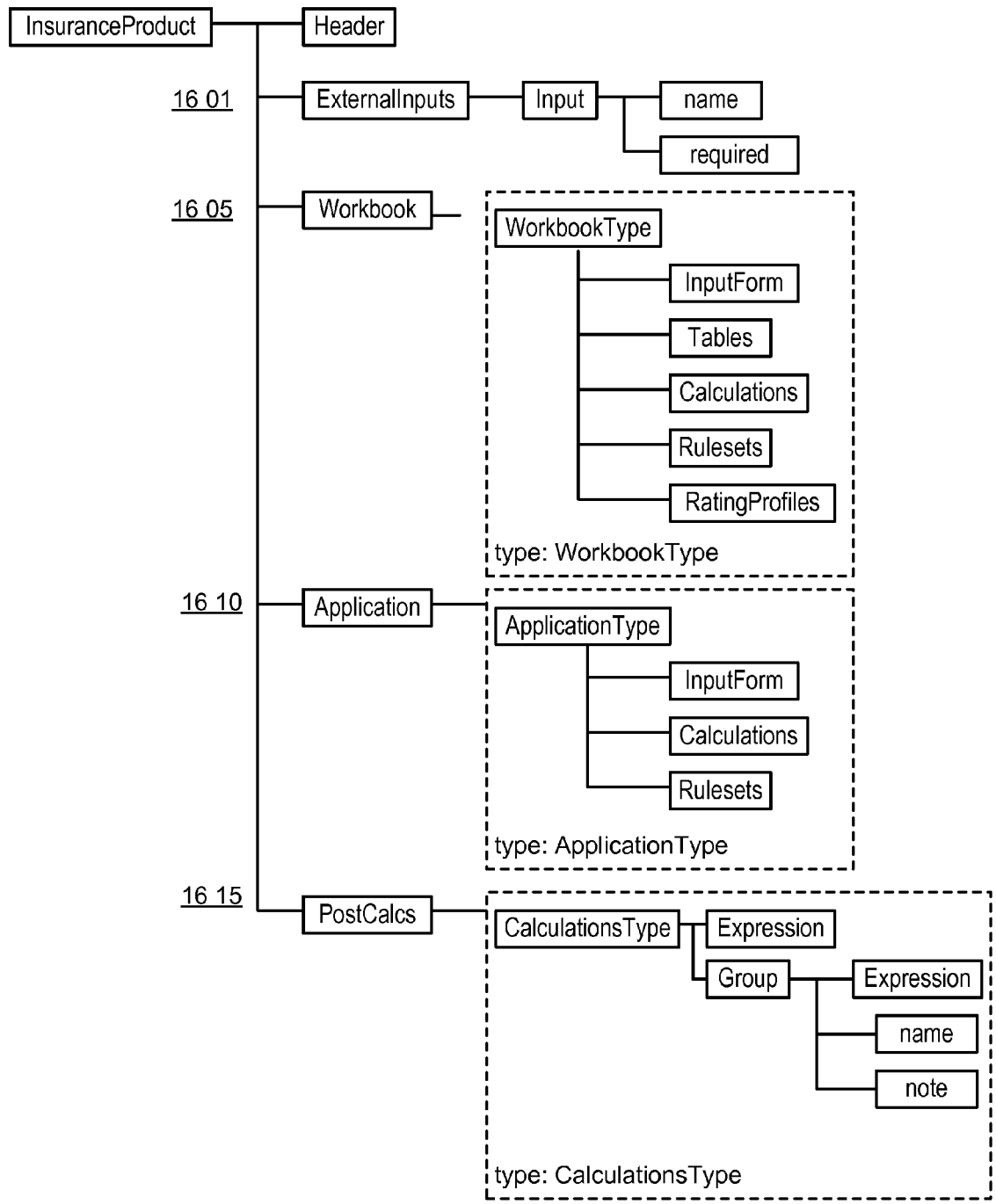
FIG. 16 shows an implementation of the overall product schema in one embodiment of system operation.
Figure 17A:
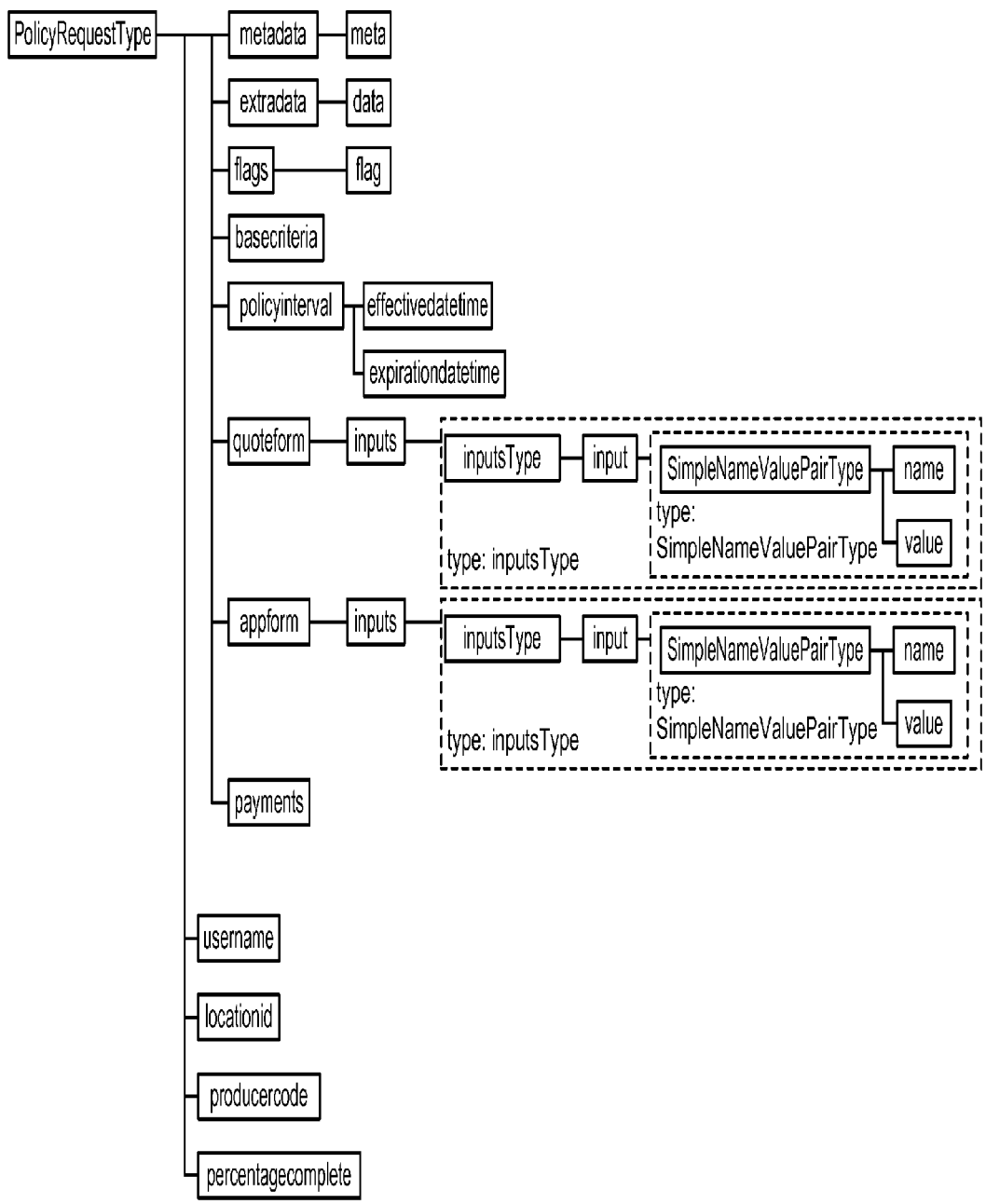
FIG. 17 shows an implementation of a policy request schema in one embodiment of system operation.
Figure 17B:
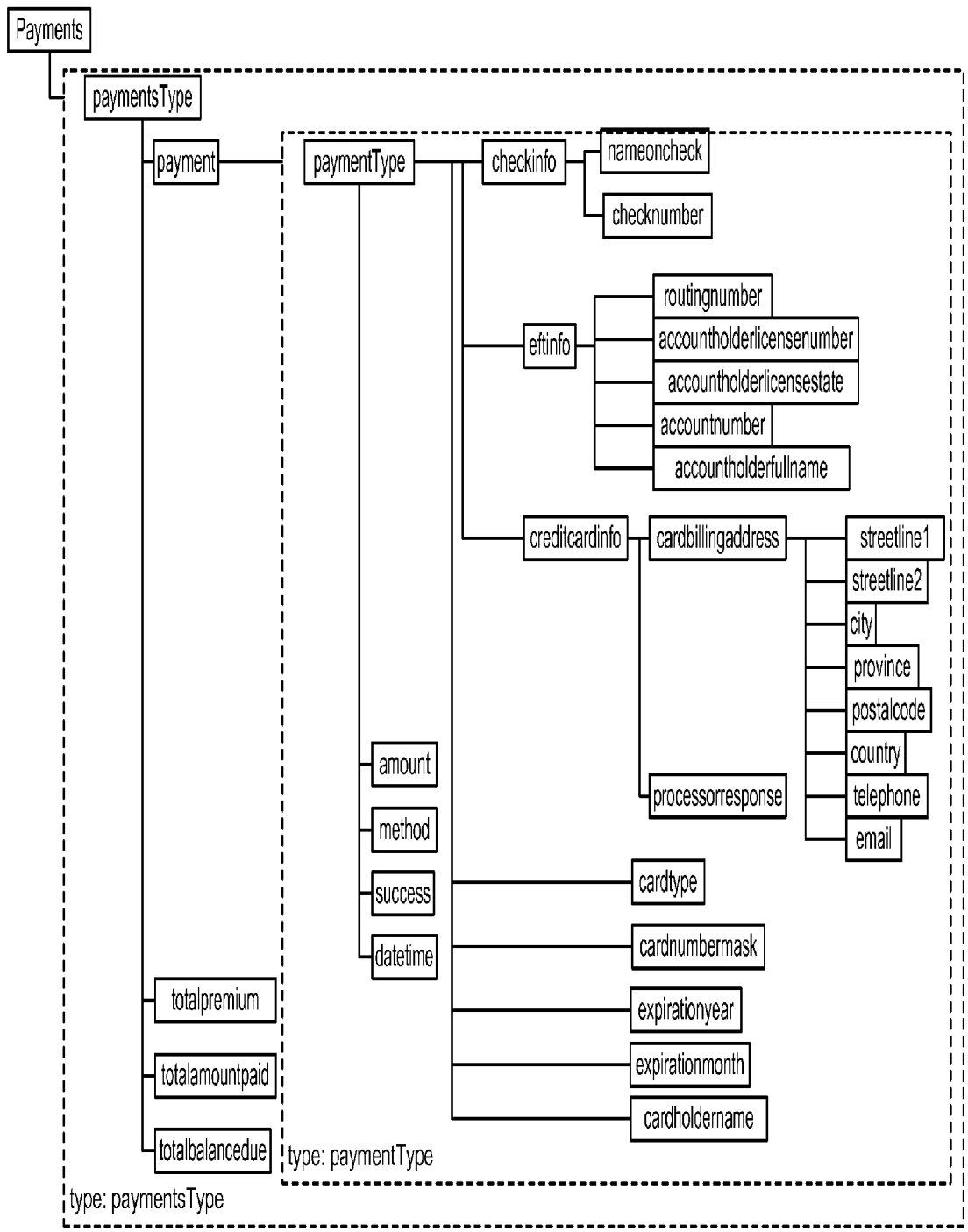
Figure 18A:
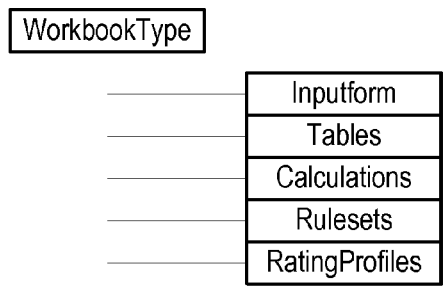
FIGS. 18A-F show an implementation of a workbook schema in one embodiment of system operation.
Figure 18B:
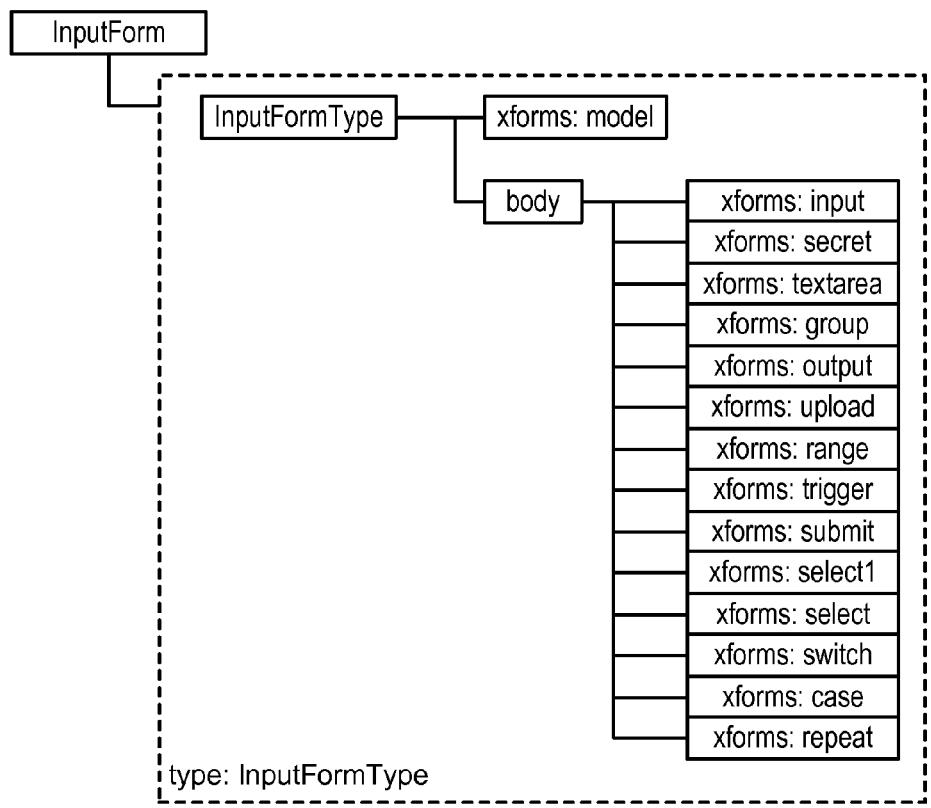
Figure 18C:
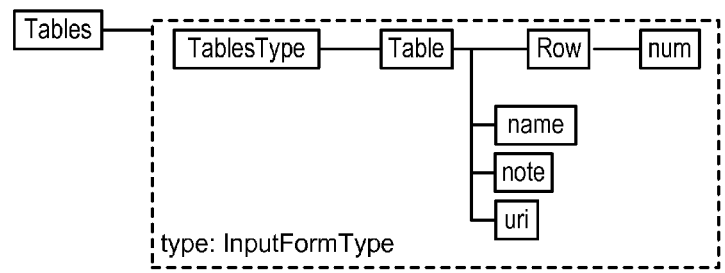
Figure 18D:
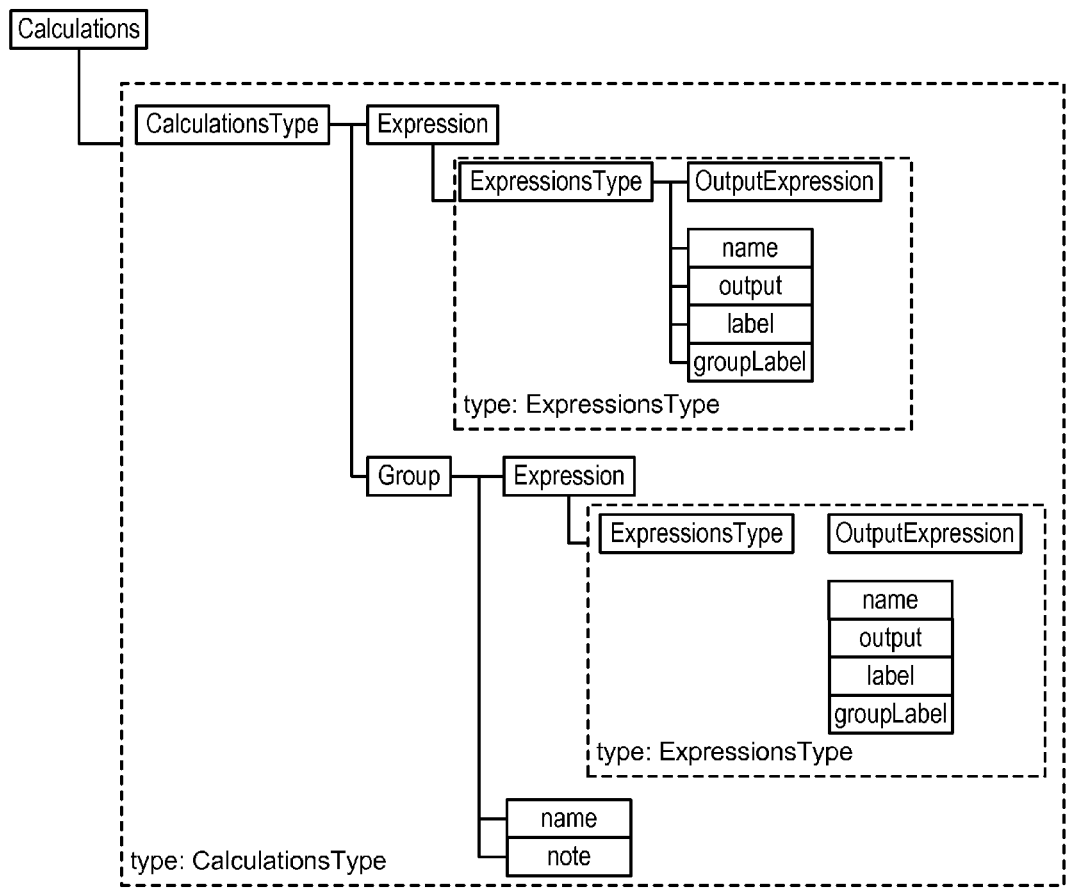
Figure 18E:
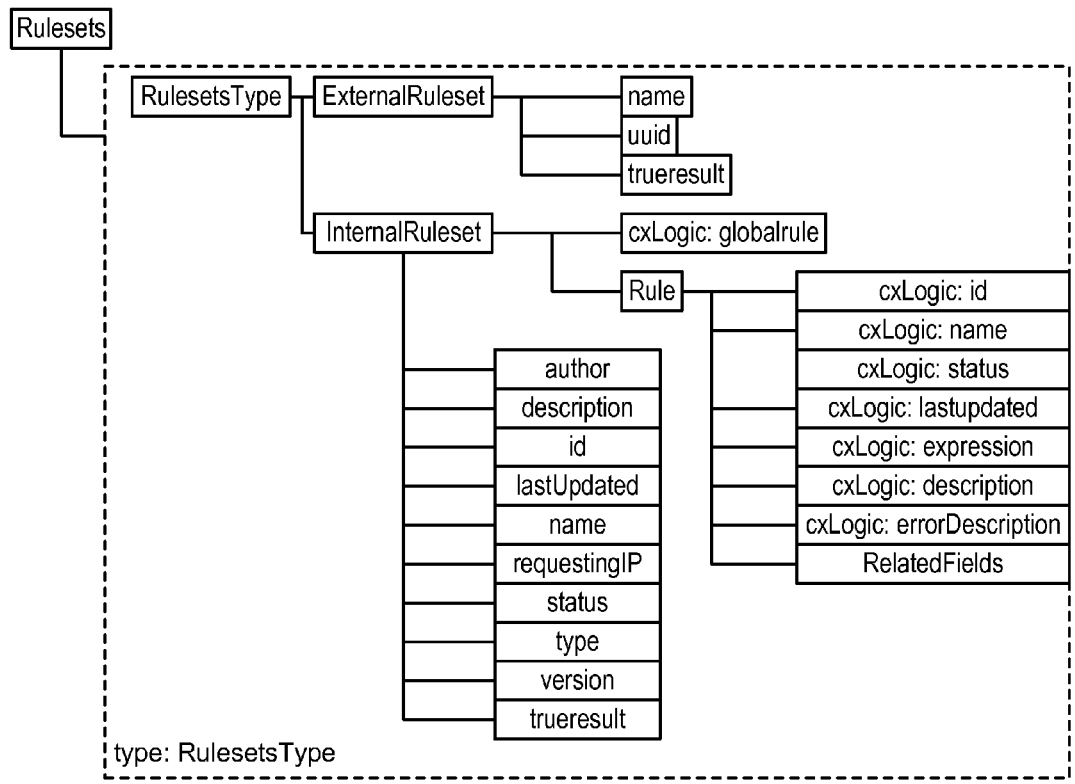
Figure 18F:
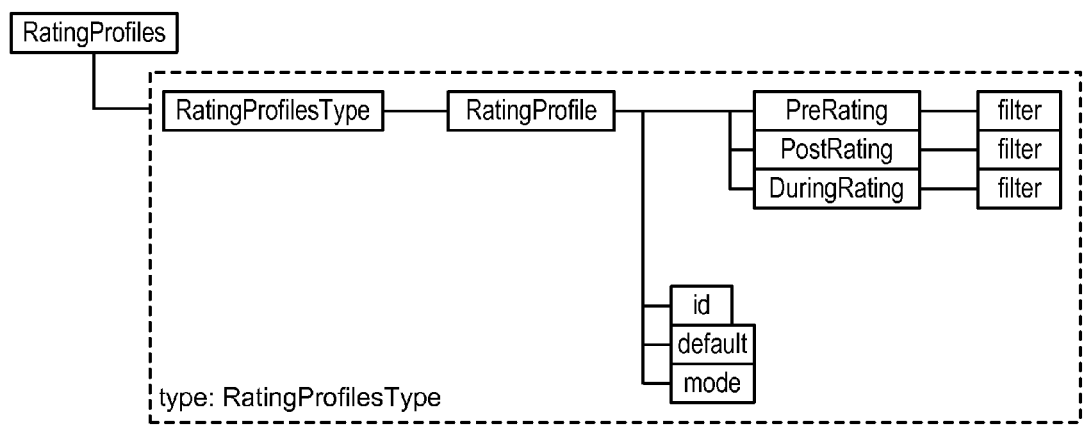
Figure 19A:
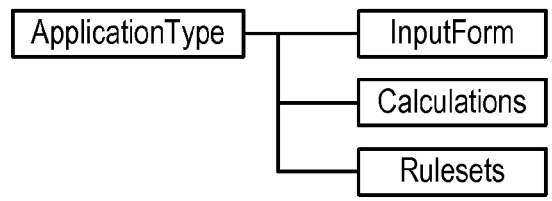
FIG. 19A-D show an implementation of an insurance application schema in one embodiment of system operation.
Figure 19B:
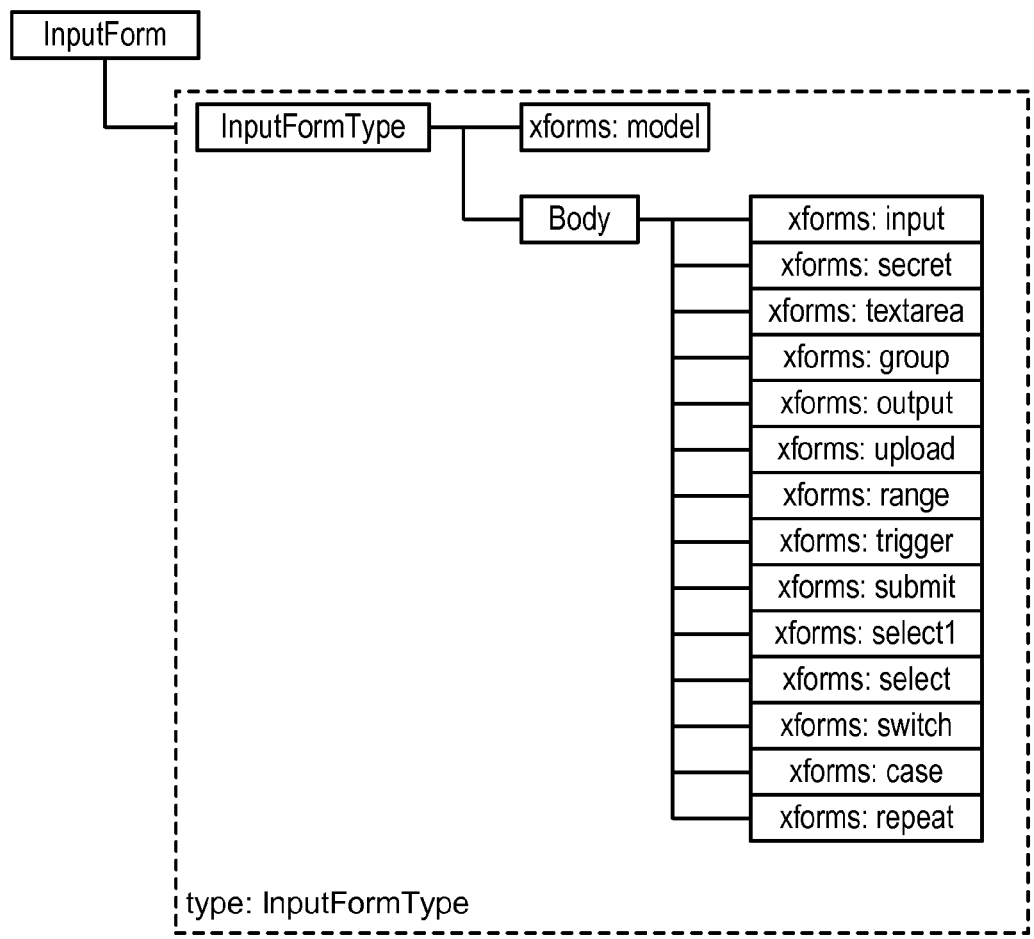
Figure 19C:
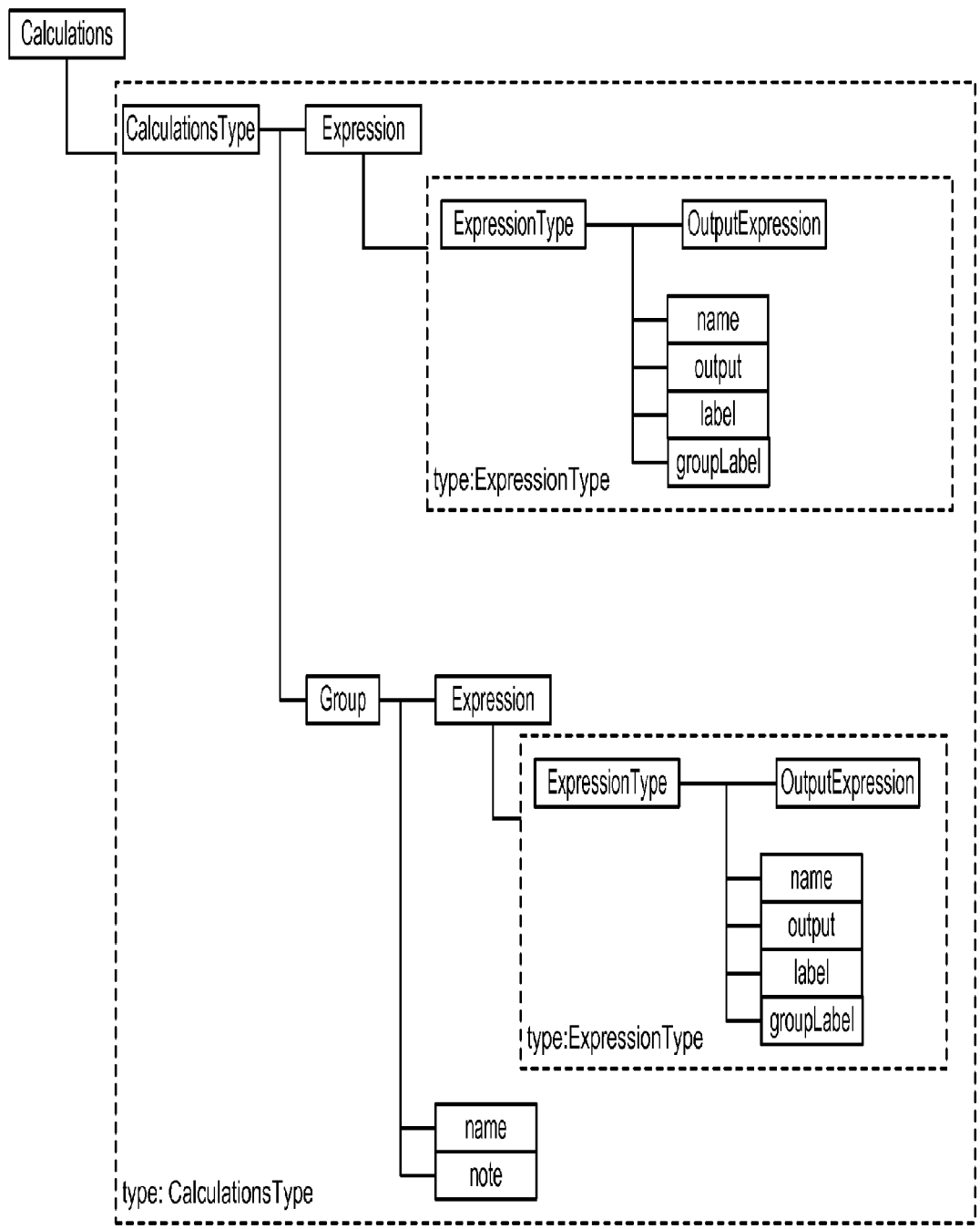
Figure 19D:
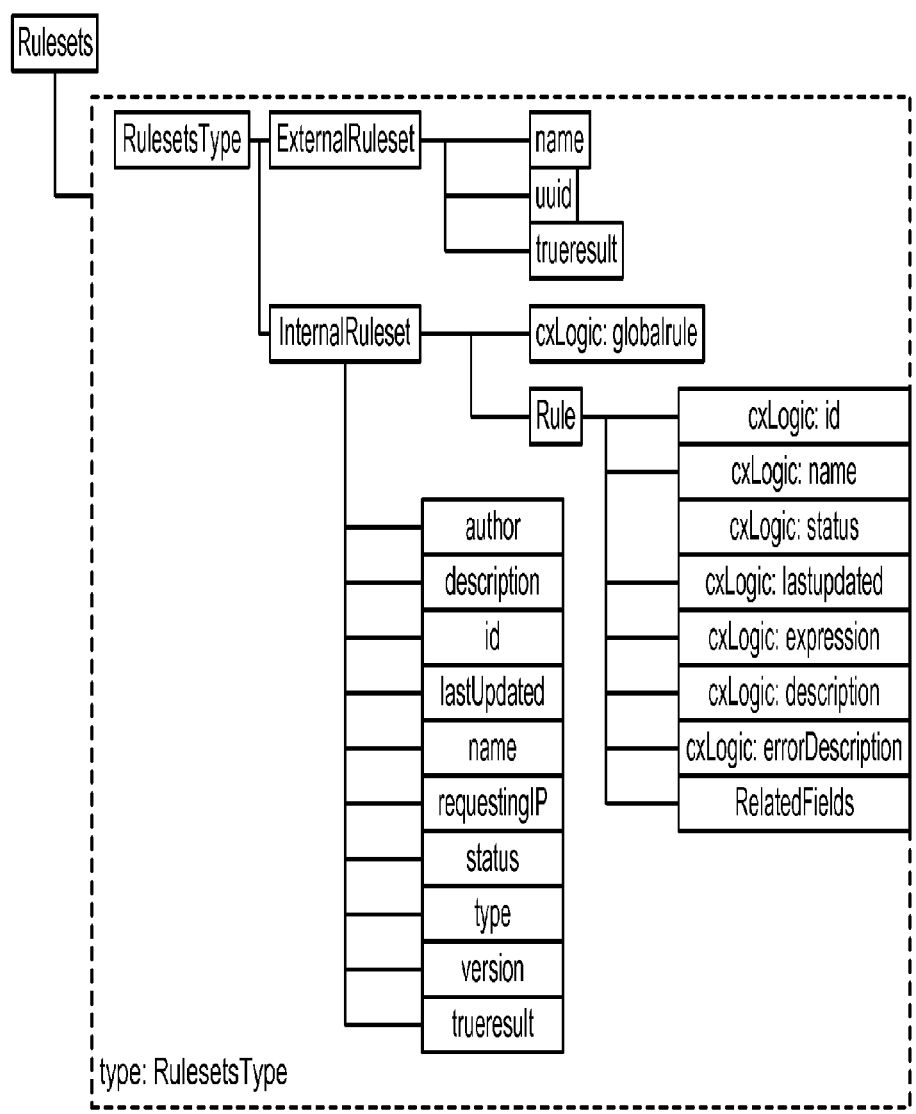
Figure 20:
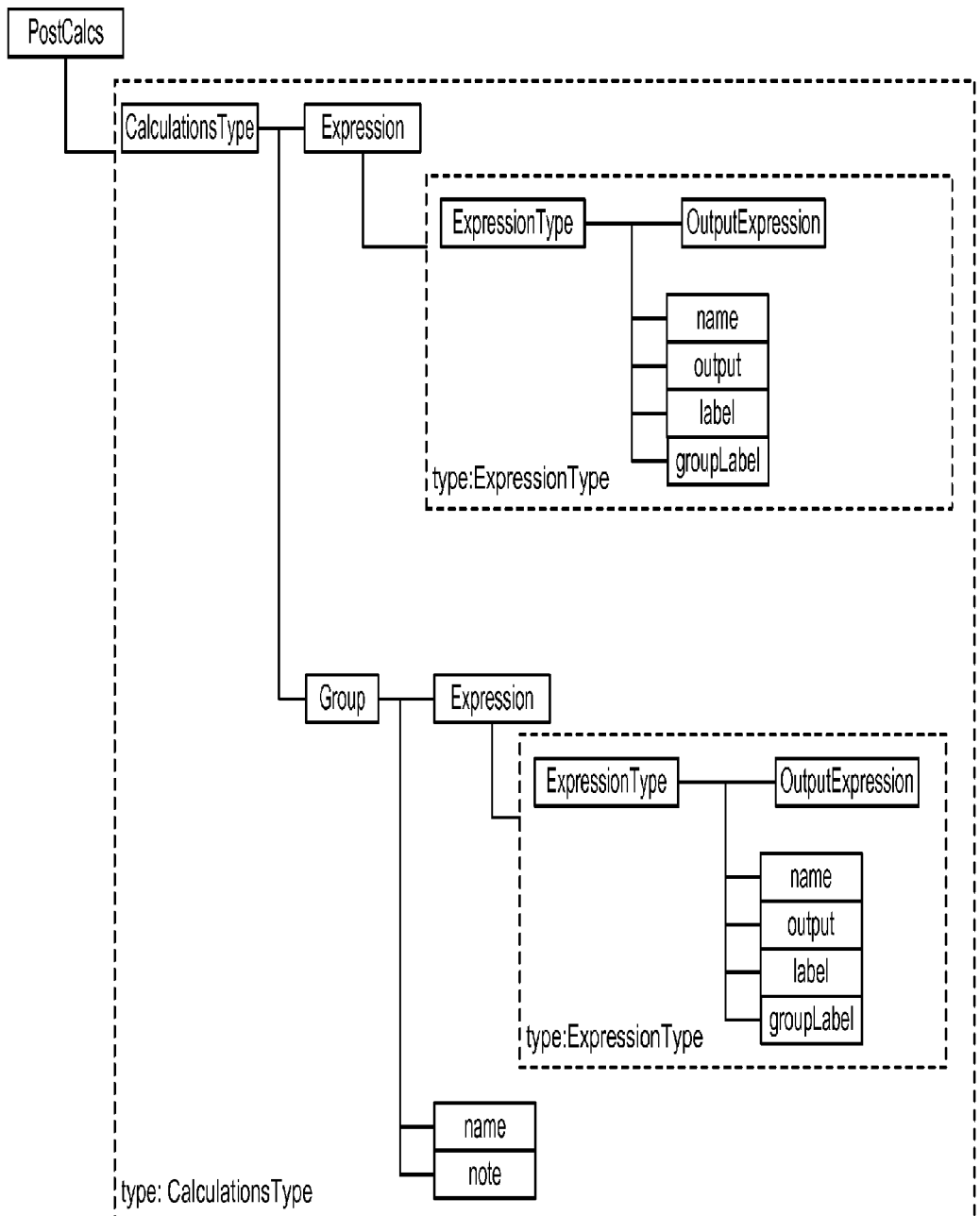
FIG. 20 shows an implementation of a post-processing calculation schema in one embodiment of system operation.

There are a number of different data-structures utilized by the system, some of which are provided in the figures. FIG. 16 displays an insurance product schema. FIGS. 17A-B display policy request schemata, whereby a user enters data to request a policy quote. FIGS. 18A-F display workbook schemata, whereby the processing of the policy quote data is performed to provide the actual policy quote. FIGS. 19A-D display insurance application schemata, whereby the actual insurance application is generated by a party who submitted a quote request, received the quote and desires to submit an application for the quoted policy. FIG. 20 displays a post-calculation schema whereby expressions employed within the workbook are specified.

More particularly, with respect to FIG. 16 the product is seen to include nodes for collecting external inputs 1601, the described workbook schema 1605, the described application schema 1610, and the described post-calculation schema 1615. Also included are header schemata for metadata (FIGS. 21A-B) and post-processing calculation schema for post-processing as shown in the schema of FIG. 20.

More particularly with respect to FIGS. 17A-B, the policy request schema is seen to include various information as will be utilized by the workbook schema of FIGS. 18A-F to provide the insurance policy quote.

A visual representation of the insurance workbook is shown in FIGS. 18A-F. As described above, the workbook contains input form elements, tables, calculations, and rulesets. The input form elements describe every form field that will be displayed on the front end interface of pxQuote as the quote form (i.e. the schemata of FIGS. 17A-B). This description includes field names, types, and validation requirements. The tables data holds all rater data in order to process the inputs of the user. The calculations section executes the mathematical processes that are described in the rater tables. These calculations use the inputs from the user. The rulesets section describes business rules that are created by the business user.

A visual representation of the insurance application XML schema is shown in FIGS. 19A-D. The application contains input form elements, calculations, and rulesets. The input form fields fully describe the display of the application form on the front end of the pxQuote interface. This description includes field names, types, and validation requirements. The calculations section executes the mathematical processes that use the input fields as data. The rulesets section provides references to business rules, existing in cxLogic, that are selected by the business user.

Figure 21A:
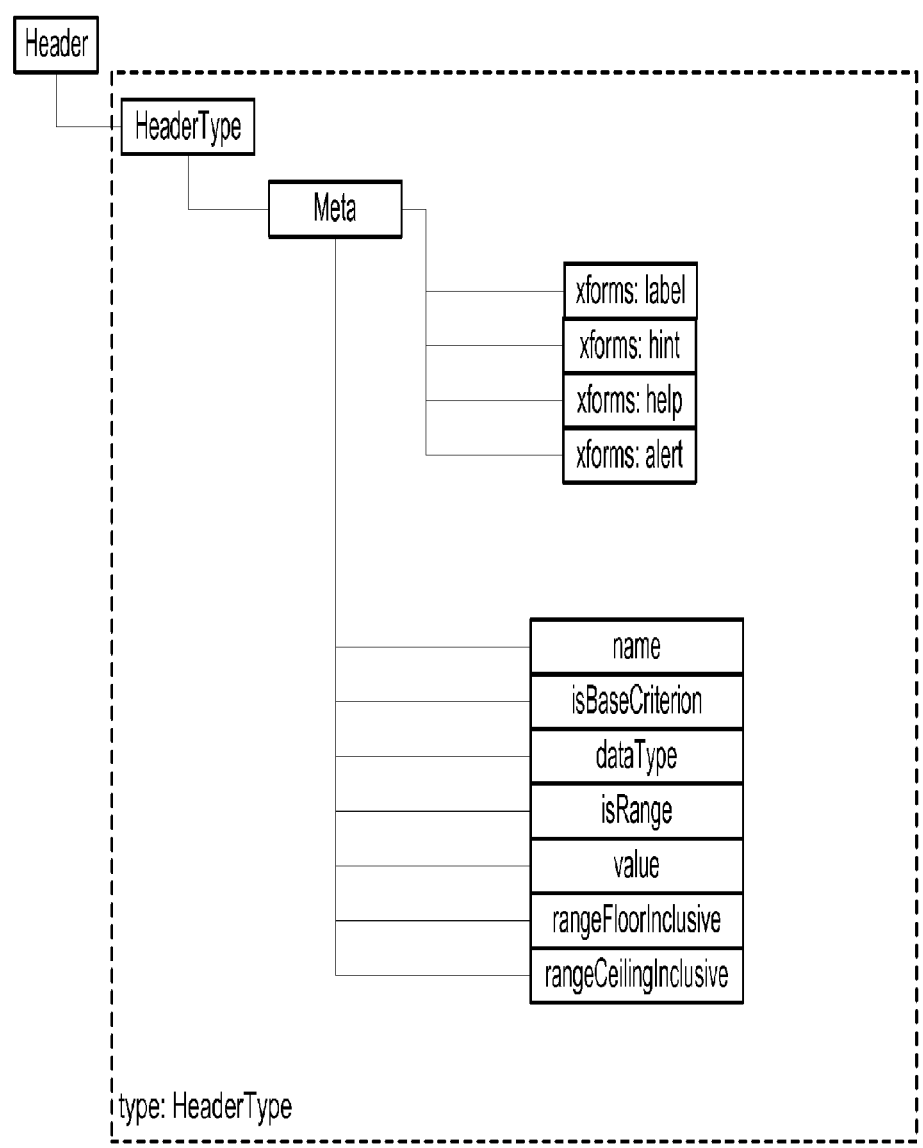
FIGS. 21A-B shows an implementation of a header schema for metadata in one embodiment of system operation.
Figure 21B:
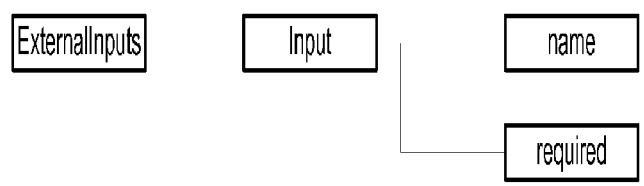

As noted above, FIG. 20 includes post-calculation schema for additional calculations to ensure an appropriate policy. FIGS. 21A-B includes header schema for information about the specific product, for example, the product name, author, and date last modified.

An example of a policy request is as follows. As shown in FIG. 22, system requirements are displayed to a user. As an example, in order to use the pxQuote application, four system requirements might be required. Windows must be used as the operating system, Mozilla Firefox version 1.5 or greater must be used as the browser, and Acrobat Reader and Adobe Flash Player version 9 or greater must be downloaded. An error message will appear if any of these requirements are not met. Of course, these limitations are exemplary in nature and not limiting of the invention. For example, the system may also be operable within a Linux or Macintosh platform, or in conjunction with Internet Explorer or Safari web browsers.

A username and password is entered, and a main console will appear. See FIG. 23. From this screen the user may manage existing Quotes and Applications or start a new Quote. It should be noted that the base criteria discussed below reflects one implementation. The base criteria may be dynamically modified and a workbook author may input a desired set of base criteria in order to uniquely identify the encoded product or products. It should further be noted that the system is an application program interface (API) service that may be spoken to from a rich client or a variety of other software systems or suites (e.g., Microsoft Excel).

The selected effective date of the policy is entered, as shown in FIG. 24. Select the Effective Date. The Effective Date is the date that the policy will take effect. The user may change this date at anytime while quoting. In one embodiment, the date must not be more than 45 days in the future. The producer code is selected, as in FIG. 25, Select the Producer Code. The user may select a Producer Code from the dropdown menu. If only one Producer Code exists, the one Producer Code will be displayed. A producer comprises a person or group of persons that are permitted to quote, write and bind policies.

Figure 27:
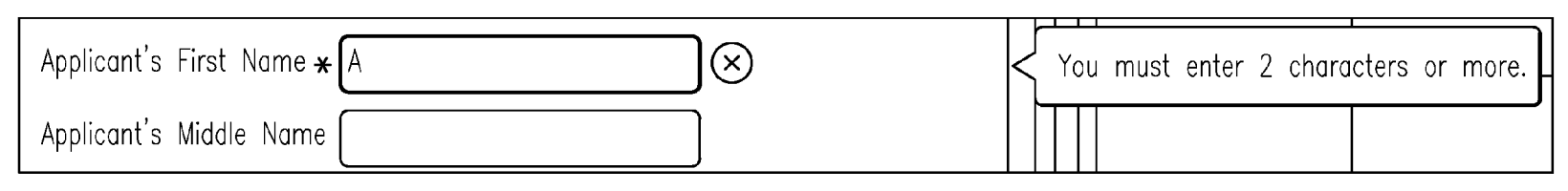

The user completes the quote form as shown in FIG. 26. The user must complete all required fields in the quote form. The fields will provide instant feedback. Error messages will automatically appear when fields are in error, as shown in FIG. 27. The user must complete fields correctly according to error messages.

When all fields on the quote form are complete, the quote will automatically be generated, for example as shown in FIG. 28. Once all required fields are complete, a revised quote will automatically be generated each time a user changes any field (required or optional).

Figure 29:
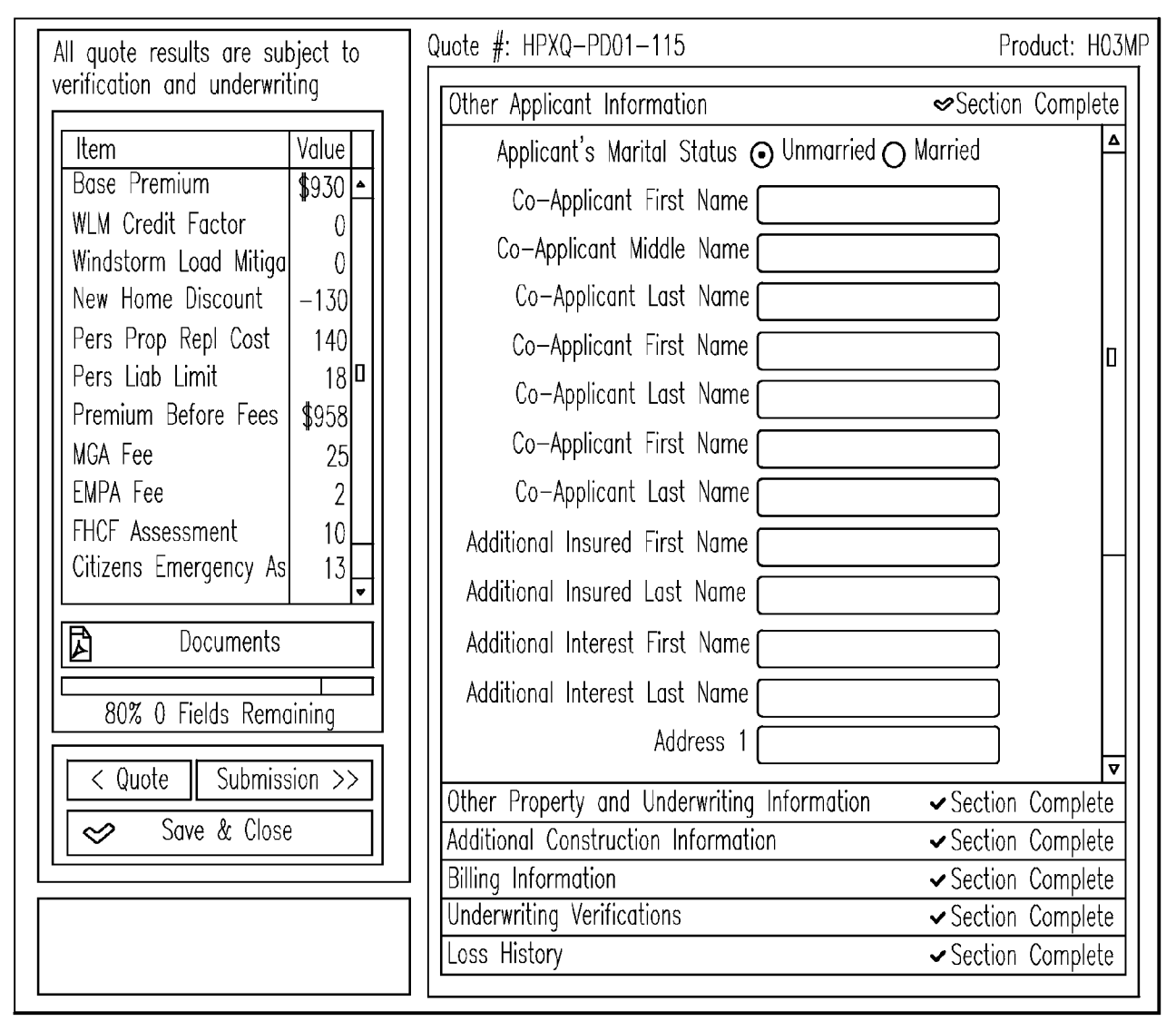
Figure 30:
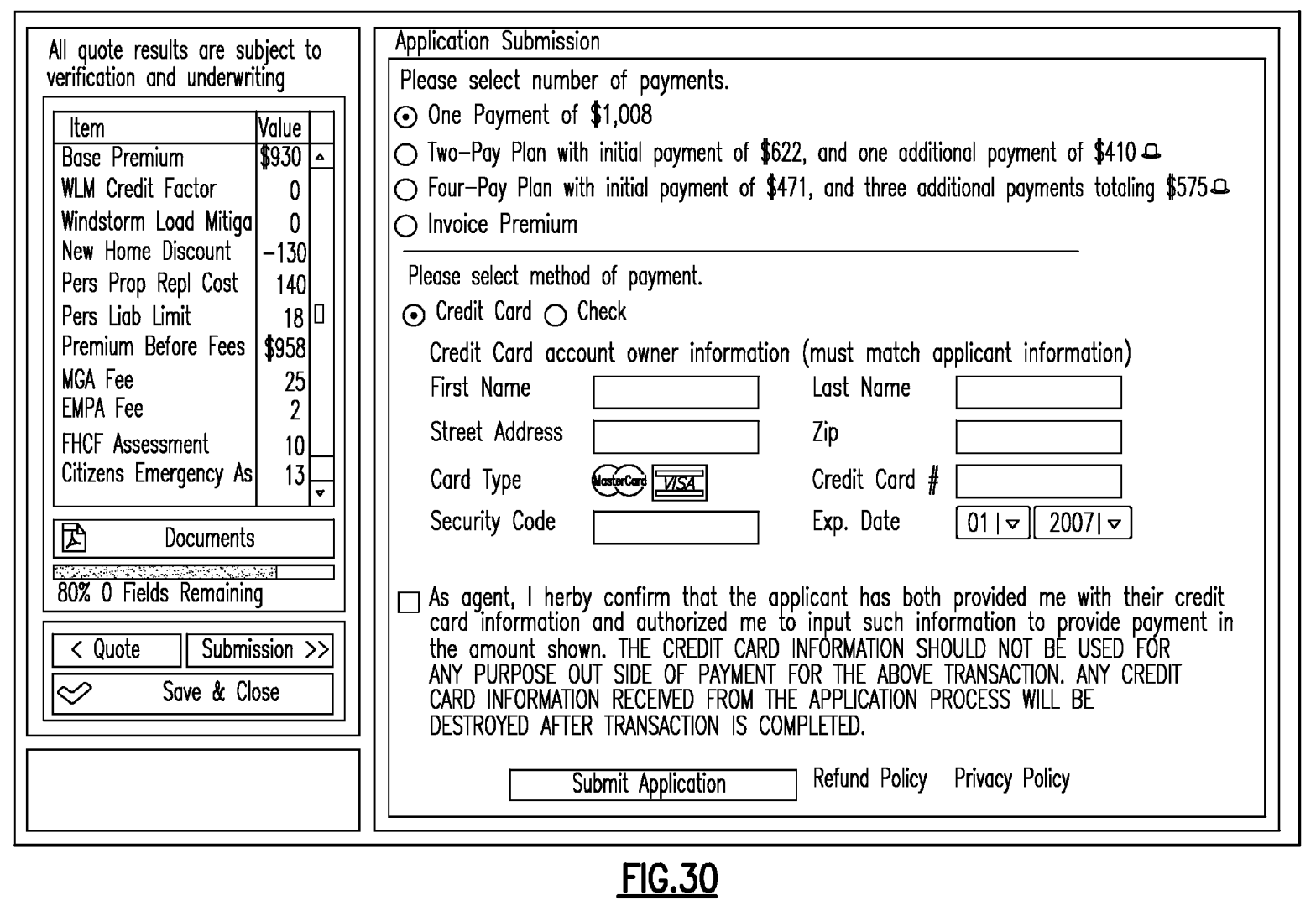

The user can initiate the generation of the application graphical user interface form, as shown in FIG. 29. Once the user activates the Application control, the Agency Portal shall shift to the left to display the Application interface. After the user has completed the application section, he may activate the Submission button to advance to the Application Submission screen, as illustrated in FIG. 30. After the user has entered the payee information and accepted the certification statement, he may activate the submit button to submit the application to the recipient, for example an insurance company and/or underwriter.

By providing inputs, processing and outputs based upon an editable XML document, the invention provides for unprecedented flexibility as to the quoting of and application for insurance policies.

By rendering fields based on the XML workbook, visually shown in FIGS. 18A-F, pxQuote gives a business user the power to define the user interface without having to alter complex code. Also, a business user can keep the interface separate from underlying ratings products, thus the insurance agent is not exposed to sensitive information.

Also, features within the interface are not exposed to the user unless certain requirements are met. This ensures that there is a certain progression to the quoting process that the user cannot bypass. This allows the business user to ensure that quotes that do not meet the requirements do not continue in the quoting process. By having a user interface that is based on a unique product, the business user can ensure that only quotes that fit the specified description are accepted. The business user is given full control of quotes and policies that are accepted, and can make changes instantly to the specifications. In one embodiment, constant feedback is provided to the user (i.e., no pages or steps). In another embodiment, instant quoting (no "submit" step) is provided and form entry errors or other mistakes are immediately fed back to the user. Real-time ability is provided to view variations on a quote without re-submitting entire form. Variations of a quote show users alternate quotes based on changes that they can make to their property, for example different types of roofing materials.

There have thus been provided new and improved methods and systems for processing insurance policy-related data based upon the use of an editable XML document(s). More particularly, the present invention provides for an editable XML document to a) define input data for requesting an insurance policy quote, b) processing the input data to generate the quote, and c) actually generate an insurance policy application where so desired. The editable XML document format for providing the various functions makes the process essentially limitlessly flexible and easily altered by lay-users. The invention has application in the field of consumer data collection and processing and more particularly in the field of insurance.

Generating a Workbook [pxBuilder]

This section describes one embodiment of a product builder module (pxBuilder). Products are XML data documents which fully describe a rater, including the interface description, table lookups, pricing logic, and business rules. A product is processed and/or interpreted by the pxQuote module and turned into a functioning rater application.

A product contains all of the information required to create a rating instance, including both the interface and pricing logic. This abstract representation of the rating application is available for editing by business users of the pxQuote application.

The pxQuote "Product Builder's Guide" and/or the pxBuilder module enables business users to create a valid product XML using a visual toolset, as opposed to hand-authoring an XML. It guides agents when they are creating products, which contain the fields and the categories that are required to process a quote.

A user must be logged into pxBuilder in order to access the system. Users will be validated upon login. FIG. 31A shows an exemplary login window with fields for entering a username 3101 and password 3102.

Once a user is recognized by pxBuilder, the user shall gain access to the various parts of pxBuilder according to his user rights. In order to successfully access pxBuilder, a user must be authenticated by the system. A user will be validated once he signs into the pxBuilder. FIG. 31B shows an exemplary welcome screen. The current instance of pxBuilder will be displayed at the very top right side of the pxBuilder screen 3103. When a user is authenticated by the system, his name 3104 is displayed beside the "Logout" control 3105 on the right side of the pxBuilder screen. Activating the "Logout" control from the top right side of the pxBuilder screen will close the current session and the user shall return to the Login screen.

If the Username and Password do not match the one stored in the system, the authentication message in FIG. 31C is displayed. The user must re-enter a valid Username 3106 and Password 3107 to proceed to the pxBuilder.

Upon authentication by the system, the user shall be presented with the pxQuote Products page, as shown in FIG. 31D. Users may create, copy or edit Products in different environments 3108. You will only see Products from your current environment. Local shall be the default environment 3109. A list of local copies shall be displayed 3110.

In order to add or clone a Product, the user must activate the "Add/Clone a Product Button" control 3111. The screen shown in FIG. 31E is displayed: To add/clone a Product, the user must select the location from which the Product will be cloned. Users will only see the Product from the environment they are in and may only clone to the local environment. All new Products will save to a local environment; the user must publish the Product to his desired environment. If a user clones a Product, there must be a difference between the original and the new Product. Clashing Products cannot exist within the server as each Product must at least have a new Product ID. Once the user selects an existing Product from the dropdown 3112, several of the required fields shall auto-populate, including the Product ID 3113, the Product Label 3114 and the Carrier ID 3115. He must create a Local Name 3116.

In one implementation, "Local Name" 3116 is the name for the Product as it is designated by the user. In one implementation, "New Product ID" 3113 is the identification for the Product as it is designated by the user. In one implementation, "New Product Label" 3114 is he label for the Product as it is designated by the user. The Product label shall be displayed on the pxBuilder Products page. In one implementation, "Carrier ID" 3115 is The Carrier ID as it is designated by the user. The Carrier ID shall be displayed on the pxBuilder Products page. Activating the "Create Product" control 3117 shall create a new Product. Activating the "Cancel" control 3118 shall return the user to the pxQuote Products page.

To edit an existing Product, a user must click on the Product name. Users may also view base criteria or delete a Product by clicking on the appropriate link. When a user clicks on an existing Product, the Basic Product Data is displayed, as shown in FIG. 31F. Users may update Product data under each category for Header 3119, Workbook 3120 and Application 3121.

Figure 31G:
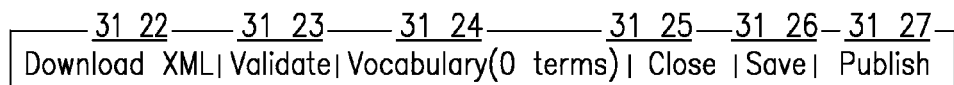
FIGS. 31A-AA show aspects of the pxBuilder module in one embodiment of system operation.
Figure 31H:
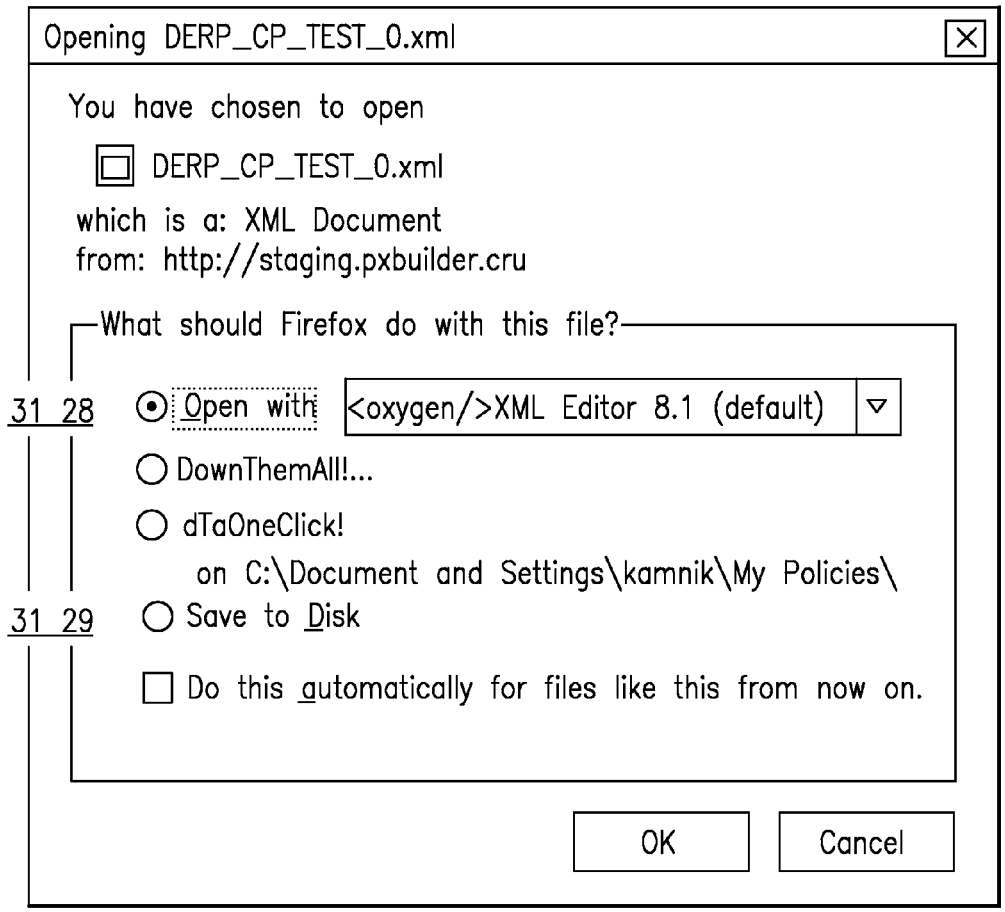
Figures 31I, 31J:

The Product Toolbar, an embodiment of which is shown in FIG. 31G, is located on the middle right side of the pxBuilder page. The links from the Toolbar are described in turn. Activating the "Download XML" link 3122 shall display the window shown in FIG. 31H. The user may select which option he wants to utilize to open 3128 or save 3129 the XML. Activating the "Validate" link 3123 shall validate the Product XML. The message shown in FIG. 31I will be displayed, with the validation message 3130 and validation source 3131. Activating the "Vocabulary" link 3124 shall connect the user to the Manage Vocabulary List page. Users can add or edit terms in the Vocabulary List. Activating the "Save" link 3125 shall connect the user to the Save Product page, an embodiment of which is shown in FIG. 31J. Activating the "Save Product" control 3132 shall save all changes to the Product. Activating the"Back to Products" control 3133 shall return the user to the pxBuilder Products page. Activating the "Publish" link 3127 shall connect the user to the Publish Document page, an embodiment of which is shown in FIG. 31K. Once a user selects a location 3134 to publish the Product, he must activate the "Publish Product" control 3135. The Product shall be published.

If the user activates the "Publish Product" control without selecting a location, the following error message is displayed: "No destination was specified in the request". If the Product is unavailable and the user selects a location and activates the "Publish Product" control, the following error message is displayed: "Not Found: The requested URL/service/products was not found on this server".

Activating the "Cancel" 3136 control shall return the user to the Basic Product Data page. Activating the "What am I about to change?" control 3137 shall provide users with a Product comparison. The differences between the new and existing Products shall be displayed to the user. If the user activates the "What am I about to change?" control without selecting a location, the error message shown in FIG. 31L is displayed, providing an informative error message 3138. If the user selects a location which is not available, the following error message is displayed: "Error getting the original product source". Activating the "Back" control shall return the user to the previous page.

You may update the data for a specific product from the individual sections from the Product Data page.

You may update sections of a Header by activating the appropriate controls on the Product Data page (see FIG. 31F). Activating the "Base Criteria" control 3139 shall connect the user to the Base Criteria page, an embodiment of which is shown in FIG. 31M. The Base Criteria are a superset of base criteria representing Products in the system. They enumerate the information that an agent must use to choose a specific Product. Therefore, the completion of the Base Selection Criteria results in only one Product. You cannot have two products with the same Base Criteria. Activating the "Add Base Criteria" control 3140 shall take the user to the page of the same name, as shown in FIG. 31N. To create new base criterion, complete the required fields and activate the "Add" control 3141. The required fields for adding base criterion are Name 3142, Label 3143 and Value 3144. Activating the "Cancel" control 3145 shall return the user to the previous page. If the user activates the "Add" control without completing the required fields, an error message is displayed requesting that the user enter the required fields for the new base criterion.

You may delete or update existing base criteria from the Base Criteria page. Activating the trash control 3146 shall display the pop-up window shown in FIG. 31O. To permanently delete the Base Criterion, activate the "Ok" control 3147. To close the pop-window and return to the Base Criteria page, activate the "Cancel" control 3148.

Click the link with base criterion 3139 to update its information. To save your updates to the base criterion, activate the "Apply Changes" control 3149. To discard changes and return to the previous page, activate the "Cancel" control 3150.

You may update sections of a Workbook by activating the appropriate controls on the Product Data page (see FIG. 31F).

Input Forms are the external pieces of information needed by the rater to quote the Product. These include fields that will be rendered by the interface to collect user-supplied information as well as external data that may be required to process a quote. This includes simple validation rules, including data type. Activating the "Input Form" control 3151 shall link the user to the Edit Workbook Input Form page, an embodiment of which is shown in FIG. 31Q. Users may edit any part of the Workbook Input Form. Activating the "Apply Changes" control 3152 shall save all changes and return the user to the Basic Product Data page. Activating the "Cancel" control 3153 shall Cancel all changes and return the user to the previous page.

The updates required for future Products are detailed below. The input fields must be labeled exactly as they are listed below.

```
<xs:enumeration value="BCEGCode"/>
<xs:enumeration value="SquareFootUnderRoof"/>
<xs:enumeration value="ConstructionYear"/>
<xs:enumeration value="ProtectionClass"/>
<xs:enumeration value="InHRAEligibleArea"/>
<xs:enumeration value="DistanceWater"/>
<xs:enumeration value="Elevation"/>
```

The changes to syntax to auto-calculate coverages off of Coverage A are described below.

Accepted values for <REFERENCE NAME> are: any string. Accepted values for <REFERENCE TO FIELD> are: any valid <REFERENCE NAME>. Accepted values for <OPERATOR> are: add, subtract, multiply, divide. Accepted values for <OPERAND> are: any number.

When setting the value of one (1) field based upon the value of one (1) other field: <xf:input ref="<REFERENCE NAME>" linkedFields="<REFERENCE TO FIELD>" operations="<OPERATOR>, <OPERAND>" maxvalue="5000" minvalue="1"/>.

EXAMPLE

```
<xf:input ref="CoverageA" maxvalue="500000" minvalue="1"/>
    <xf:input ref="CoverageB" linkedField="CoverageA" operation="multiply,.1" maxvalue="300000" minvalue="1"/>
        <xf:input ref="CoverageC" linkedField="CoverageA" operation="multiply,.5" maxvalue="300000" minvalue="1"/>
```

When setting the value of one (1) field based upon the value of multiple fields:

```
<xf:input ref="<REFERENCE NAME>" linkedFields="<REFERENCE TO FIELD>,<REFERENCE TO FIELD>" operations="<OPERATOR>" />
```

EXAMPLE

```
<xf:input ref="CoverageA" maxvalue="500000" minvalue="1"/>
<xf:input ref="CoverageB" maxvalue="300000" minvalue="1"/>
<xf:input ref="CoverageC" maxvalue="300000" minvalue="1"/>
<xf:input ref="CoverageD" maxvalue="300000" minvalue="1"/>
<xf:input ref="Total" linkedFields="CoverageA,CoverageB,CoverageC,CoverageD" operation="add"/>
```

The ixLocator interface is configured by adding an id attribute to an xf:group node. The node must contain the user input fields pertaining to the property's address: PropertyStreetNumber, PropertyStreetName, PropertyAddressLine2, PropertyCity, PropertyState, PropertyZip, and PropertyZipPlusFour. A button labeled "Validate address" is automatically appended to this group and will become enabled when all of the required elements in the ixLocator group have been completed. The ixLocator group may appear as its own section, or it may appear as a subsection of another group. If it is a top-level group, then a label node should appear as the first sub-element of the group. If the ixLocator interface is a sub-element of another group, no label node is required. PropertyAddressLine2 and PropertyZipPlusFour are not required by ixLocator.

EXAMPLE

```
<xf:group id="ixLocator">
<xf:input ref="PropertyStreetNumber" required="true type="text">
    <xf:label>
      Street Number
    </xf:label>
</xf:input>
<xf:input ref="PropertyStreetName" required="true" type="text">
    <xf:label>
      Street Name
    </xf:label>
</xf:input>
<xf:input ref="//PropertyCity" required="true" type="text">
    <xf:label>
      City
    </xf:label>
</xf:input>
<xf:select1 appearance="full" default="FL" ref="//PropertyState" required="true">
    <xf:label>
```

```
        State
    </xf:label>
    <xf:item>
        <xf:label>
            FL
        </xf:label>
        <xf:value>
            FL
        </xf:value>
    </xf:item>
</xf:select1>
<xf:input ref="PropertyZipCode" required="true"
type="zipcode">
    <xf:label>
        ZIP
    </xf:label>
</xf:input>
</xf:group>
```

Forms code rules are dependent on the number of selections which shall be presented for the item. They are as follows: If the number of enumerations is one or two, radio buttons shall be displayed. If the number of enumeration is three, a list box shall be displayed. If the number of enumerations is either four or higher, a dropdown box shall be displayed.

The TextArea control is very similar to the TextInput control and will accept all of the same attributes except maxvalue and minvalue. The value of the type attribute must be one of the following: text, string, or " ".

EXAMPLE

XForms TextArea Control

```
<xf:textarea ref="Comment" type="" maxlength="250">
<xf:label>Comment</xf:label>
</xf:textarea>
```

The Range control has two exclusive states: a horizontal slider, or a date chooser.

EXAMPLE

Slider

```
<xf:range ref="Deductible" start="-2.0" end="2.0" step="0.5">
<xf:label>Balance</xf:label>
</xf:range>
```

EXAMPLE

Date Chooser

```
<xf:range ref="EffectiveDate" start="2001-01-01" end="2001-12-31">
<xf:label>Ship Date</xf:label>
</xf:range>
```

The new attribute for XForms control is "affectspremium." When it is set to "false," it will not trigger a requote on change to that field. If it is set to "true" or it is not present, it will continue to requote upon any changes to the field.

affectsEligibility determines which fields shall impact eligibility, including but not limited to Coverages, Distance to Fire Hydrant, etc. Fields such as First Name and Last Name do not affect eligibility. The default is "true;" to turn off affectsEligibility, the agent must enter "affectEligibility=false." Rating Impact is used to tell pxServer the complexity of rating. You may use: If the complexity of rating is simple, only Rating is used. If the complexity is complex, Rating and Scoring is used. If the complexity is very complex, Rating, Scoring and Modeling is used. If the complexity is not complex, it may remain blank as there is no rating impact. The only attribute values of "R", "RS", or "RSM" are supported. No other order of R, S, or M is permitted.

The XForms control "xf:help" shall populate any text from Help fields to the Help widget. To denote required fields in the application side you must now use appRequired="true", not required="true". The linkedfields attribute no longer is supported. Instead there is a calculation attribute. In this attribute you can write any mathematical function, by surrounding input references with "[ ]".

EXAMPLE

To calculate TIV, you just have to add the attribute calculation="[CoverageA]+[CoverageB]+ [CoverageC]"

The affectspremium attribute is no longer supported and should be removed from the product. There is now an additional step for adding inputs to both the Quote and Application. You may continue to add form fields the same way as before, except default values are no longer handled within the field declaration. There is now an <xf:instance> element underneath the <xf:model>. See the example below. When a form field is added, it must also be added to the appropriate area of the model. This is also where you may declare default values. Please add the XML under the area highlighted yellow to the input form just under the xf:model declaration. Please leave all input fields below that are unfamiliar to you intact. Many are necessary for cxRisk. Any input fields you add to either the quote or application side must also be added in the appropriate area of the xf:instance.

EXAMPLE

```
<InputForm>
<xf:model xmlns:xf="http://www.w3.org/2002/xforms">
<xf:instance>
<PolicyRequest locationid="" percentagecomplete="" producercode="" useragent="" username="">
    <flags/>
    <basecriteria>
        <Carrier/>
        <Product/>
        <EffectiveDateRange/>
    </basecriteria>
    <quoteform>
        <inputs>
            <input name="InsuredName" value="Rama Poola"/>
            <input name="BuildingNumber" value=""/>
            <input name="BuildingLocation" value=""/>
        </inputs>
    </quoteform>
```

```
        <appform>
            <inputs>
                <input name="InsuredContactName" value=""/>
                <input name="InsuredMailingAddressLine1"
                    value=""/>
                <input name="InsuredMailingAddressLine2"
                    value=""/>
            </inputs>
        </appform>
    </PolicyRequest>
</xf:instance>
```

Expressions are the rating calculations which establish the parameters which shall be utilized to calculate data in order to produce a quote.

Activating the "Expressions" control 3153 shall link the user to the Workbook Expressions page, an embodiment of which is shown in FIG. 31R. Activating the "Add New Expression" control 3154 shall link the user to the page of the same name, an embodiment of which is shown in FIG. 31S. The Expression Name 3155 is a required field. Activating the "Validate and Save" control 3156 shall check that all required fields have been completed for the new expression. Activating the "Cancel" control 3157 shall cancel the user actions. The user shall return to the Workbook Expressions page. If the required field has not been completed, the following error message will be displayed: "Expression Errors: The expression name is required". Activating the trash control 3158 shall remove the Workbook Expression from the list.

Figure 31T:
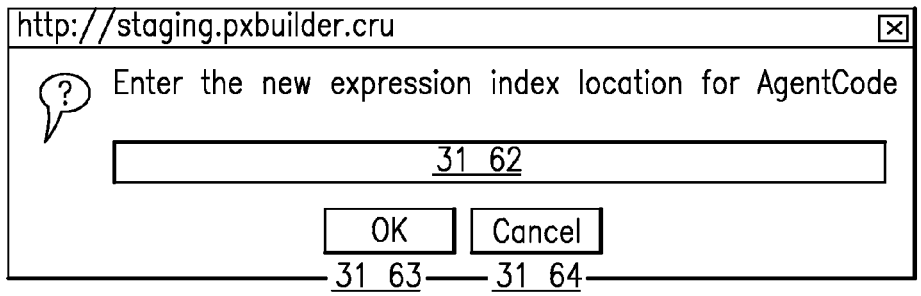

Activating the down arrow control 3159 shall move the Workbook Expression to one position below the current location. Activating the up arrow control 3160 shall move the Workbook Expression to one position above the current location. Activating the cross arrows control 3161 shall produce the pop-up window shown in FIG. 31T. The user shall enter the new location 3162 for the selected Expression. The new location must be numerical. Activating the "Ok" control 3163 shall move the Expression to the assigned place. Activating the "Cancel" control 3164 shall cancel the window. The user shall remain on the Workbook Expressions page.

Users can create Expressions to access any of the root level data with Calculations, including Percentage Complete and Policy ID.

Percentage Complete: pxq.attributes.percentageComplete.

PolicyID: IIF(pxq.attributes.percentageComplete GTE 1, DE('HPC1' & RepeatString('0', 6-Len(pxq.attributes.index)) & pxq.attributes.index), DE(" ")).

Figure 31U:
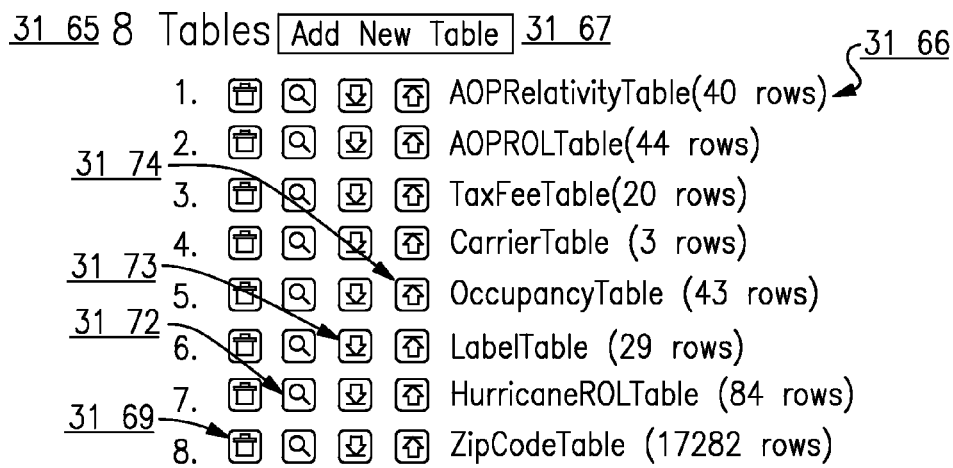

The Tables page, an embodiment of which is displayed in FIG. 31U, displays all available Tables. Tables hold the data used for rating. You may add a new Table or delete, review or move existing Tables. The number of existing Tables is presented in the header 3165. The number of rows for each Table is displayed beside the name of the Table 3166.

Activating the "Add New Table" control 3167 takes you to the page of the same name, an embodiment of which is shown in FIG. 31V. To add a new Table, activate the "Browse" control 3168. A File Upload window shall be displayed. You must select the Table from its current location and activate the "Open" control. Once the name and location of the Table appears in the Add Table text box, activate the "Upload Table XML" control. If the table was not saved in the right method, the following error message is displayed: "That table is not valid XML".

Figure 31W:
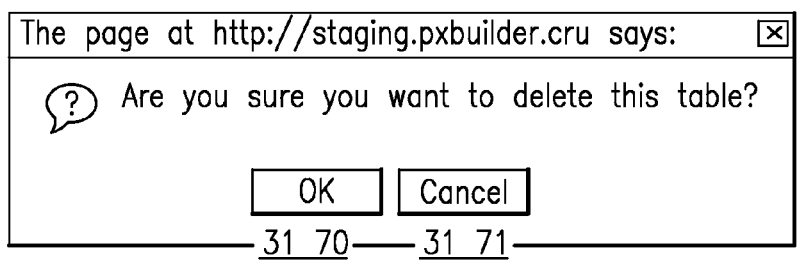
Figure 31A:
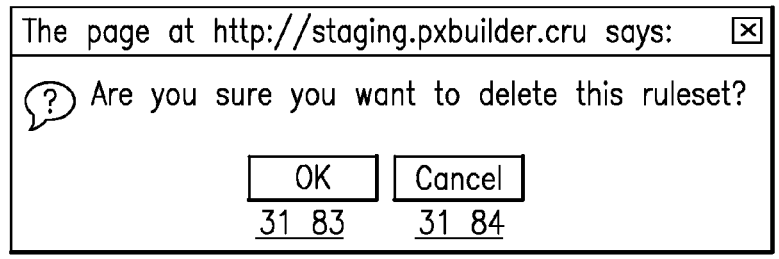

Activating the trash control 3169 displays the pop-up window shown in FIG. 31W. To permanently delete the Table, activate the "Ok" control 3170. To close the pop-window and return to the Tables page, activate the "Cancel" control 3171.

Activating the magnifying glass control 3172 shall open the selected Table. Activating the down arrow control 3173 shall prompt the Open Table pop-up window. You can open the Table with your preferred XML software or save to disk. Activating the up arrow control 3174 shall connect you to the Replace Table page, an embodiment of which is shown in FIG. 31X. To replace your current Table, active the "Browse" control 3175. A File Upload window shall be displayed. You must select the Table from its current location and activate the "Open" control. Once the name and location of the Table appears in the Add Table text box, activate the "Upload Table XML" control 3176. If the table was not saved in the right method, the following error message is displayed: "That table is not valid XML".

Rulesets are complex input validation and business rule evaluations that are processed by cxLogic and evaluated by pxQuote. The Product supports the inclusion and extension of the cxLogic schema, including the desired outcome of a TRUE or FALSE evaluation, which is then sent back to the quoting client where the outcome is carried out. Activating the"Rulesets" control 3177 takes you to the page of the same name, embodiments of which are shown in FIGS. 31Y and 31Z.

You must select your cxLogic Ruleset Source from the radio control buttons 3178. You must select your Ruleset from the Add Ruleset dropdown 3179. Once it is selected from the dropdown, the Ruleset will appear as the final item on the Ruleset List 3180. The number of Rulesets in the Workbook Rulesets header 3181 shall update automatically.

Activating the trash control 3182 displays the pop-up window shown in FIG. 31AA. To permanently delete the Ruleset, activate the "Ok" control 3183. To close the pop-window and return to the Ruleset page, activate the "Cancel" control 3184.

cxRisk Portfolio Quantification and Scoring

This section presents a discussion of some embodiments of cxRisk Portfolio Quantification and Scoring. In some, but by no means all, embodiments, the following definitions may apply:

Event Loss File ("ELF")—Event loss file is the table containing the expected loss per event from a probabilistic simulation. This information is generally provided by catastrophe vendor models AIR or RMS but is not limited to these models.

Portfolio Summary Files ("PSF")—Portfolio summary file is the information such as premium, FHCF premium, expenses, non-cat loss and so on for a given portfolio.

Reinsurance Definition Files ("RDF")—Reinsurance definition file with its reinsurance layer definition file ("RLDF") describes the reinsurance structure with either given value or method for attachment point, exhaustion point, layer limit, layer premium, layer reinstatement premium and so on.

Reinsurance Layer Input File ("RLIF")—Reinsurance layer input file is similar to the RLDF with calculated attachment/exhaustion point, premium, layer ceded premium, layer reinstatement premium, layer occurrence limit (the maximum loss can be recovered by reinsurance if only one event occurs) and aggregate limit (the maximum recoverable losses in a year). It's derived from RLDF and PSF (if necessary). The math is straightforward.

Year Loss File ("YLF")—Year loss file lists losses per simulation year. It also shows each event with its loss in every cat year.

Reinsurance Layer Output File ("RLOF")—Reinsurance layer output file combines YLF with RLIF and shows the layer loss and ceded loss for every event in each simulation catastrophe year.

Reinsurance Output File ("ROF")—Reinsurance output file summarizes the layer loss and ceded layer loss in each year from RLOF.

Yearly Income Statement ("YIS")—Year income statement calculates more information related to each cat year including premium, expenses, non-cat losses, ceded cat losses and so on.

Capital Definition File ("CDF")—Capital definition file describes the method and lists the values useful to calculate the capital or capital required based on PSF and YIS.

Portfolio Profit Analysis ("PPA")—Portfolio profit analysis summarizes information from YIS and presents values such as capital required, breakeven premium, adequate premium and so on.

TABLE 1

An example of ELF

| EventId | YearId | EventRate | GrossLoss |
|---|---|---|---|
| 1 | 1 | 0.10% | 114 |
| 2 | 2 | 0.15% | 98 |
| 3 | 2 | 0.08% | 76 |
| 4 | 3 | 0.36% | 54 |
| 5 | 4 | 0.06% | 35 |
| 6 | 4 | 0.14% | 24 |
| 7 | 5 | 0.24% | 11 |
| 8 | 6 | 0.03% | 9 |

TABLE 2

An example of YLF

| YearId | GrossLoss | GrossLossEvent1 | GrossLossEvent2 |
|---|---|---|---|
| 2 | 174 | 98 | 76 |
| 1 | 114 | 114 | |
| 4 | 59 | 35 | 24 |
| 3 | 54 | 54 | |
| 5 | 11 | 11 | |
| 6 | 9 | 9 | |

To get the YLF from ELF, we need to do the summation on the gross loss through all years. For instance, Table 1 lists an ELF with only eight events. Event 2 and 3 happen in the same cat year 2 and event 5 and 6 happen in cat year 4 while the other four events happen in other four cat years respectively. To get the YLF (Table 2), we need to look through all years. For year 1, there is only one event related to it and the gross loss is 114 million. For year 2, event 2 and 3 both contribute loss to it and the total is 174 million. And we do the same for the rest of the years. In the YLF, it also lists gross loss per event at each cat year. The maximal number of events happened in one year in this example is two and therefore only two gross loss event columns are shown.

TABLE 3

Variables in reinsurance structure, in one embodiment

| Variable | Symbol | Description |
|---|---|---|
| Participation | Pp | the percent of the layer going to be covered |
| AttachmentPoint | At | the lower bound of the layer |
| ExhaustionPoint | Ex | the upper bound of the layer |
| LayerDeductible | LD | the amount of the loss retained to client |
| OccurrenceLimit | OL | the full loss coverage for one event occurrence |

TABLE 3-continued

Variables in reinsurance structure, in one embodiment

| Variable | Symbol | Description |
|---|---|---|
| AggregateLimit | AL | the upper limit of full loss coverage for one cat year |
| PremiumLayer | PL | the cost of purchasing the full reinsurance layer |
| PremiumCeded | PC | the actual reinsurance layer cost considering the participation |
| ReinstatementPremium | RP | the cost of purchasing the reinstatement reinsurance |

Now we add the RLIF to get the RLOF. Before we do that, we are first going to see some definitions of reinsurance structure in one embodiment in Table 3. Attachment and exhaustion are the two bounds of the layer. They can be given as fixed values in RLDF, they can be calculated based on the losses at a certain return periods from a given portfolio, or they can be derived from an alternative means (i.e. the FHCF premium using some multipliers given by Florida Hurricane Catastrophe Fund). Occurrence limit confines the maximum recovered losses for each layer in one occurrence. Aggregate limit caps the total recovered losses for each layer in one cat year. Aggregate limit is equal to occurrence limit if there is no reinstatement reinsurance purchased.

The reinstatement premium calculation may be more involved if it's not prepaid up front. There are many contracts containing reinstatement provision as "1 at 100%". That means the contract has one reinstatement with the reinstatement premium calculated as 100% of reinsurance cost for pro rata limit. It's paid after the occurrence of one event to reinstate the coverage to full limit for second occurrence. Formula 1.1 below describes how to calculate the reinstatement premium of one layer.

$$RP = ROL \times f \times L \qquad (1.1)$$

where ROL is rate on line of each layer; f is the fraction of reinstatement premium rate versus up-front premium. In the example above, f=100%; and L is the loss of the layer.

Since $PL = ROL \times OL \times P_p$ (see below), we have:

$$RP = \frac{PL}{OL \times P_p} \times f \times L = PL \times f \times \frac{L}{OL \times P_p} \qquad (1.2)$$

TABLE 4

An example of reinstatement program

| LayerId | OccurrenceLimit | PremiumLayer | Participation | LayerLossEvent1 |
|---|---|---|---|---|
| 1 | 10 | 2 | 100% | 8 |

For example, if the reinstatement provision specifies premium as "1 at 100%", then according to Table 4, we have $$RP = 2 \times 100\% \times \frac{8}{10 \times 100\%} = 1.6.$$

TABLE 5

First example of getting RLOF from RLIF and YLF

| LayerId | Attachment | Exhaustion | OccurrenceLimit | AggregateLimit | Participation |
|---|---|---|---|---|---|
| 1 | 3 | 8 | 5 | 10 | 1 |

| YearId | Layerid | GrossLossEvent1 | GrossLossEvent2 | CededLossEvent1 | CededLossEvent2 |
|---|---|---|---|---|---|
| 1 | 1 | 5 | 7 | 2 | 4 |
| 2 | 1 | 9 | 7 | 5 | 4 |
| 3 | 1 | 5 | 9 | 2 | 5 |

Next we are studying the calculation of cat losses. Suppose we are given a reinsurance layer with 3 million at attachment and 8 million of exhaustion with 100% participation. The occurrence limit is 5 million and aggregate limit is 10 million. We have three years all with two events listed in Table 5. For year 1, the first event happens with gross losses of 5 million. It will generate 5−3=2 million ceded losses. The second event causes 7 million losses and have 7−3=4 million ceded losses. For year 2, the first event has 9 million in losses which are bigger than the exhaustion point. This will cause 5 million ceded losses by considering the occurrence limit. The second event will bring 4 million ceded losses with total gross losses of 7 million.

TABLE 6

Second example of getting RLOF from RLIF and YLF of RLOF

| LayerId | Attachment | Exhaustion | OccurrenceLimit | AggregateLimit | Participation |
|---|---|---|---|---|---|
| 1 | 3 | 8 | 5 | 5 | 1 |

| YearId | Layerid | GrossLossEvent1 | GrossLossEvent2 | CededLossEvent1 | CededLossEvent2 |
|---|---|---|---|---|---|
| 1 | 1 | 5 | 7 | 2 | 3 |
| 2 | 1 | 9 | 7 | 5 | 0 |
| 3 | 1 | 5 | 9 | 2 | 3 |

In our second example, we change the aggregate limit from 10 million to 5 million and remain all other the same. In year 1, event 1 happens with 5 million losses again and the ceded losses are 2 million, the same as in the previous example. Event 2 makes 7 million losses and it supposes to bring 4 million ceded losses. However, since the total ceded losses is capped by aggregate limit, the ceded loss for event 2 is 5 (aggregate limit)−2 (previous ceded loss)=3 million. From the examples above, we can summarize the formulas. Declare, for the present embodiment:

L≡Event loss

CL≡Ceded loss

TCL≡Total existing ceded loss, i.e. summed ceded loss from previous events and refer to Table 3, we have $$CL = \text{MIN}(AL-TCL, \text{MIN}(OL, L-At)) \times Pp \quad (1.3)$$

Using previous example, in Table 6 year 1 has two events. For the first event, the ceded loss is equal to MIN(5−0, MIN(5, 5−3))×100%=MIN(5, 2)=2. For the second event, the ceded loss is equal to MIN(5−2, MIN(5, 7−3))×100%=MIN(3, 4)=3.

TABLE 7

An example of ROF

| Yearid | GrossLoss | CededLoss | NetLoss |
|---|---|---|---|
| 1 | 12 | 6 | 6 |
| 2 | 16 | 9 | 7 |
| 3 | 14 | 7 | 7 |

After we get the RLOF, we can sum the ceded loss through all layers for each cat year to get the ROF. An example of ROF can be seen from Table 7. The net loss stands for the loss retained after subtracting ceded loss from gross loss.

TABLE 8

An example of PSF

| Premium | PremiumFHCF | OtherRevenue | Expenses | NonCatLosses |
|---|---|---|---|---|
| 100 | 13 | 5 | 25 | 20 |

| YearId | Noncat-Losses | GrossCat-Losses | CededCat-Losses | NetCat-Losses | Under-writingIncome |
|---|---|---|---|---|---|
| 1 | 20 | 12 | 6 | 6 | 19 |
| 2 | 20 | 16 | 9 | 7 | 18 |
| 3 | 20 | 14 | 7 | 7 | 18 |

TABLE 9

An example of YIS

| YearId | Premium | Other-Revenue | Reinsurance-Premium | Reinstatement-Premium | Expenses |
|---|---|---|---|---|---|
| 1 | 100 | 5 | 25 | 10 | 25 |
| 2 | 100 | 5 | 25 | 10 | 25 |
| 3 | 100 | 5 | 25 | 10 | 25 |

If we add information from PSF, we are able to construct the YIS now. Examples are shown in Table 8 and Table 9. Note underwriting income is the net income after subtracting all the costs such as reinsurance cost, non cat loss, net cat loss and expense from the gross income.

CDF states the capital structure and specifies the method used to calculate the capital. There are many differing motivations to manage capital including:

- Compliance with regulatory guidelines—State regulators and the National Association of Insurance Commissioners provides guidance and, in some cases, directs company action based on the ability of insurance companies to maintain capital levels in compliance with various metrics.
- Compliance with rating agency guidelines—Rating Agencies such as AMBest, Standard & Poor's and Moody's have general guidelines and complex models that provide guidance on how much capital is required based on a given insurance company or companies business/risk profile.
- Internal Risk Management Measures—As part of ordinary course business practice, insurance companies create a framework to assess the adequacy of capital levels in comparison to their business profile.

For instance, an insurance company might be asked to put at least $2 for $1 potential net cat loss. CDF might also specify the capital charge and required ROC.

By applying CDF on YIS file, we are able to get the portfolio profit analysis file. As seen in Table 9, the underwriting income is calculated for each cat year. The average of underwriting income is the expected underwriting income before applying the capital charge if any.

In one embodiment, we have definitions:
P≡Premium
I≡Other income revenue
E≡Expense
NCL≡Non Cat Losses
RL≡Retained Losses, i.e., net cat losses
NL≡Net Losses (NCL+RL)
R≡Reinsurance Premium (Include reinstatement premium)
BP≡Breakeven Premium
AP≡Adequate Premium
C≡Capital Required
Pt≡Profit
ROC≡Return on Capital The revenue is primarily or entirely from the premium. Some other revenue, if any, may be considered. The cost includes expense, reinsurance cost, non catastrophe loss, and net catastrophe loss.

$$Pt=P+I-E-NCL-RL-R \qquad (1.4)$$

$$ROC = \frac{Pt}{C} \qquad (1.5)$$

Note the expense and non cat loss are generally given as a portion of the premium or of the total insured value (TIV). It's determined by individual client. Breakeven premium is another important value in PPA file. It's the premium that makes the income equal to the cost.

$$0=BP+I-E^*-NCL^*-RL-R \qquad (1.6)$$

E* and NCL* are the expense and non cat loss associated with the breakeven premium. That means if they are derived from breakeven premium, when solving the above formula, those two values should be taken as unknown variables too. With another two formulas describing the relationships between expense and breakeven premium as well as non cat loss and breakeven premium, we are able to work out the breakeven premium.

$$E^*=BP \times Er \qquad (1.7)$$

$$NCL^*=BP \times NCLr \qquad (1.8)$$

where Er is expense ratio and NCLr is the non cat loss ratio.

Similarly, adequate premium is the premium to make the required return on capital.

$$ROC^* \times C=AP+I-E^*-NCL^*-RL-R \qquad (1.9)$$

where ROC* is the required return on capital given in CDF and E* and NCL* are the expense and non cat loss associated with the adequate premium this time.

Scoring is a process to evaluate the individual risk with some specific methods. According to different methods, scoring can be grouped as marginal scoring, standalone scoring and allocated scoring.

Marginal scoring is to rate the risk by evaluating the impact of adding the individual risk to a specific portfolio. The portfolio can be a current existing portfolio in the company. The impact to be considered can be change of the predicted loss or it can be the marginal values in finance such as change of profit. Stand alone scoring is to rate the risk according to its own information such as its simulated losses. Allocated scoring is similar to marginal scoring to the extent that it considers a risk in the context of a portfolio of risks. However, allocated scoring does not give individual risks the entire benefit of diversification that marginal scoring provides. Instead, allocated scoring allocates a portion of the losses, reinsurance costs, capital, et al associated with the considered risk. This is done whenever the losses, reinsurance costs, capital, et al cannot be directly attributed to an individual risk. These amounts are generally distributed by the considered risk's contribution to the losses of the portfolio.

When asked to compare two risks, it's very reasonable to think which risk will be better to the current portfolio if added. That's the idea of marginal scoring. The marginal scoring requires knowing of portfolio used and some of individual risk information such as event losses from the cat models. In general, we are seeking for the values of variables like ΔPML, $$\frac{\Delta AAL}{\Delta P},$$

and ΔROC.

When adding a new risk, several obvious changes are premium, FHCF premium (if applicable), and event loss table. Premium and FHCF premium are just the amounts carried by the risk. The new event loss table is given by linearly adding the corresponding losses for each event from the risk ELF to the portfolio ELF.

TABLE 10

An example of combining ELF

| EventId | YearId | EventRate | GrossLoss |
|---------|--------|-----------|-----------|
| PORTFOLIO ELF | | | |
| 1 | 1 | 0.10% | 14 |
| 2 | 2 | 0.15% | 10 |
| 3 | 2 | 0.08% | 25 |
| 4 | 3 | 0.36% | 7 |

TABLE 10-continued

An example of combining ELF

| EventId | YearId | EventRate | GrossLoss |
|---------|--------|-----------|-----------|
| RISK ELF | | | |
| 1 | 1 | 0.10% | 2 |
| 3 | 2 | 0.08% | 1.5 |
| 4 | 3 | 0.36% | 1.8 |
| 5 | 3 | 0.05% | 0.3 |
| COMBINED ELF | | | |
| 1 | 1 | 0.10% | 16 |
| 2 | 2 | 0.15% | 10 |
| 3 | 2 | 0.08% | 26.5 |
| 4 | 3 | 0.36% | 8.8 |
| 5 | 3 | 0.05% | 0.3 |

Table 10 gives an example of combining two event loss files. If we add the risk ELF to the portfolio ELF shown, we can easily get the combined ELF in the bottom. The events only appear either in portfolio ELF or in risk ELF are copied directly while for those common events the gross losses are added in the combined ELF.

TABLE 11

An example of getting PML from YLF

| YearId | MaximumLoss | OEP |
|--------|-------------|------|
| 1 | 114 | 0.01% |
| 2 | 98 | 0.02% |
| 3 | 54 | 0.03% |
| 4 | 35 | 0.04% |
| 5 | 11 | 0.05% |
| 6 | 9 | 0.06% |

PML stands for probable maximum loss at given return period. It determines how large a loss will occur at the given probability level. PML is got from the exceedance probability ("EP") curve derived from ELF (see Appendix A) or from the YLF. According to Table 1 and Table 2, we build Table 11 which shows an example of getting the PML from YLF. Assume the number of total cat years we simulate is 10,000. In each cat year, we find the maximum event gross loss. For instance in year 2, two events occur and the maximum event loss is 98 million. OEP stands for occurrence exceedance probability. It is the probability of having event with loss exceeding the maximum loss given in the second column. For example in row 2, the maximum loss is 98, there are two cat years which are year 1 and year 2 at which events occur with loss bigger and equal to 98 million. Therefore the OEP for row 2 is equal to 0.02%=2/10000. The PML is based on the OEP. For the given return period 2000 (meaning the OEP is 1/2000), for example, the PML is equal to 11 million which is the maximum loss at OEP equal to 1/2000. For some probability level which is not in the table, we use the linear interpolation method to get the exceedance loss. The same way can be used to construct the AEP which stands for aggregate EP curve. Instead of using maximum loss, AEP is based on the aggregate loss for each year.

As mentioned, by adding a risk into a portfolio we are adding more losses which results in the EP curve changes. To get the delta PML, theoretically, we suppose to use the new EP curve which is generated in the cat models, find the new PML at given point, and then compare with the old PML. However, this won't catch the enough information to evaluate the impact of the additional risk. A slight change of loss on one event might change the order of the events in the event loss table and cause the huge difference on the PML according to the theoretical method. Therefore we need a method gives less random and more consistent results.

Instead of using one point, we consider the events in the neighborhood of the required return period from the portfolio EP (constructed from ELF or YLF). The exceedance range size should be set to be reasonable: if it's too wide, we are losing the specialty of the given return period; if it's too narrow, results might not be comparable. After the range has been set, delta PML can be got from the formula below.

$$\Delta PML = PML \times \frac{\sum_n \Delta L}{L} \quad (2.1)$$

The steps are:
For each event in the PML range, calculate the loss change ratio $$\frac{\Delta L}{L}.$$

Average the ratio through n events in the range.
Multiple the PML of the portfolio by the average ratio from step 2.

TABLE 12

An example of delta PML

| EventId | YearId | EventRate | Portfolio Loss | Combined Loss | Change Ratio |
|---------|--------|-----------|----------------|---------------|--------------|
| 1 | 1 | 0.10% | 14 | 16 | 14% |
| 2 | 2 | 0.15% | 10 | 10 | 0% |
| 3 | 2 | 0.08% | 25 | 26.5 | 6% |
| 4 | 3 | 0.36% | 7 | 8.8 | 26% |

Using the example in Table 10, suppose events 1~4 are selected in the PML range. The loss change ratio for each event is listed in Table 12 and therefore the average ratio is 10.5%. This value times the portfolio PML is taken as the ΔPML. Note again the delta PML calculated in this method is not the actual marginal PML by actually adding the risk. It's more a value which carries information for variations of the EP or ELT around given return period.

$$\frac{\Delta AAL}{\Delta P}$$

is another common ratio in ranking of the risks. It measures how much loss the risk brings to receive one dollar premium. The bigger the ratio, the lower rank the risk has. After the risk has been modeled, this ratio can be calculated independently without the portfolio. ΔAAL is got from the event loss table of the risk by summing the loss weighted by event rate. ΔP is the given premium of the risk. Using the example in Table 10, the risk AAL is equal to 2×0.001+1.5×0.0008+1.8×0.0036+0.3× 0.0005=0.00983.

To calculate the delta return of capital, we have to get the delta profit ΔPt and delta capital ΔC. We saw profit is defined as the difference between total income cash flow and total outcome cash flow.

If we add a risk to an existing portfolio, the premium will be increased of the amount for the additional risk. Therefore, the expense and non cat loss might change with the premium (or with TIV) and we set the new PSF. Reinsurance cost variation depends on the structure and methods used. For FHCF reinsurance layer the changes which include retention, exhaustion and layer reinsurance premium rely on the risk FHCF premium. For other layers, the changes might be determined by the change of ELF if the given method of calculating the layer attachment and exhaustion point is to use the exceedance loss at a given return period from the ELF. With those changes on attachment point and exhaustion point for each layer, we build the new RLIF. The new net cat loss also has to be calculated with the new ELF which is transferred to new YLF and combined with RLIF to get the new RLOF using the same method introduced previously. The rest steps are straightforward. Summarizing from the new RLOF, we get new ROF and combine it with PSF to get YIS. Then we apply the same CDF on it to get the PPA. The delta values are the difference between the new PPA and old PPA.

There is no portfolio needed for stand alone scoring compared to marginal scoring. Values such as PML and AAL of the risk are based on its own ELF and YLF. The PML here is the real exceedance losses getting from the actual EP curve or event loss table. ΔPML for marginal scoring is a value to evaluate the impact of the risk on the portfolio around the given return period. It is not the actual difference on the PML at the given return period. Based on the FDF, similar to PSF, we are able to calculate the things such as expense and non cat loss which are dependent on the risk premium or TIV. By applying RDF and RLDF of per risk basis, the same ideas can be used to construct RLIF, RLOF and therefore YIS. Thus the profit may be calculated using the formula 1.4 above. The next step is applying the CDF to get the other financial measures.

Capital required is generally given by measuring a point on the tail of EP curves and holding capital equals to some multiple of that amount. For instance, there is an example OEP in Table 13. The given CDF specifies the required capital equal to the average of the loss of three points at EP: AVG(4× $L_{50-yr}$, 2.5×$L_{100-yr}$, 1.5×$L_{250-yr}$. So the required capital for the given risk is equal to $$\frac{4 \times 21 + 2.5 \times 25 + 1.5 \times 45}{3} = \frac{214}{3} = 71.33.$$

All other financial measures are calculated in the same way as above (formulas 1.5-1.9).

TABLE 13

An example of risk OEP

| Loss | OEP |
| --- | --- |
| 45 | 0.4% |
| 34 | 0.5% |
| 25 | 1.0% |
| 21 | 2.0% |
| 18 | 4.0% |
| 11 | 5.0% |
| 7 | 10.0% |

As mentioned, allocate scoring is similar to marginal scoring that both calculations have to be based on the portfolio. Allocate scoring is used while the losses, reinsurance costs or the capital cannot be directly attribute to the individual risk. For instance, suppose we are measuring earthquake risks using current hurricane portfolio, we cannot combine the ELF of the hurricane portfolio with that of the earthquake risk since the events of different perils are different. This prohibits us using the marginal scoring. However, we are able to use the risk's contribution to the losses of portfolio to measure those amounts like reinsurance cost or capital of the risk. For instance, we might use the AAL fraction of the risk to the portfolio to allocate the reinsurance cost and capital for the individual risk from the portfolio. Other financial measures are able to be calculated based on those distributed amounts. For instance, the profit is equal to the revenue (premium+ other revenue) subtracting the cost (allocated reinsurance cost, expense, non cat loss, and allocated net cat loss).

Event loss table is one of the most common used terms in catastrophe insurance industry. It's the main modeling result from catastrophe models such as RMS and AIR. It lists the predicted loss of each simulated event based on historical data. It is mainly composed by events, event rates which is the annual probability of occurrence, and predicted losses. More information can be found in www.rms.com and http://www.air-worldwide.com. An example is given in Table 1.

TABLE 14

An example of ELT and EP

| EventId | EventRate | Loss | Exceedance Probability |
| --- | --- | --- | --- |
| 1 | 0.002 | 2,600,000 | 0.0020 |
| 2 | 0.005 | 1,890,000 | 0.0070 |
| 3 | 0.010 | 1,025,000 | 0.0169 |
| 4 | 0.020 | 890,000 | 0.0366 |
| 5 | 0.030 | 720,000 | 0.0655 |
| 6 | 0.100 | 500,000 | 0.1589 |
| 7 | 0.100 | 320,000 | 0.2430 |
| 8 | 0.100 | 100,000 | 0.3187 |
| 9 | 0.250 | 0 | 0.4891 |

Figure 32:
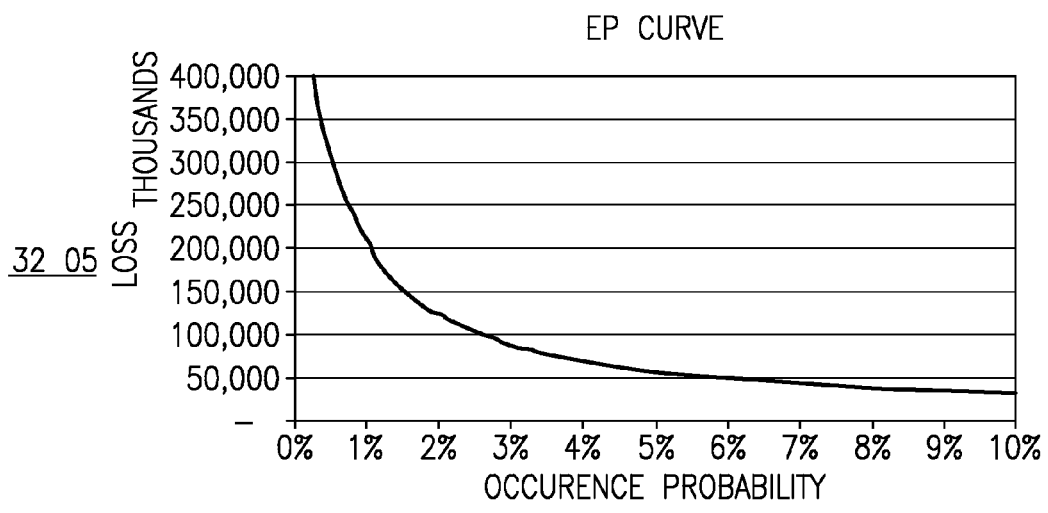
FIG. 32 shows aspects of the cxRisk module in one embodiment of system operation.

EP curve, an embodiment of which is shown in FIG. 32, is another thing widely used related to the catastrophe modeling. It shows the exceedance probability 3201 associate with the loss 3205, i.e. the probability that the loss (either occurrence loss or aggregate loss) of an event is greater than the certain value. If the loss is occurrence loss, then the EP curve is called OEP and for aggregate loss, it's called AEP. The EP curve is derived from ELT or YLF. Table 14 shows an example of getting EP from ELT without consideration of uncertainties on event loss. It can be easily understood. For instance, the probability of an event causing a loss bigger than and equal to 2.6 million is 0.002 since only event 1 is qualified for that. For the second loss, there are two events causing loss bigger than it. If two events are statistically independent, then the sum of those two event rates is the exceedance probability. Usually, the exceedance probability of loss $L_i$ is given by $$EP(L_i) = 1 - \prod_{j=1}^{i}(1 - p_j) \quad (A.1)$$

where $p_j$ stands for the event rate for the events with losses less than $L_i$ (see Patricia Grossi and Howard Kunreuther, *Catastrophe modeling: a new approach to manage risk*, Springer, 2005). PML stands for probable maximum loss. It means given a return period which is exceedance probability, the loss associate with it in the EP curve. AAL stands for average annual loss which is the annual expected loss.

$$AAL = \sum_{i=1}^{n} L_i \times p_i \quad (A.2)$$

where $L_i$ and $p_i$ are the loss and annual probability of the i th event.

FHCF is Florida Hurricane Catastrophe Fund. It was created by a special legislation in Florida "to protect and advance the state's interest in maintaining insurance capacity in Florida by providing reimbursements to insurers for a portion of their catastrophic hurricane losses." (see http://www.s-bafla.com/fhcf/). There are several values related to FHCF: FHCF premium, FHCF retention multiplier, FHCF exhaustion multiplier, and FHCF participation. FHCF premium can be calculated based on the rates table regulated by FHCF legislation. It's equal to the reinsurance cost of the FHCF layer. FHCF retention multiplier and FHCF exhaustion multiplier are two constants used to calculate the FHCF layer attachment point and exhaustion point. These two constants are designated by FHCF every year and they are different for the different FHCF participation.

Insurance companies usually buy reinsurance to reduce the losses. A typical reinsurance structure contains several layers and every layer has its attachment point, exhaustion point, participation, rate on line (ROL), reinstatement premium protection (RPP) ratio and so on. The useful information the insurance companies need to get from the reinsurance structure include 1. occurrence limit and aggregate limit which are used to calculate ceded cat losses. 2. reinsurance premium and reinstatement premium which are used to calculate profit. Occurrence limit stands for the full coverage of the reinsurance program if one event occurs, while aggregate limit tells the total coverage of the reinsurance if multi events happen in a year. Reinsurance premium is based on the ROL which stands for the cost of covering $1 losses.

$$R = ROL \times OL \times P_p \quad (B.1)$$

where R is reinsurance cost, OL is occurrence limit, $P_p$ stands for the participation.

All these values rely on the attachment point and exhaustion point of each layer which are fixed values given, flexible points based on ELF, or calculated from FHCF multipliers.

The reinstatement provision is a common feature of most reinsurance contracts which sets the limit paid by the contract. The limit can be put based on the number of occurrences or the aggregated losses. If the contract has one reinstatement provision on the number of occurrences, the reinsurer will be responsible for the losses (less and equal to occurrence limit) at two occurrences. If it's based on aggregated losses, then the reinsurer needs to cover the losses to the set aggregated loss no matter how many events occur (each recovered loss can not exceed occurrence limit). The examples above are based on the aggregated loss. For the limit based on the number of occurrences, the ceded loss calculation is simpler. For instance, the first two events, each ceded loss is calculated as MIN(L, OL).

The reinstatements may be free or paid which brings the complexity of the reinstatement premium calculation. If the reinstatements are free, all of the premium is paid up front. The prepaid reinstatement premium is calculated similar as the reinsurance cost with different ROL. For paid reinstatements, a portion of the premium is paid following the occurrence of an event to reinstate the coverage of the second occurrence. The paid reinstatement premium may be pro rata to full limit or be based on the time remaining in the contract.

EXAMPLE

Generating a Workbook Rule

Figure 33C:
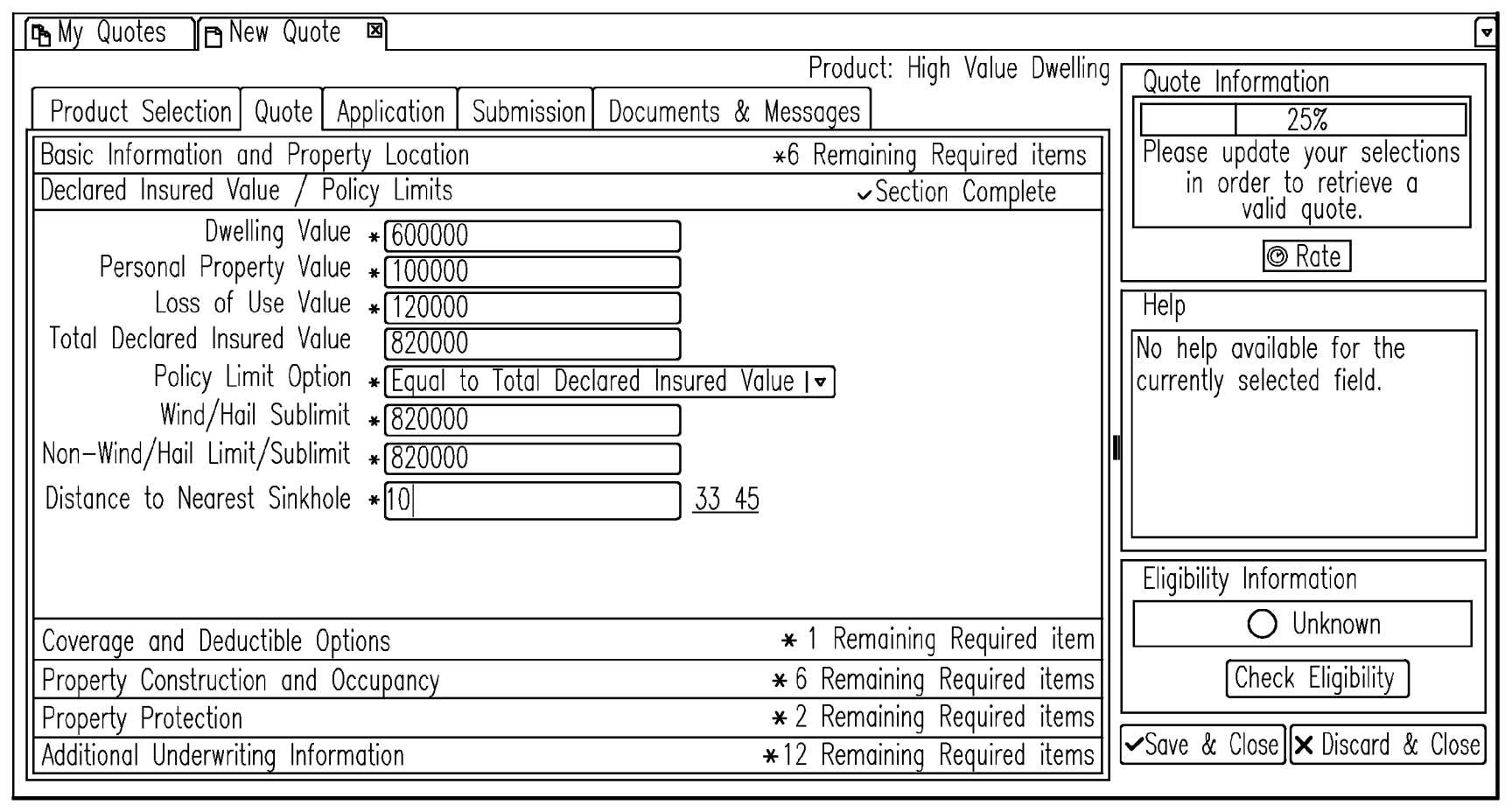
Figure 33D:

FIGS. 33A-E show one implementation of adding a new field to a workbook that is evaluated by a new cxLogic ruleset. FIG. 33A shows seven fields for the "Declared Insured Value/Policy Limits" section of a risk rater, including Dwelling Value 3301, Personal Property Value 3305, Loss of Use Value 3310, Total Declared Insured Value 3315, Policy Limit Option 3320, Wind/Hail Sublimit 3325, and Non-Wind/Hail Limit/Sublimit 3330. FIG. 33B shows a new field (Distance to Nearest Sinkhole, 3335) being added to the workbook product using pxBuilder via the Input Form control 3340. The resulting new field generated in the client (i.e., pxQuote interpretation of the workbook product) is shown at 3345 in FIG. 33C. FIG. 33D shows an implementation of cxLogic, wherein a new ruleset is being added to use the sinkhole data. The rule name 3350, expression 3355, rule description 3360, and reason description 3365 may all be input here. Once the ruleset is created in cxLogic, it is added to the workbook product using pxBuilder. An example of the XML that may be added to the product to reference the ruleset in one implementation is:

```
<Rulesets>
<ExternalRuleset name="Distance to nearest sinkhole"
trueresult="BLOCK" uuid="047A1944-1372-3E27-
9AD1D8F878C2CD40"/>
</Rulesets>
```

This ruleset is set to issue a 'BLOCK' if the rule evaluates to true. This is defined with the attribute trueresult="BLOCK". In an alternative implementation, the ruleset may be set to issue a 'FLAG' if the rule evaluates to true, whereby a system administrator and/or operator may be notified of the rule evaluation outcome. FIG. 33E shows an example in which a particular candidate risk yields a 'BLOCK' 3370 because the sinkhole data entered evaluated to TRUE in cxLogic. The message 3375 shown below in the Messages section 3380 is the same message that a user entered in cxLogic (FIG. 33D) under reason description 3365.

Provider Controller

Figure 34A:
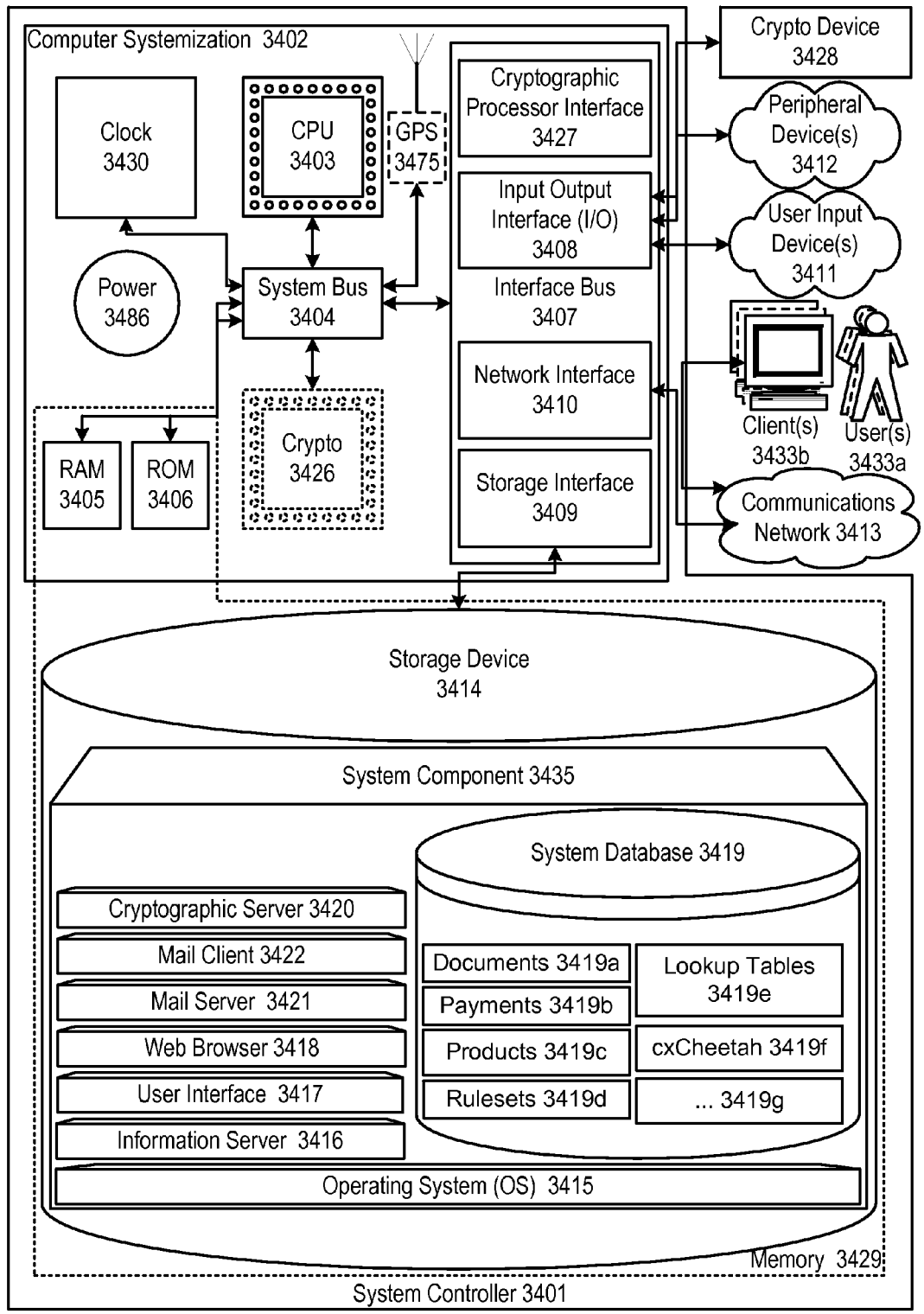

FIG. 34A of the present disclosure illustrates inventive aspects of a Provider controller 3401 in a block diagram. In this embodiment, the Provider controller 3401 may serve to aggregate, process, store, search, serve, identify, instruct, generate, match, and/or update databases, database elements, database element fields, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, which is commonly facilitated through a database program. Information technology systems provide interfaces that allow users to access and operate various system components.

In one embodiment, the Provider controller 3401 may be connected to and/or communicate with entities such as, but not limited to: one or more users from user input devices 3411; peripheral devices 3412; a cryptographic processor device 3428; and/or a communications network 3413.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Provider controller 3401 may be based on common computer systems that may comprise, but are not limited to, components such as: a computer systemization 3402 connected to memory 3429.

Computer Systemization

A computer systemization 3402 may comprise a clock 3430, central processing unit (CPU) 3403, a read only memory (ROM) 3406, a random access memory (RAM) 3405, and/or an interface bus 3407, and most frequently, although not necessarily, are all interconnected and/or communicating through a system bus 3404. Optionally, the computer systemization may be connected to an internal power source 3486. Optionally, a cryptographic processor 3426 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the Provider controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 3486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3486 is connected to at least one of the interconnected subsequent components of the Provider thereby providing an electric current to all subsequent components. In one example, the power source 3486 is connected to the system bus component 3404. In an alternative embodiment, an outside power source 3486 is provided through a connection across the I/O 3408 interface. For example, a USB and/or IEEE 1394 connection carries both data and power across the connection and is therefore a suitable source of power.

Interface Adapters

Interface bus(ses) 3407 may accept, connect, and/or communicate to a number of interface adapters, conventionally although not necessarily in the form of adapter cards, such as but not limited to: input output interfaces (I/O) 3408, storage interfaces 3409, network interfaces 3410, and/or the like. Optionally, cryptographic processor interfaces 3427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3409 may accept, communicate, and/or connect to a number of storage devices such as, but not limited to: storage devices 3414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3410 may accept, communicate, and/or connect to a communications network 3413. Through a communications network 3413, the Provider controller is accessible through remote clients 3433b (e.g., computers with web browsers) by users 3433a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3410 may be used to engage with various communications network types 3413. For example, multiple network interfaces may be employed to allow for the communication over broadcast, multicast, and/or unicast networks.

Input Output interfaces (I/O) 3408 may accept, communicate, and/or connect to user input devices 3411, peripheral devices 3412, cryptographic processor devices 3428, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 3411 may be card readers, dongles, finger print readers, gloves, graphics tablets, joysticks, keyboards, mouse (mice), remote controls, retina readers, trackballs, trackpads, and/or the like.

Peripheral devices 3412 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Provider controller may be embodied as an embedded, dedicated, and/or monitor-less (i.e., headless) device, wherein access would be provided over a network interface connection.

Cryptographic units such as, but not limited to, microcontrollers, processors 3426, interfaces 3427, and/or devices 3428 may be attached, and/or communicate with the Provider controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 3429. However, memory is a fungible technology and resource, thus, any number of memory embodiments may be employed in lieu of or in concert with one another. It is to be understood that the Provider controller and/or a computer systemization may employ various forms of memory 3429. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 3429 will include ROM 3406, RAM 3405, and a storage device 3414. A storage device 3414 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 3429 may contain a collection of program and/or database components and/or data such as, but not limited to: operating system component(s) 3415 (operating system); information server component(s) 3416 (information server); user interface component(s) 3417 (user interface); Web browser component(s) 3418 (Web browser); database(s) 3419; mail server component(s) 3421; mail client component(s) 3422; cryptographic server component(s) 3420 (cryptographic server); the Provider component(s) 3435; and/or the like (i.e., collectively a component collection). These components may be stored and accessed from the storage devices and/or from storage devices accessible through an interface bus. Although non-conventional program components such as those in the component collection, typically, are stored in a local storage device 3414, they may also be loaded and/or stored in memory such as: peripheral devices, RAM, remote storage facilities through a communications network, ROM, various forms of memory, and/or the like.

Operating System

The operating system component 3415 is an executable program component facilitating the operation of the Provider controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Microsoft Windows 2000/2003/3.1/95/98/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Provider controller to communicate with other entities through a communications network 3413. Various communication protocols may be used by the Provider controller as a subcarrier transport mechanism for interaction, such as, but not limited to: multicast, TCP/IP, UDP, unicast, and/or the like.

Information Server

An information server component 3416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Provider controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Provider database 3419, operating systems, other program components, user interfaces, Web browsers, and/or the like.

Access to the Provider database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Provider. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Provider as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 3417 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Provider enabled nodes. The combined application may be nugatory on systems employing standard Web browsers.

Mail Server

A mail server component 3421 is a stored program component that is executed by a CPU 3403. The mail server may be a conventional Internet mail server such as, but not limited to, sendmail, Microsoft Exchange, and/or the like. The mail server may allow for the execution of program components through facilities such as ASP, ActiveX, (ANSI) (Objective-) C (++), CGI scripts, Java, JavaScript, PERL, pipes, Python, WebObjects, and/or the like. The mail server may support communications protocols such as, but not limited to: Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Provider.

Access to the Provider mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3422 is a stored program component that is executed by a CPU 3403. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3420 is a stored program component that is executed by a CPU 3403, cryptographic processor 3426, cryptographic processor interface 3427, cryptographic processor device 3428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Provider may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing an MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Provider component to engage in secure transactions if so desired. The cryptographic component facilitates the secure accessing of resources on the Provider and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Provider Database

The Provider database component 3419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables.

Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Provider database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Provider database is implemented as a data-structure, the use of the Provider database may be integrated into another component such as the Provider component 3435. Also, the database may be implemented as a mix of data-structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3419 includes several tables 3419a-g. A documents table 3419a includes fields such as, but not limited to: document ID, document name, carrier ID, carrier name, time to provide document, order to provide document, document class, and/or the like. A payments table 3419b includes fields such as, but not limited to: payment ID, payment type, payment method, credit card name, credit card number, expiration date, check number, name on check, transaction success, payment amount, balance due, total premium, and/or the like. A products table 3419c includes fields such as, but not limited to: product ID, product name, carrier ID, carrier name, inputs, expressions, table lookups, rules and/or rulesets, payments, documents, user interface specification, and/or the like. A rulesets table 3419d includes fields such as, but not limited to: ruleset ID, ruleset name, rules, and/or the like. A lookup tables table 3419e includes fields such as, but not limited to: table ID, table name, table values, and/or the like. A cxCheetah table 3419f includes fields such as, but not limited to: event ID, event name, event probability, geocode, damage estimate, and/or the like. Further tables and/or data-structures 3419g embodied within the system database are shown in detail in FIG. 34B. These and/or other tables may support and/or track multiple entity accounts on the Provider controller.

In one embodiment, the Provider database may interact with other database systems. For example, employing a distributed database system, queries and data access by Provider modules may treat the combination of the Provider database and another database as a single database entity.

In one embodiment, user programs may contain various user interface primitives, which may serve to update the Provider. Also, various accounts may require custom database tables depending upon the environments and the types of clients the Provider may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3419a-g. The Provider may be configured to keep track of various settings, inputs, and parameters via database controllers.

The Provider database may communicate to and/or with other components in a component collection, including itself, and/or facilities of the like. Most frequently, the Provider database communicates with the Provider component, other program components, and/or the like. The database may contain, retain, and provide information regarding other nodes and data.

The Provider Component

The Provider component 3435 is a stored program component that is executed by a CPU. The Provider affects accessing, obtaining and the provision of information, services, transactions, and/or the like across various communications networks. As such, the Provider component enables one to access, calculate, engage, exchange, generate, identify, instruct, match, process, search, serve, store, and/or facilitate transactions to enable the assessment and/or rating of risks, the evaluation of logical and/or business rules, and the generation of workbooks, interfaces, and/or quotes for binding risks. In one embodiment, the Provider component incorporates any and/or all combinations of the aspects of the Provider that were discussed in the previous figures and appendices.

The Provider component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the Provider server employs a cryptographic server to encrypt and decrypt communications. The Provider component may communicate to and/or with other components in a component collection, including itself, and/or facilities of the like. Most frequently, the Provider component communicates with the Provider database, operating systems, other program components, and/or the like. The Provider may contain, communicate, generate, obtain, and/or provide program component, system, user, and/or data communications, requests, and/or responses.

Distributed Provider

The structure and/or operation of any of the Provider node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Provider controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like, Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

Among the embodiments envisioned as being within the scope of the present invention are the following:

1. A processor-implemented system to generate a reinsurance product quote, comprising:
   a reinsurance logic set database, further, including:
   reinsurance logic set data-structures including logic to evaluate reinsurance related conditions;
   a reinsurance product data-structure database, further, including:
   reinsurance product data-structures that reference related reinsurance logic set data-structures and that include interpretable logic usable by a reinsurance quoting component to generate reinsurance product specific quotes;
   a reinsurance quoting component devoid of specific reinsurance product evaluative components such that the quoting component by itself is incapable of providing quotes on reinsurance products, further, including:
   a reinsurance product data-structure loading mechanism to load reinsurance product data-structures,
   a reinsurance product data-structure interpreter to interpret loaded reinsurance product data-structures and generate reinsurance product specific quotes.

2. The system of claim 1, wherein the reinsurance product data-structures comprise XML documents.

3. The system of claim 1, further comprising:
   a reinsurance risk assessment component capable of interpreting the reinsurance product data-structure and capable of providing a risk assessment back to the reinsurance quoting component.

4. The system of claim 1, further comprising:
   a user interface;

5. The system of claim 4, wherein the reinsurance product data-structure loading mechanism is responsive to reinsurance product selections received from the user interface.

6. The system of claim 4, wherein the generated reinsurance product specific quotes are displayed via the user interface.

7. The system of claim 1, wherein the reinsurance product-structures further comprise:
   a set of base criteria, comprising a reinsurance product identifier; and
   a plurality of risk characteristic input fields.

8. The system of claim 7, wherein the reinsurance product identifier includes an insurance carrier identifier.

9. The system of claim 7, wherein the reinsurance product-structures further comprise:
   at least one expression comprising a mathematical operation to be performed on at least one risk characteristic received via a subset of the plurality of risk characteristic input fields;
   a set of rule calls, specifying elements of a ruleset database; and
   a set of lookup table calls, specifying elements of a lookup tables database.

10. The system of claim 9, wherein the reinsurance product-structures further comprise:
    a set of insurance product documents, including a document delivery order.

11. The system of claim 10, wherein the reinsurance product-structures further comprise:
    a product payment schedule.

12. A processor-implemented method for generating an insurance quote, comprising:
    receiving a risk rater selection;
    retrieving a risk rater data-structure corresponding to the risk rater selection from a risk rater database;
    providing a plurality of risk characteristic input fields based on instructions embodied in the risk rater data-structure;
    receiving a plurality of risk characteristics representing at least one insurable risk as inputs to the risk characteristic input fields;
    passing a first subset of the plurality of risk characteristics to a risk scoring module, the risk scoring module configured to generate at least one financial metric based on input risk characteristics;
    receiving at least one financial metric based on the first subset of the plurality of risk characteristics from the risk scoring module; and
    generating a quote indicative of a price for insuring at least one insurable risk based on the at least one financial metric.

13. The method of claim 12, further comprising:
    querying a set of rule calls based on instructions embodied in the risk rater data-structure;
    passing a second subset of the plurality of risk characteristics to a rule evaluation module;
    receiving a set of rule evaluations corresponding to the set of rule calls based on the second subset of the plurality of risk characteristics; and
    wherein the generating a quote indicative of a price is further based on the set of rule evaluations.

14. The method of claim 13, wherein the second subset of the plurality of risk characteristics is the same as the first subset of the plurality of risk characteristics.

15. The method of claim 13, further comprising:
querying a set of lookup table calls based on instructions embodied in the risk rater data-structure;
retrieving table data values from lookup tables based on the set of lookup table calls; and
wherein the generating a quote indicative of a price is further based on the table data values.

16. The method of claim 12, further comprising:
querying a set of lookup table calls based on instructions embodied in the risk rater data-structure;
retrieving table data values from lookup tables based on the set of lookup table calls; and
wherein the generating a quote indicative of a price is further based on the table data values.

17. The method of claim 12, wherein the risk rater data-structure comprises an XML document.

18. The method of claim 12, wherein the at least one insurable risk comprises a property and the quote indicative of a price for insuring at least one insurable risk is directed to a property casualty reinsurance product.

19. The method of claim 12, wherein the risk rater selection comprises specification of a risk rater base criteria.

20. The method of claim 19, wherein the risk rater base criteria comprises a risk rater identifier.

21. The method of claim 19, wherein the risk rater base criteria comprises an insurance carrier identifier.

22. An apparatus for generating an insurance quote, comprising:
a memory;
a processor disposed in communication with said memory, and configured to issue a plurality of instructions stored in the memory, wherein the instructions issue signals to:
receive a risk rater selection;
retrieve a risk rater data-structure corresponding to the risk rater selection from a risk rater database;
provide a plurality of risk characteristic input fields based on instructions embodied in the risk rater data-structure;
receive a plurality of risk characteristics representing at least one insurable risk as inputs to the risk characteristic input fields;
pass a first subset of the plurality of risk characteristics to a risk scoring module, the risk scoring module configured to generate at least one financial metric based on input risk characteristics;
receive at least one financial metric based on the first subset of the plurality of risk characteristics from the risk scoring module; and
generate a quote indicative of a price for insuring at least one insurable risk based on the at least one financial metric.

23. The apparatus of claim 22, further comprising:
query a set of rule calls based on instructions embodied in the risk rater data-structure;
pass a second subset of the plurality of risk characteristics to a rule evaluation module;
receive a set of rule evaluations corresponding to the set of rule calls based on the second subset of the plurality of risk characteristics; and
wherein the generating a quote indicative of a price is further based on the set of rule evaluations.

24. The apparatus of claim 23, wherein the second subset of the plurality of risk characteristics is the same as the first subset of the plurality of risk characteristics.

25. The apparatus of claim 23, further comprising:
query a set of lookup table calls based on instructions embodied in the risk rater data-structure;
retrieve table data values from lookup tables based on the set of lookup table calls; and
wherein the generating a quote indicative of a price is further based on the table data values.

26. The apparatus of claim 22, further comprising:
query a set of lookup table calls based on instructions embodied in the risk rater data-structure;
retrieve table data values from lookup tables based on the set of lookup table calls; and
wherein the generating a quote indicative of a price is further based on the table data values.

27. The apparatus of claim 22, wherein the risk rater data-structure comprises an XML document.

28. The apparatus of claim 22, wherein the at least one insurable risk comprises a property and the quote indicative of a price for insuring at least one insurable risk is directed to a property casualty reinsurance product.

29. The apparatus of claim 22, wherein the risk rater selection comprises specification of a risk rater base criteria.

30. The apparatus of claim 29, wherein the risk rater base criteria comprises a risk rater identifier.

31. The apparatus of claim 29, wherein the risk rater base criteria comprises an insurance carrier identifier.

32. A system for generating an insurance quote, comprising:
means to receive a risk rater selection;
means to retrieve a risk rater data-structure corresponding to the risk rater selection from a risk rater database;
means to provide a plurality of risk characteristic input fields based on instructions embodied in the risk rater data-structure;
means to receive a plurality of risk characteristics representing at least one insurable risk as inputs to the risk characteristic input fields;
means to pass a first subset of the plurality of risk characteristics to a risk scoring module, the risk scoring module configured to generate at least one financial metric based on input risk characteristics;
means to receive at least one financial metric based on the first subset of the plurality of risk characteristics from the risk scoring module; and
means to generate a quote indicative of a price for insuring at least one insurable risk based on the at least one financial metric.

33. The system of claim 32, further comprising:
means to query a set of rule calls based on instructions embodied in the risk rater data-structure;
means to pass a second subset of the plurality of risk characteristics to a rule evaluation module;
means to receive a set of rule evaluations corresponding to the set of rule calls based on the second subset of the plurality of risk characteristics; and
wherein the generating a quote indicative of a price is further based on the set of rule evaluations.

34. The system of claim 33, wherein the second subset of the plurality of risk characteristics is the same as the first subset of the plurality of risk characteristics.

35. The system of claim 33, further comprising:
means to query a set of lookup table calls based on instructions embodied in the risk rater data-structure;
means to retrieve table data values from lookup tables based on the set of lookup table calls; and
wherein the generating a quote indicative of a price is further based on the table data values.

36. The system of claim 32, further comprising:
means to query a set of lookup table calls based on instructions embodied in the risk rater data-structure;
means to retrieve table data values from lookup tables based on the set of lookup table calls; and
wherein the generating a quote indicative of a price is further based on the table data values.

37. The system of claim 32, wherein the risk rater data-structure comprises an XML document.

38. The system of claim 32, wherein the at least one insurable risk comprises a property and the quote indicative of a price for insuring at least one insurable risk is directed to a property casualty reinsurance product.

39. The system of claim 32, wherein the risk rater selection comprises specification of a risk rater base criteria.

40. The system of claim 39, wherein the risk rater base criteria comprises a risk rater identifier.

41. The system of claim 39, wherein the risk rater base criteria comprises an insurance carrier identifier.

42. A medium readable by a processor to generate an insurance quote, comprising:
instruction signals in the processor readable medium, wherein the instruction signals are issuable by the processor to:
receive a risk rater selection;
retrieve a risk rater data-structure corresponding to the risk rater selection from a risk rater database;
provide a plurality of risk characteristic input fields based on instructions embodied in the risk rater data-structure;
receive a plurality of risk characteristics representing at least one insurable risk as inputs to the risk characteristic input fields;
pass a first subset of the plurality of risk characteristics to a risk scoring module, the risk scoring module configured to generate at least one financial metric based on input risk characteristics;
receive at least one financial metric based on the first subset of the plurality of risk characteristics from the risk scoring module; and
generate a quote indicative of a price for insuring at least one insurable risk based on the at least one financial metric.

43. The medium of claim 42, further comprising:
query a set of rule calls based on instructions embodied in the risk rater data-structure;
pass a second subset of the plurality of risk characteristics to a rule evaluation module;
receive a set of rule evaluations corresponding to the set of rule calls based on the second subset of the plurality of risk characteristics; and
wherein the generating a quote indicative of a price is further based on the set of rule evaluations.

44. The medium of claim 43, wherein the second subset of the plurality of risk characteristics is the same as the first subset of the plurality of risk characteristics.

45. The medium of claim 43, further comprising:
query a set of lookup table calls based on instructions embodied in the risk rater data-structure;
retrieve table data values from lookup tables based on the set of lookup table calls; and
wherein the generating a quote indicative of a price is further based on the table data values.

46. The medium of claim 42, further comprising:
query a set of lookup table calls based on instructions embodied in the risk rater data-structure;
retrieve table data values from lookup tables based on the set of lookup table calls; and
wherein the generating a quote indicative of a price is further based on the table data values.

47. The medium of claim 42, wherein the risk rater data-structure comprises an XML document.

48. The medium of claim 42, wherein the at least one insurable risk comprises a property and the quote indicative of a price for insuring at least one insurable risk is directed to a property casualty reinsurance product.

49. The medium of claim 42, wherein the risk rater selection comprises specification of a risk rater base criteria.

50. The medium of claim 49, wherein the risk rater base criteria comprises a risk rater identifier.

51. The medium of claim 49, wherein the risk rater base criteria comprises an insurance carrier identifier.

1. A risk rater data-structure, embodied in an electronic storage medium, comprising:
a set of risk rater base criteria, comprising at least a unique risk rater identifier;
a plurality of risk characteristic input fields;
at least one expression comprising a mathematical operation to be performed on at least one risk characteristic received via a subset of the plurality of risk characteristic input fields;
a set of rule calls, specifying elements of a ruleset database; and
a set of lookup table calls, specifying elements of a lookup tables database.

2. The data-structure of claim 1, wherein the mathematical operation is further performed on data retrieved via the set of lookup table calls.

3. The data-structure of claim 1, wherein the mathematical operation yields a financial metric associated with a candidate risk.

4. The data-structure of claim 3 wherein the financial metric comprises a quote reflecting the price for insuring the candidate risk.

5. The data-structure of claim 1, wherein the set of rule calls include at least one call to a rule referencing at least one risk characteristic.

6. The data-structure of claim 1, wherein the set of rule calls include at least one call to a rule referencing data retrieved via the set of lookup table calls.

7. The data-structure of claim 1, wherein the data-structure comprises an XML document.

8. The data-structure of claim 1, wherein the set of risk rater base criteria further comprises an insurance carrier identifier.

9. The data-structure of claim 1, wherein the plurality of risk characteristic fields admit characteristics of a property.

10. The data-structure of claim 9, wherein the characteristics of a property include a geocode.

11. The data-structure of claim 9, wherein the characteristics of a property include construction characteristics.

12. The data-structure of claim 1, wherein the subset of the plurality of the risk characteristic input fields comprises the entire plurality of the risk characteristic input fields.

1. A processor-implemented method to generate a reinsurance product data-structure, comprising:
providing a product generating user interface with widgets indicative of reinsurance product characteristics for display;
receiving user actuations of widgets indicative of reinsurance product characteristics via the product generating user interface;
receiving user specifications of relationships and logic on and between the reinsurance product characteristics;
receiving a user specification for an identifying base characteristic;

generating a reinsurance product data-structure from the user actuations of the widgets indicative of reinsurance product characteristics and the specifications of relationships and logic on and between the reinsurance product characteristics; and storing the reinsurance product data-structure in a reinsurance product database.

2. The method of claim 1, wherein the user actuations of widgets define a plurality of risk characteristic input fields.

3. The method of claim 2, wherein the reinsurance product data-structure is directed to property casualty insurance and the risk characteristic input fields include information descriptive of a property.

4. The method of claim 3, wherein the information descriptive of a property includes a geocode.

5. The method of claim 3, wherein the information descriptive of a property includes construction characteristics.

6. The method of claim 1, wherein the user actuations of widgets define a set of rule calls to a rulesets database.

7. The method of claim 1, wherein the user actuations of widgets define a set of lookup table calls to a lookup tables database.

8. The method of claim 1, wherein the user actuations of widgets define at least one expression comprising a mathematical calculation configured to establish parameters used in generating a quote indicative of the price for insuring an insurable risk.

9. The method of claim 1, wherein the user actuations of widgets define set of insurance product documents, including a document delivery order.

10. The method of claim 1, wherein the user actuations of widgets define a product payment schedule.

11. The method of claim 1, wherein the identifying base criteria include at least a reinsurance product name.

12. The method of claim 1, wherein the identifying base criteria include at least an insurance carrier identification.

13. The method of claim 1, wherein the reinsurance product data-structure comprises an XML document.

14. The method of claim 1, wherein the logic on and between reinsurance product characteristics comprises a block on binding an insurance policy for reinsurance product characteristics that meet a set of criteria.

15. The method of claim 1, wherein the logic on and between reinsurance product characteristics comprises a notification flag for reinsurance product characteristics that meet a set of criteria.

16. A processor-implemented method to generate a user interface for a risk rater builder, comprising:
providing interface elements configured to receive specification of a plurality of risk rater characteristics, including:
at least one risk rater base criterion;
a plurality of risk characteristic input fields;
at least one expression comprising a mathematical calculation performed on at an input to at least one of the plurality of risk characteristic input fields; and
at least one call to a rule from a rules database.

17. The method of 16, further comprising:
at least one reference to a lookup table comprising a collection of data values.

18. The method of 17, wherein the mathematical calculation is further performed on data collected by the reference to a lookup table.

19. The method of claim 16, wherein the at least one risk rater base criterion comprises a risk rater identifier.

20. The method of claim 16, wherein the at least one risk rater base criterion comprises an insurance carrier identifier.

21. The method of claim 16, wherein the risk rater is directed to property casualty insurance and the plurality of risk characteristic input fields include fields directed to characteristics of a property.

22. The method of claim 21, wherein the characteristics of a property include a geocode.

23. The method of claim 21, wherein the characteristics of a property include construction characteristics.

24. The method of claim 16, wherein the interface elements are provided within an XML document.

25. The method of claim 16, further comprising:
a set of insurance product documents, including a document delivery order.

26. The method of claim 16, further comprising:
a product payment schedule.

27. An apparatus to generate a reinsurance product data-structure, comprising: a memory;
a processor disposed in communication with said memory, and configured to issue a plurality of instructions stored in the memory, wherein the instructions issue signals to:
provide a product generating user interface with widgets indicative of reinsurance product characteristics for display;
receive user actuations of widgets indicative of reinsurance product characteristics via the product generating user interface;
receive user specifications of relationships and logic on and between the reinsurance product characteristics;
receive a user specification for an identifying base characteristic;
generate a reinsurance product data-structure from the user actuations of the widgets indicative of reinsurance product characteristics and the specifications of relationships and logic on and between the reinsurance product characteristics; and
store the reinsurance product data-structure in a reinsurance product database.

28. The apparatus of claim 27, wherein the user actuations of widgets define a plurality of risk characteristic input fields.

29. The apparatus of claim 28, wherein the reinsurance product data-structure is directed to property casualty insurance and the risk characteristic input fields include information descriptive of a property.

30. The apparatus of claim 29, wherein the information descriptive of a property includes a geocode.

31. The apparatus of claim 29, wherein the information descriptive of a property includes construction characteristics.

32. The apparatus of claim 27, wherein the user actuations of widgets define a set of rule calls to a rulesets database.

33. The apparatus of claim 27, wherein the user actuations of widgets define a set of lookup table calls to a lookup tables database.

34. The apparatus of claim 27, wherein the user actuations of widgets define at least one expression comprising a mathematical calculation configured to establish parameters used in generating a quote indicative of the price for insuring an insurable risk.

35. The apparatus of claim 27, wherein the user actuations of widgets define set of insurance product documents, including a document delivery order.

36. The apparatus of claim 27, wherein the user actuations of widgets define a product payment schedule.

37. The apparatus of claim 27, wherein the identifying base criteria include at least a reinsurance product name.

38. The apparatus of claim 27, wherein the identifying base criteria include at least an insurance carrier identification.

39. The apparatus of claim 27, wherein the reinsurance product data-structure comprises an XML document.

40. The apparatus of claim 27, wherein the logic on and between reinsurance product characteristics comprises a block on binding an insurance policy for reinsurance product characteristics that meet a set of criteria.

41. The apparatus of claim 27, wherein the logic on and between reinsurance product characteristics comprises a notification flag for reinsurance product characteristics that meet a set of criteria.

42. An apparatus to generate a user interface for a risk rater builder, comprising:
- a memory;
- a processor disposed in communication with said memory, and configured to issue a plurality of instructions stored in the memory, wherein the instructions issue signals to:
- provide interface elements configured to receive specification of a plurality of risk rater characteristics, including:
- at least one risk rater base criterion;
- a plurality of risk characteristic input fields;
- at least one expression comprising a mathematical calculation performed on at an input to at least one of the plurality of risk characteristic input fields; and
- at least one call to a rule from a rules database.

43. The apparatus of 42, further comprising:
- at least one reference to a lookup table comprising a collection of data values.

44. The apparatus of 43, wherein the mathematical calculation is further performed on data collected by the reference to a lookup table.

45. The apparatus of claim 42, wherein the at least one risk rater base criterion comprises a risk rater identifier.

46. The apparatus of claim 42, wherein the at least one risk rater base criterion comprises an insurance carrier identifier.

47. The apparatus of claim 42, wherein the risk rater is directed to property casualty insurance and the plurality of risk characteristic input fields include fields directed to characteristics of a property.

48. The apparatus of claim 47, wherein the characteristics of a property include a geocode.

49. The apparatus of claim 47, wherein the characteristics of a property include construction characteristics.

50. The apparatus of claim 42, wherein the interface elements are provided within an XML document.

51. The apparatus of claim 42, further comprising:
- a set of insurance product documents, including a document delivery order.

52. The apparatus of claim 42, further comprising:
- a product payment schedule.

53. A system to generate a reinsurance product data-structure, comprising:
- means to provide a product generating user interface with widgets indicative of reinsurance product characteristics for display;
- means to receive user actuations of widgets indicative of reinsurance product characteristics via the product generating user interface;
- means to receive user specifications of relationships and logic on and between the reinsurance product characteristics;
- means to receive a user specification for an identifying base characteristic;
- means to generate a reinsurance product data-structure from the user actuations of the widgets indicative of reinsurance product characteristics and the specifications of relationships and logic on and between the reinsurance product characteristics; and
- means to store the reinsurance product data-structure in a reinsurance product database.

54. The system of claim 53, wherein the user actuations of widgets define a plurality of risk characteristic input fields.

55. The system of claim 54, wherein the reinsurance product data-structure is directed to property casualty insurance and the risk characteristic input fields include information descriptive of a property.

56. The system of claim 55, wherein the information descriptive of a property includes a geocode.

57. The system of claim 55, wherein the information descriptive of a property includes construction characteristics.

58. The system of claim 53, wherein the user actuations of widgets define a set of rule calls to a rulesets database.

59. The system of claim 53, wherein the user actuations of widgets define a set of lookup table calls to a lookup tables database.

60. The system of claim 53, wherein the user actuations of widgets define at least one expression comprising a mathematical calculation configured to establish parameters used in generating a quote indicative of the price for insuring an insurable risk.

61. The system of claim 53, wherein the user actuations of widgets define set of insurance product documents, including a document delivery order.

62. The system of claim 53, wherein the user actuations of widgets define a product payment schedule.

63. The system of claim 53, wherein the identifying base criteria include at least a reinsurance product name.

64. The system of claim 53, wherein the identifying base criteria include at least an insurance carrier identification.

65. The system of claim 53, wherein the reinsurance product data-structure comprises an XML document.

66. The system of claim 53, wherein the logic on and between reinsurance product characteristics comprises a block on binding an insurance policy for reinsurance product characteristics that meet a set of criteria.

67. The system of claim 53, wherein the logic on and between reinsurance product characteristics comprises a notification flag for reinsurance product characteristics that meet a set of criteria.

68. A system to generate a user interface for a risk rater builder, comprising:
- means to provide interface elements configured to receive specification of a plurality of risk rater characteristics, including:
- at least one risk rater base criterion;
- a plurality of risk characteristic input fields;
- at least one expression comprising a mathematical calculation performed on at an input to at least one of the plurality of risk characteristic input fields; and
- at least one call to a rule from a rules database.

69. The system of 68, further comprising:
- at least one reference to a lookup table comprising a collection of data values.

70. The system of 69, wherein the mathematical calculation is further performed on data collected by the reference to a lookup table.

71. The system of claim 68, wherein the at least one risk rater base criterion comprises a risk rater identifier.

72. The system of claim 68, wherein the at least one risk rater base criterion comprises an insurance carrier identifier.

73. The system of claim 68, wherein the risk rater is directed to property casualty insurance and the plurality of risk characteristic input fields include fields directed to characteristics of a property.

74. The system of claim 73, wherein the characteristics of a property include a geocode.

75. The system of claim 73, wherein the characteristics of a property include construction characteristics.

76. The system of claim 68, wherein the interface elements are provided within an XML document.

77. The system of claim 68, further comprising:
a set of insurance product documents, including a document delivery order.

78. The system of claim 68, further comprising:
a product payment schedule.

79. A medium readable by a processor to generate a reinsurance product data-structure, comprising:
instruction signals in the processor readable medium, wherein the instructions are issuable by the processor to:
provide a product generating user interface with widgets indicative of reinsurance product characteristics for display;
receive user actuations of widgets indicative of reinsurance product characteristics via the product generating user interface;
receive user specifications of relationships and logic on and between the reinsurance product characteristics;
receive a user specification for an identifying base characteristic;
generate a reinsurance product data-structure from the user actuations of the widgets indicative of reinsurance product characteristics and the specifications of relationships and logic on and between the reinsurance product characteristics; and
store the reinsurance product data-structure in a reinsurance product database.

80. The medium of claim 79, wherein the user actuations of widgets define a plurality of risk characteristic input fields.

81. The medium of claim 80, wherein the reinsurance product data-structure is directed to property casualty insurance and the risk characteristic input fields include information descriptive of a property.

82. The medium of claim 81, wherein the information descriptive of a property includes a geocode.

83. The medium of claim 81, wherein the information descriptive of a property includes construction characteristics.

84. The medium of claim 79, wherein the user actuations of widgets define a set of rule calls to a rulesets database.

85. The medium of claim 79, wherein the user actuations of widgets define a set of lookup table calls to a lookup tables database.

86. The medium of claim 79, wherein the user actuations of widgets define at least one expression comprising a mathematical calculation configured to establish parameters used in generating a quote indicative of the price for insuring an insurable risk.

87. The medium of claim 79, wherein the user actuations of widgets define set of insurance product documents, including a document delivery order.

88. The medium of claim 79, wherein the user actuations of widgets define a product payment schedule.

89. The medium of claim 79, wherein the identifying base criteria include at least a reinsurance product name.

90. The medium of claim 79, wherein the identifying base criteria include at least an insurance carrier identification.

91. The medium of claim 79, wherein the reinsurance product data-structure comprises an XML document.

92. The medium of claim 79, wherein the logic on and between reinsurance product characteristics comprises a block on binding an insurance policy for reinsurance product characteristics that meet a set of criteria.

93. The medium of claim 79, wherein the logic on and between reinsurance product characteristics comprises a notification flag for reinsurance product characteristics that meet a set of criteria.

94. A medium readable by a processor to generate a user interface for a risk rater builder, comprising:
instruction signals in the processor readable medium, wherein the instruction signals are issuable by the processor to provide interface elements configured to receive specification of a plurality of risk rater characteristics, including:
at least one risk rater base criterion;
a plurality of risk characteristic input fields;
at least one expression comprising a mathematical calculation performed on at an input to at least one of the plurality of risk characteristic input fields; and
at least one call to a rule from a rules database.

95. The medium of 94, further comprising:
at least one reference to a lookup table comprising a collection of data values.

96. The medium of 95, wherein the mathematical calculation is further performed on data collected by the reference to a lookup table.

97. The medium of claim 94, wherein the at least one risk rater base criterion comprises a risk rater identifier.

98. The medium of claim 94, wherein the at least one risk rater base criterion comprises an insurance carrier identifier.

99. The medium of claim 94, wherein the risk rater is directed to property casualty insurance and the plurality of risk characteristic input fields include fields directed to characteristics of a property.

100. The medium of claim 99, wherein the characteristics of a property include a geocode.

101. The medium of claim 99, wherein the characteristics of a property include construction characteristics.

102. The medium of claim 94, wherein the interface elements are provided within an XML document.

103. The medium of claim 94, further comprising:
a set of insurance product documents, including a document delivery order.

104. The medium of claim 94, further comprising:
a product payment schedule.

1. A processor-implemented method to generate a reinsurance product quote, comprising:
reading a reinsurance product database for reinsurance product identifying base criteria;
providing a reinsurance product selecting interface to display the reinsurance product identifying base criteria and allow a user to select among the reinsurance product identifying base criteria;
loading a reinsurance product data-structure from the reinsurance product database based on a users selections from the reinsurance product selecting interface;
reading quote specific data-structure elements from the reinsurance product data-structure;
generating a reinsurance quote user interface from the quote specific data-structure elements;
providing a reinsurance quote user interface to a user;
receiving user specifications via the reinsurance quote user interface;
retrieving logic sets specified by the reinsurance product data-structure;
applying logic sets to user specifications; and
providing a reinsurance product specific quote to the user if the user's specifications were acceptable based on the applying logic sets to user specifications.

2. The method of claim 1, further, comprising:
prior to providing a reinsurance product specific quote:
providing user specifications and elements of the reinsurance product data-structure to a risk assessment component;
obtaining risk assessment evaluation information from the risk assessment component;
wherein the product specific quote incorporates the risk assessment evaluation information from the risk assessment component.

3. The method of claim 2, wherein the risk assessment evaluation information comprises a set of financial metrics determined based on the user's specifications.

4. The method of claim 3, wherein the financial metrics comprise a profit margin.

5. The method of claim 2, wherein the risk assessment component passes the user specifications and elements of the reinsurance product data-structure to an external event loss table generator, receives an event loss table therefrom, and generates risk assessment evaluation information based on elements of the event loss table.

6. The method of claim 5, wherein the user specifications and elements of the reinsurance product data-structure are passed to the external event loss table generator via an interface module.

7. The method of claim 6, wherein the interface module further comprises components configured to translate risk assessment component coded information to external event loss table generator coded information.

8. The method of claim 2, wherein the risk assessment component queries an event loss table database based on the user specifications and elements of the reinsurance product data-structure, receives an event loss table values therefrom, and generates risk assessment evaluation information based on the event loss table values.

9. The method of claim 8, wherein the user specifications and elements of the reinsurance product data-structure are passed to the event loss table database via an interface module.

10. The method of claim 9, wherein the interface module further comprises components configured to translate risk assessment component coded information to event loss table database coded information.

11. The method of claim 1, wherein the reinsurance product data-structure comprises an XML document.

12. The method of claim 1, wherein the user specifications comprise information descriptive of an insurable risk.

13. The method of claim 12, wherein the insurable risk is a property and the reinsurance product specific quote is directed to a property casualty reinsurance product.

14. The method of claim 13, wherein the user specifications comprise a property geocode.

15. The method of claim 13, wherein the user specifications comprise property construction characteristics.

16. The method of claim 1, wherein the identifying base criteria comprise an insurance carrier identifier.

17. The method of claim 1, wherein the quote specific data-structure elements comprise a plurality of risk characteristic input fields.

18. The method of claim 17, wherein the risk product specific quote is directed to a property casualty insurance product and the risk characteristic input fields admit information descriptive of a property.

19. The method of claim 1, wherein the quote specific data-structure elements include a set of rule calls to a rulesets database.

20. The method of claim 1, wherein the quote specific data-structure elements include a set of lookup table calls to a lookup tables database.

21. The method of claim 1, wherein the quote specific data-structure elements include at least one expression comprising a mathematical calculation configured to establish parameters used in providing the reinsurance product specific quote.

22. The method of claim 1, wherein the quote specific data-structure elements include a set of insurance product documents, including a document delivery order.

23. The method of claim 1, wherein the quote specific data-structure elements include a product payment schedule.

24. The method of claim 1, wherein the applying logic sets to user specifications comprises generating a block for automatically binding an insurance policy for user specifications that match pre-set criteria.

25. The method of claim 24, further comprising:
checking for a user exception request; and
providing a subset of the user specifications for underwriter review if a user exception request exists.

26. The method of claim 1, wherein the applying logic sets to user specifications comprises generating a notification flag for user specifications that match pre-set criteria.

27. An apparatus to generate a reinsurance product quote, comprising:
a memory;
a processor disposed in communication with said memory, and configured to issue a plurality of instructions stored in the memory, wherein the instructions issue signals to:
read a reinsurance product database for reinsurance product identifying base criteria;
provide a reinsurance product selecting interface to display the reinsurance product identifying base criteria and allow a user to select among the reinsurance product identifying base criteria;
load a reinsurance product data-structure from the reinsurance product database based on a users selections from the reinsurance product selecting interface;
read quote specific data-structure elements from the reinsurance product data-structure;
generate a reinsurance quote user interface from the quote specific data-structure elements;
provide a reinsurance quote user interface to a user;
receive user specifications via the reinsurance quote user interface;
retrieve logic sets specified by the reinsurance product data-structure;
apply logic sets to user specifications; and
provide a reinsurance product specific quote to the user if the user's specifications were acceptable based on the applying logic sets to user specifications.

28. The apparatus of claim 27, further, comprising:
prior to providing a reinsurance product specific quote:
provide user specifications and elements of the reinsurance product data-structure to a risk assessment component;
obtain risk assessment evaluation information from the risk assessment component;
wherein the product specific quote incorporates the risk assessment evaluation information from the risk assessment component.

29. The apparatus of claim 28, wherein the risk assessment evaluation information comprises a set of financial metrics determined based on the user's specifications.

30. The apparatus of claim 29, wherein the financial metrics comprise a profit margin.

31. The apparatus of claim 28, wherein the risk assessment component passes the user specifications and elements of the reinsurance product data-structure to an external event loss table generator, receives an event loss table therefrom, and generates risk assessment evaluation information based on elements of the event loss table.

32. The apparatus of claim 31, wherein the user specifications and elements of the reinsurance product data-structure are passed to the external event loss table generator via an interface module.

33. The apparatus of claim 32, wherein the interface module further comprises components configured to translate risk assessment component coded information to external event loss table generator coded information.

34. The apparatus of claim 28, wherein the risk assessment component queries an event loss table database based on the user specifications and elements of the reinsurance product data-structure, receives an event loss table values therefrom, and generates risk assessment evaluation information based on the event loss table values.

35. The apparatus of claim 34, wherein the user specifications and elements of the reinsurance product data-structure are passed to the event loss table database via an interface module.

36. The apparatus of claim 35, wherein the interface module further comprises components configured to translate risk assessment component coded information to event loss table database coded information.

37. The apparatus of claim 27, wherein the reinsurance product data-structure comprises an XML document.

38. The apparatus of claim 27, wherein the user specifications comprise information descriptive of an insurable risk.

39. The apparatus of claim 38, wherein the insurable risk is a property and the reinsurance product specific quote is directed to a property casualty reinsurance product.

40. The apparatus of claim 39, wherein the user specifications comprise a property geocode.

41. The apparatus of claim 39, wherein the user specifications comprise property construction characteristics.

42. The apparatus of claim 27, wherein the identifying base criteria comprise an insurance carrier identifier.

43. The apparatus of claim 27, wherein the quote specific data-structure elements comprise a plurality of risk characteristic input fields.

44. The apparatus of claim 43, wherein the risk product specific quote is directed to a property casualty insurance product and the risk characteristic input fields admit information descriptive of a property.

45. The apparatus of claim 27, wherein the quote specific data-structure elements include a set of rule calls to a rulesets database.

46. The apparatus of claim 27, wherein the quote specific data-structure elements include a set of lookup table calls to a lookup tables database.

47. The apparatus of claim 27, wherein the quote specific data-structure elements include at least one expression comprising a mathematical calculation configured to establish parameters used in providing the reinsurance product specific quote.

48. The apparatus of claim 27, wherein the quote specific data-structure elements include a set of insurance product documents, including a document delivery order.

49. The apparatus of claim 27, wherein the quote specific data-structure elements include a product payment schedule.

50. The apparatus of claim 27, wherein the applying logic sets to user specifications comprises generating a block for automatically binding an insurance policy for user specifications that match pre-set criteria.

51. The apparatus of claim 50, further comprising:
check for a user exception request; and
provide a subset of the user specifications for underwriter review if a user exception request exists.

52. The apparatus of claim 27, wherein the applying logic sets to user specifications comprises generating a notification flag for user specifications that match pre-set criteria.

53. A system to generate a reinsurance product quote, comprising:
means to read a reinsurance product database for reinsurance product identifying base criteria;
means to provide a reinsurance product selecting interface to display the reinsurance product identifying base criteria and allow a user to select among the reinsurance product identifying base criteria;
means to load a reinsurance product data-structure from the reinsurance product database based on a users selections from the reinsurance product selecting interface;
means to read quote specific data-structure elements from the reinsurance product data-structure;
means to generate a reinsurance quote user interface from the quote specific data-structure elements;
means to provide a reinsurance quote user interface to a user;
means to receive user specifications via the reinsurance quote user interface; means to retrieve logic sets specified by the reinsurance product data-structure;
means to apply logic sets to user specifications; and
means to provide a reinsurance product specific quote to the user if the user's specifications were acceptable based on the applying logic sets to user specifications.

54. The system of claim 53, further, comprising:
prior to providing a reinsurance product specific quote:
means to provide user specifications and elements of the reinsurance product data-structure to a risk assessment component;
means to obtain risk assessment evaluation information from the risk assessment component;
wherein the product specific quote incorporates the risk assessment evaluation information from the risk assessment component.

55. The system of claim 54, wherein the risk assessment evaluation information comprises a set of financial metrics determined based on the user's specifications.

56. The system of claim 55, wherein the financial metrics comprise a profit margin.

57. The system of claim 54, wherein the risk assessment component passes the user specifications and elements of the reinsurance product data-structure to an external event loss table generator, receives an event loss table therefrom, and generates risk assessment evaluation information based on elements of the event loss table.

58. The system of claim 57, wherein the user specifications and elements of the reinsurance product data-structure are passed to the external event loss table generator via an interface module.

59. The system of claim 58, wherein the interface module further comprises components configured to translate risk assessment component coded information to external event loss table generator coded information.

60. The system of claim 54, wherein the risk assessment component queries an event loss table database based on the user specifications and elements of the reinsurance product data-structure, receives an event loss table values therefrom, and generates risk assessment evaluation information based on the event loss table values.

61. The system of claim 60, wherein the user specifications and elements of the reinsurance product data-structure are passed to the event loss table database via an interface module.

62. The system of claim 61, wherein the interface module further comprises components configured to translate risk assessment component coded information to event loss table database coded information.

63. The system of claim 53, wherein the reinsurance product data-structure comprises an XML document.

64. The system of claim 53, wherein the user specifications comprise information descriptive of an insurable risk.

65. The system of claim 64, wherein the insurable risk is a property and the reinsurance product specific quote is directed to a property casualty reinsurance product.

66. The system of claim 65, wherein the user specifications comprise a property geocode.

67. The system of claim 65, wherein the user specifications comprise property construction characteristics.

68. The system of claim 53, wherein the identifying base criteria comprise an insurance carrier identifier.

69. The system of claim 53, wherein the quote specific data-structure elements comprise a plurality of risk characteristic input fields.

70. The system of claim 69, wherein the risk product specific quote is directed to a property casualty insurance product and the risk characteristic input fields admit information descriptive of a property.

71. The system of claim 53, wherein the quote specific data-structure elements include a set of rule calls to a rulesets database.

72. The system of claim 53, wherein the quote specific data-structure elements include a set of lookup table calls to a lookup tables database.

73. The system of claim 53, wherein the quote specific data-structure elements include at least one expression comprising a mathematical calculation configured to establish parameters used in providing the reinsurance product specific quote.

74. The system of claim 53, wherein the quote specific data-structure elements include a set of insurance product documents, including a document delivery order.

75. The system of claim 53, wherein the quote specific data-structure elements include a product payment schedule.

76. The system of claim 53, wherein the applying logic sets to user specifications comprises generating a block for automatically binding an insurance policy for user specifications that match pre-set criteria.

77. The system of claim 76, further comprising:
means to check for a user exception request; and
means to provide a subset of the user specifications for underwriter review if a user exception request exists.

78. The system of claim 53, wherein the applying logic sets to user specifications comprises generating a notification flag for user specifications that match pre-set criteria.

79. A medium readable by a processor to generate a reinsurance product quote, comprising:
instruction signals in the processor readable medium, wherein the instruction signals are issuable by the processor to:
read a reinsurance product database for reinsurance product identifying base criteria;
provide a reinsurance product selecting interface to display the reinsurance product identifying base criteria and allow a user to select among the reinsurance product identifying base criteria;
load a reinsurance product data-structure from the reinsurance product database based on a users selections from the reinsurance product selecting interface;
read quote specific data-structure elements from the reinsurance product data-structure;
generate a reinsurance quote user interface from the quote specific data-structure elements;
provide a reinsurance quote user interface to a user;
receive user specifications via the reinsurance quote user interface;
retrieve logic sets specified by the reinsurance product data-structure;
apply logic sets to user specifications; and
provide a reinsurance product specific quote to the user if the user's specifications were acceptable based on the applying logic sets to user specifications.

80. The medium of claim 79, further, comprising:
prior to providing a reinsurance product specific quote:
provide user specifications and elements of the reinsurance product data-structure to a risk assessment component;
obtain risk assessment evaluation information from the risk assessment component;
wherein the product specific quote incorporates the risk assessment evaluation information from the risk assessment component.

81. The medium of claim 80, wherein the risk assessment evaluation information comprises a set of financial metrics determined based on the user's specifications.

82. The medium of claim 81, wherein the financial metrics comprise a profit margin.

83. The medium of claim 80, wherein the risk assessment component passes the user specifications and elements of the reinsurance product data-structure to an external event loss table generator, receives an event loss table therefrom, and generates risk assessment evaluation information based on elements of the event loss table.

84. The medium of claim 83, wherein the user specifications and elements of the reinsurance product data-structure are passed to the external event loss table generator via an interface module.

85. The medium of claim 84, wherein the interface module further comprises components configured to translate risk assessment component coded information to external event loss table generator coded information.

86. The medium of claim 80, wherein the risk assessment component queries an event loss table database based on the user specifications and elements of the reinsurance product data-structure, receives an event loss table values therefrom, and generates risk assessment evaluation information based on the event loss table values.

87. The medium of claim 86, wherein the user specifications and elements of the reinsurance product data-structure are passed to the event loss table database via an interface module.

88. The medium of claim 87, wherein the interface module further comprises components configured to translate risk assessment component coded information to event loss table database coded information.

89. The medium of claim 79, wherein the reinsurance product data-structure comprises an XML document.

90. The medium of claim 79, wherein the user specifications comprise information descriptive of an insurable risk.

91. The medium of claim 90, wherein the insurable risk is a property and the reinsurance product specific quote is directed to a property casualty reinsurance product.

92. The medium of claim 91, wherein the user specifications comprise a property geocode.

93. The medium of claim 91, wherein the user specifications comprise property construction characteristics.

94. The medium of claim 79, wherein the identifying base criteria comprise an insurance carrier identifier.

95. The medium of claim 79, wherein the quote specific data-structure elements comprise a plurality of risk characteristic input fields.

96. The medium of claim 95, wherein the risk product specific quote is directed to a property casualty insurance product and the risk characteristic input fields admit information descriptive of a property.

97. The medium of claim 79, wherein the quote specific data-structure elements include a set of rule calls to a rulesets database.

98. The medium of claim 79, wherein the quote specific data-structure elements include a set of lookup table calls to a lookup tables database.

99. The medium of claim 79, wherein the quote specific data-structure elements include at least one expression comprising a mathematical calculation configured to establish parameters used in providing the reinsurance product specific quote.

100. The medium of claim 79, wherein the quote specific data-structure elements include a set of insurance product documents, including a document delivery order.

101. The medium of claim 79, wherein the quote specific data-structure elements include a product payment schedule.

102. The medium of claim 79, wherein the applying logic sets to user specifications comprises generating a block for automatically binding an insurance policy for user specifications that match pre-set criteria.

103. The a medium of claim 102, further comprising:
check for a user exception request; and
provide a subset of the user specifications for underwriter review if a user exception request exists.

104. The medium of claim 79, wherein the applying logic sets to user specifications comprises generating a notification flag for user specifications that match pre-set criteria.

1. A processor-implemented method to provide a reinsurance product risk assessment, comprising:
reading a reinsurance product database for reinsurance product identifying base criteria;
providing a reinsurance product selecting interface to display the reinsurance product identifying base criteria and allow a user to select among the reinsurance product identifying base criteria;
loading a reinsurance product data-structure from the reinsurance product database based on a user's selections from the reinsurance product selecting interface;
reading risk specific data-structure elements from the reinsurance product data-structure;
generating a reinsurance risk user interface from the risk specific data-structure elements;
providing a reinsurance risk user interface to a user;
receiving user specifications via the reinsurance risk user interface;
retrieving logic sets specified by the reinsurance product data-structure;
applying logic sets to user specifications;
providing a reinsurance product specific risk assessment to the user if the user's specifications were acceptable.

2. The method of claim 1, wherein the reinsurance product data-structure comprises an XML document.

3. The method of claim 1, wherein the risk specific data-structure elements comprise input fields admitting information descriptive of an insurable risk.

4. The method of claim 3, wherein the insurable risk is a property and the reinsurance product specific quote is directed to a property casualty reinsurance product.

5. The method of claim 4, wherein the user specifications comprise a property geocode.

6. The method of claim 4, wherein the user specifications comprise property construction characteristics.

7. The method of claim 1, wherein the risk specific data-structure elements include a set of lookup table calls to a lookup tables database.

8. The method of claim 1, wherein the reinsurance product specific risk assessment comprises at least one financial metric.

9. The method of claim 8, wherein the financial metric comprises a profit margin.

10. The method of claim 1, wherein providing a reinsurance product specific risk assessment comprises:
passing the user specifications and elements of the risk specific data-structure to an external event loss table generator;
receiving an event loss table from the external event loss table generator corresponding to the user specifications and elements of the risk specific data-structure; and
generating a reinsurance product specific risk assessment based on elements of the event loss table.

11. The method of claim 10, wherein the user specifications and elements of the risk specific data-structure are passed to the external event loss table generator via an interface module.

12. The method of claim 11, wherein the interface module further comprises components configured to translate risk specific data-structure coded information to external event loss table generator coded information.

13. The method of claim 1, providing a reinsurance product specific risk assessment comprises:
querying an event loss table database based on the user specifications and elements of the risk specific data-structure;
receiving event loss table values from the event loss table database; and
generating risk assessment evaluation information based on the event loss table values.

14. The method of claim 13, wherein the user specifications and elements of the risk specific data-structure are passed to the event loss table database via an interface module.

15. The method of claim 14, wherein the interface module further comprises components configured to translate risk specific data-structure coded information to event loss table database coded information.

16. An apparatus to provide a reinsurance product risk assessment, comprising:
a memory;
a processor disposed in communication with said memory, and configured to issue a plurality of instructions stored in the memory, wherein the instructions issue signals to:
read a reinsurance product database for reinsurance product identifying base criteria;
provide a reinsurance product selecting interface to display the reinsurance product identifying base criteria and allow a user to select among the reinsurance product identifying base criteria;

load a reinsurance product data-structure from the reinsurance product database based on a user's selections from the reinsurance product selecting interface;

read risk specific data-structure elements from the reinsurance product data-structure;

generate a reinsurance risk user interface from the risk specific data-structure elements;

provide a reinsurance risk user interface to a user;

receive user specifications via the reinsurance risk user interface;

retrieve logic sets specified by the reinsurance product data-structure;

apply logic sets to user specifications;

provide a reinsurance product specific risk assessment to the user if the user's specifications were acceptable.

17. The apparatus of claim 16, wherein the reinsurance product data-structure comprises an XML document.

18. The apparatus of claim 16, wherein the risk specific data-structure elements comprise input fields admitting information descriptive of an insurable risk.

19. The apparatus of claim 18, wherein the insurable risk is a property and the reinsurance product specific quote is directed to a property casualty reinsurance product.

20. The apparatus of claim 19, wherein the user specifications comprise a property geocode.

21. The apparatus of claim 19, wherein the user specifications comprise property construction characteristics.

22. The apparatus of claim 16, wherein the risk specific data-structure elements include a set of lookup table calls to a lookup tables database.

23. The apparatus of claim 16, wherein the reinsurance product specific risk assessment comprises at least one financial metric.

24. The apparatus of claim 23, wherein the financial metric comprises a profit margin.

25. The apparatus of claim 16, wherein providing a reinsurance product specific risk assessment comprises:

pass the user specifications and elements of the risk specific data-structure to an external event loss table generator;

receive an event loss table from the external event loss table generator corresponding to the user specifications and elements of the risk specific data-structure; and generate a reinsurance product specific risk assessment based on elements of the event loss table.

26. The apparatus of claim 25, wherein the user specifications and elements of the risk specific data-structure are passed to the external event loss table generator via an interface module.

27. The apparatus of claim 26, wherein the interface module further comprises components configured to translate risk specific data-structure coded information to external event loss table generator coded information.

28. The apparatus of claim 16, providing a reinsurance product specific risk assessment comprises:

query an event loss table database based on the user specifications and elements of the risk specific data-structure;

receive event loss table values from the event loss table database; and generate risk assessment evaluation information based on the event loss table values.

29. The apparatus of claim 28, wherein the user specifications and elements of the risk specific data-structure are passed to the event loss table database via an interface module.

30. The apparatus of claim 28, wherein the interface module further comprises components configured to translate risk specific data-structure coded information to event loss table database coded information.

31. A system to provide a reinsurance product risk assessment, comprising:

means to read a reinsurance product database for reinsurance product identifying base criteria;

means to provide a reinsurance product selecting interface to display the reinsurance product identifying base criteria and allow a user to select among the reinsurance product identifying base criteria;

means to load a reinsurance product data-structure from the reinsurance product database based on a user's selections from the reinsurance product selecting interface;

means to read risk specific data-structure elements from the reinsurance product data-structure;

means to generate a reinsurance risk user interface from the risk specific data-structure elements;

means to provide a reinsurance risk user interface to a user;

means to receive user specifications via the reinsurance risk user interface;

means to retrieve logic sets specified by the reinsurance product data-structure;

means to apply logic sets to user specifications;

means to provide a reinsurance product specific risk assessment to the user if the user's specifications were acceptable.

32. The system of claim 31, wherein the reinsurance product data-structure comprises an XML document.

33. The system of claim 31, wherein the risk specific data-structure elements comprise input fields admitting information descriptive of an insurable risk.

34. The system of claim 33, wherein the insurable risk is a property and the reinsurance product specific quote is directed to a property casualty reinsurance product.

35. The system of claim 34, wherein the user specifications comprise a property geocode.

36. The system of claim 34, wherein the user specifications comprise property construction characteristics.

37. The system of claim 31, wherein the risk specific data-structure elements include a set of lookup table calls to a lookup tables database.

38. The system of claim 31, wherein the reinsurance product specific risk assessment comprises at least one financial metric.

39. The system of claim 38, wherein the financial metric comprises a profit margin.

40. The system of claim 31, wherein providing a reinsurance product specific risk assessment comprises:

means to pass the user specifications and elements of the risk specific data-structure to an external event loss table generator;

means to receive an event loss table from the external event loss table generator corresponding to the user specifications and elements of the risk specific data-structure; and means to generate a reinsurance product specific risk assessment based on elements of the event loss table.

41. The system of claim 40, wherein the user specifications and elements of the risk specific data-structure are passed to the external event loss table generator via an interface module.

42. The system of claim 41, wherein the interface module further comprises components configured to translate risk specific data-structure coded information to external event loss table generator coded information.

43. The system of claim 31, providing a reinsurance product specific risk assessment comprises:
means to query an event loss table database based on the user specifications and elements of the risk specific data-structure;
means to receive event loss table values from the event loss table database; and
means to generate risk assessment evaluation information based on the event loss table values.

44. The system of claim 43, wherein the user specifications and elements of the risk specific data-structure are passed to the event loss table database via an interface module.

45. The system of claim 44, wherein the interface module further comprises components configured to translate risk specific data-structure coded information to event loss table database coded information.

46. A medium readable by a processor to provide a reinsurance product risk assessment, comprising:
instruction signals in the processor readable medium, wherein the instruction signals are issuable by the processor to:
read a reinsurance product database for reinsurance product identifying base criteria;
provide a reinsurance product selecting interface to display the reinsurance product identifying base criteria and allow a user to select among the reinsurance product identifying base criteria;
load a reinsurance product data-structure from the reinsurance product database based on a user's selections from the reinsurance product selecting interface;
read risk specific data-structure elements from the reinsurance product data-structure;
generate a reinsurance risk user interface from the risk specific data-structure elements;
provide a reinsurance risk user interface to a user;
receive user specifications via the reinsurance risk user interface;
retrieve logic sets specified by the reinsurance product data-structure;
apply logic sets to user specifications;
provide a reinsurance product specific risk assessment to the user if the user's specifications were acceptable.

47. The medium of claim 46, wherein the reinsurance product data-structure comprises an XML document.

48. The medium of claim 46, wherein the risk specific data-structure elements comprise input fields admitting information descriptive of an insurable risk.

49. The medium of claim 48, wherein the insurable risk is a property and the reinsurance product specific quote is directed to a property casualty reinsurance product.

50. The medium of claim 49, wherein the user specifications comprise a property geocode.

51. The medium of claim 49, wherein the user specifications comprise property construction characteristics.

52. The medium of claim 46, wherein the risk specific data-structure elements include a set of lookup table calls to a lookup tables database.

53. The medium of claim 46, wherein the reinsurance product specific risk assessment comprises at least one financial metric.

54. The medium of claim 53, wherein the financial metric comprises a profit margin.

55. The medium of claim 46, wherein providing a reinsurance product specific risk assessment comprises:
pass the user specifications and elements of the risk specific data-structure to an external event loss table generator;
receive an event loss table from the external event loss table generator corresponding to the user specifications and elements of the risk specific data-structure; and
generate a reinsurance product specific risk assessment based on elements of the event loss table.

56. The medium of claim 55, wherein the user specifications and elements of the risk specific data-structure are passed to the external event loss table generator via an interface module.

57. The medium of claim 56, wherein the interface module further comprises components configured to translate risk specific data-structure coded information to external event loss table generator coded information.

58. The medium of claim 46, providing a reinsurance product specific risk assessment comprises:
query an event loss table database based on the user specifications and elements of the risk specific data-structure;
receive event loss table values from the event loss table database; and
generate risk assessment evaluation information based on the event loss table values.

59. The medium of claim 58, wherein the user specifications and elements of the risk specific data-structure are passed to the event loss table database via an interface module.

60. The medium of claim 59, wherein the interface module further comprises components configured to translate risk specific data-structure coded information to event loss table database coded information.

1. A system for authoring an insurance product comprising:
a display configured to present product information and authoring instructions to an author;
an author input device configured to receive product configuration instructions and data from an author;
an authoring module comprising:
a product creator module coupled to the author input device to receive product configuration instructions from the author and to provide product configuration tables based upon said product configuration instructions;
a product building module coupled to the product creator module and configured to receive the tables and to assemble an authored insurance product based upon the tables;
a forms module coupled to the product building module to receive insurance product information and to display author configurable forms for use with the authored insurance product.

1. A processor-implemented method for evaluating the profitability and rates associated with a new insurance policy, comprising:
identifying a property and its characteristics;
determining a geographic location of the property;
determining, based upon the geographic location of the property, the profitability associated with issuing the insurance policy for the property; and
determining, based upon the profitability, whether to bind coverage on the policy.

2. The method of claim 1 wherein determining the profitability comprises:
determining in real-time the profitability associated with a particular property using probabilistic loss data.

3. The method of claim 1 wherein the profitability is the marginal profitability of the new insurance policy to a portfolio of insurance policies.

1. A processor-implemented method for enabling a user to author and run logical rules, comprising:

providing a first graphical user interface for receiving user input to establish a plurality of logical rules in a ruleset, each rule including a rule expression, a logical function and a data field;

evaluating each logical rule in the ruleset; and displaying, in a second graphical user interface, the results of the evaluating.

2. The method of claim 1, further comprising:

processing a Web site to identify data fields available on the Web site; and providing in a graphical user interface the contents of the data fields for use in establishing a rule.

3. The method of claim 1, further comprising:

providing a third graphical user interface with which a user may test the operation of a rule.

1. A processor-implemented method for processing insurance policy data, comprising:

generating an editable XML document, the XML document including editable sections for: a) identifying and inputting insurance policy quote data, and b) processing the quote data to generate a policy quote; and making the editable XML document available for alteration.

2. The method of claim 1, wherein the editable XML document further comprises a section for outputting the quote.

3. The method of claim 1, wherein the editable XML document further comprises a section for generating an insurance policy application for the insurance policy of the quote.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional features, logical, organizational, structural, topological, and/or other aspects of the disclosure are not to be considered limitations on the disclosure as defined by the claims or limitations on equivalents to the claims.

What is claimed is:

1. A processor-readable electronic non-transitory storage medium storing processor-issuable instructions executable by a processor to:

retrieve a risk rater data structure, said risk rater data structure comprising, a set of risk rater base criteria, comprising at least a unique risk rater identifier, a plurality of risk characteristic input fields, at least one expression comprising a mathematical operation to be performed on at least one risk characteristic received via a subset of the plurality of risk characteristic input fields, a set of risk rater rule calls, specifying elements of a risk rater ruleset database, and a set of risk rater lookup table calls, specifying elements of a risk rater lookup tables database; and generate a risk rater product based on the the retrieved risk rater data structure by dynamically integrating and evaluating risk rater rules, said risk rater rules being referenced by the risk rater rule calls and stored in the risk rater ruleset database external to the risk rater data structure.

2. The processor-readable electronic non-transitory storage medium of claim 1, wherein the mathematical operation is further performed on data retrieved via the set of risk rater lookup table calls.

3. The processor-readable electronic non-transitory storage medium of claim 1, wherein the mathematical operation yields a financial metric associated with a candidate risk.

4. The processor-readable electronic non-transitory storage medium of claim 3 wherein the financial metric comprises a quote reflecting the price for insuring the candidate risk.

5. The processor-readable electronic non-transitory storage medium of claim 1, wherein the set of risk rater rule calls include at least one call to a risk rater rule referencing at least one risk characteristic.

6. The processor-readable electronic non-transitory storage medium of claim 1, wherein the set of risk rater rule calls include at least one call to a risk rater rule referencing data retrieved via the set of risk rater lookup table calls.

7. The processor-readable electronic non-transitory storage medium of claim 1, wherein the data-structure comprises an XML document.

8. The processor-readable electronic non-transitory storage medium of claim 1, wherein the set of risk rater base criteria further comprises an insurance carrier identifier.

9. The processor-readable electronic non-transitory storage medium of claim 1, wherein the plurality of risk characteristic fields admit characteristics of a property.

10. The processor-readable electronic non-transitory storage medium of claim 9, wherein the characteristics of a property include a geocode.

11. The processor-readable electronic non-transitory storage medium of claim 9, wherein the characteristics of a property include construction characteristics.

12. The processor-readable electronic non-transitory storage medium of claim 1, wherein the subset of the plurality of the risk characteristic input fields comprises the entire plurality of the risk characteristic input fields.

13. A processor-implemented risk evaluation method, comprising:
  retrieving a risk rater data structure, said risk rater data structure comprising,
    a set of risk rater base criteria, comprising at least a unique risk rater identifier,
    a plurality of risk characteristic input fields,
    at least one expression comprising a mathematical operation to be performed on at least one risk characteristic received via a subset of the plurality of risk characteristic input fields,
    a set of risk rater rule calls, specifying elements of a risk rater ruleset database, and
    a set of risk rater lookup table calls, specifying elements of a risk rater lookup tables database; and
  generating a risk rater product based on the the retrieved risk rater data structure by dynamically integrating and evaluating risk rater rules, said risk rater rules being referenced by the risk rater rule calls and stored in the risk rater ruleset database external to the risk rater data structure.

14. A processor-implemented risk evaluation system, comprising:
  a memory;
  a processor disposed in communication with said memory, and configured to issue a plurality of processing instructions stored in the memory, wherein the processor issues instructions to:
  retrieve a risk rater data structure, said risk rater data structure comprising,
    a set of risk rater base criteria, comprising at least a unique risk rater identifier,
    a plurality of risk characteristic input fields,
    at least one expression comprising a mathematical operation to be performed on at least one risk characteristic received via a subset of the plurality of risk characteristic input fields,
    a set of risk rater rule calls, specifying elements of a risk rater ruleset database, and
    a set of risk rater lookup table calls, specifying elements of a risk rater lookup tables database; and
  generate a risk rater product based on the the retrieved risk rater data structure by dynamically integrating and evaluating risk rater rules, said risk rater rules being referenced by the risk rater rule calls and stored in the risk rater ruleset database external to the risk rater data structure.

15. A processor-implemented risk evaluation method, comprising:
  receiving risk characteristics inputs via a plurality of risk characteristic input fields;
  determining a risk type based on the received risk characteristics inputs;
  retrieving a risk rater data structure based on the determined risk type,
    the risk rater data structure including a set of risk rater rule calls referencing risk rater rules stored at a risk rater ruleset database external to the risk rater data structure;
  dynamically integrating and evaluating risk rater rules referenced by the risk rater rule calls; and
  generating risk rating results based on evaluating the risk rater rules.

16. The method of claim 15, wherein the risk characteristics inputs include a property location.

17. The method of claim 15, wherein the risk type includes a property casualty event.

18. The method of claim 17, wherein the property casualty event includes any of a flood, an earthquake and a fire.

19. The method of claim 15, further comprising:
  assessing financial metrics associated with the risk type.

20. The method of claim 19, wherein assessing financial metrics further comprises any of a standalone assessment and a marginal assessment.

* * * * *